(12) United States Patent
Duan et al.

(10) Patent No.: US 10,851,881 B2
(45) Date of Patent: Dec. 1, 2020

(54) FOUR-SPEED TRANSAXLE FOR ELECTRIC VEHICLE

(71) Applicant: Guangzhou Sunmile Dynamic Technologies Corp., Ltd, Guangzhou, Guangdong (CN)

(72) Inventors: Fuhai Duan, Guangzhou (CN); Yu Wang, Guangzhou (CN); Jun Chen, Guangzhou (CN)

(73) Assignee: Guangzhou Sunmile Dynamic Technologies Corp., Ltd, Guangzhou (CN)

(*) Notice: Subject to any disclaimer, the term of this patent is extended or adjusted under 35 U.S.C. 154(b) by 182 days.

(21) Appl. No.: 16/033,222

(22) Filed: Jul. 12, 2018

(65) Prior Publication Data

US 2019/0078672 A1    Mar. 14, 2019

(30) Foreign Application Priority Data

Sep. 8, 2017 (CN) .......................... 2017 1 0807608
Sep. 27, 2017 (CN) .......................... 2017 1 0891299
Oct. 17, 2017 (CN) .......................... 2017 1 0967159
Oct. 25, 2017 (CN) .......................... 2017 1 1015033
Nov. 7, 2017 (CN) .......................... 2017 1 1084984

(Continued)

(51) Int. Cl.
*F16H 3/66* (2006.01)
*F16H 37/08* (2006.01)

(Continued)

(52) U.S. Cl.
CPC .............. *F16H 37/082* (2013.01); *B60K 1/00* (2013.01); *B60K 7/0007* (2013.01); *B60K 17/08* (2013.01);

(Continued)

(58) Field of Classification Search
CPC . F16H 37/082; F16H 3/66; F16H 3/62; F16H 57/10; F16H 25/20; F16H 63/3043;

(Continued)

(56) References Cited

U.S. PATENT DOCUMENTS 8,251,857 B1 * 8/2012 Mellet ..................... F16H 3/666
                                                              475/280
2004/0147358 A1 * 7/2004 Biermann ................. F16H 3/66
                                                              475/275

(Continued)

*Primary Examiner* — David J Hlavka

(57) ABSTRACT

A four-speed transaxle for an electric vehicle comprises four planetary gear sets that is operatively connected to an electric motor, four electric caliper brake systems and one stage gears. The four-speed transaxle produces its first speed ratio when a first and third electric caliper brake systems are disengaged and a second and fourth electric caliper brake systems are engaged. Second speed ratio results when the first and fourth electric caliper brake systems are engaged and the second and third electric caliper brake systems are disengaged. Third speed ratio results when the second and third electric caliper brake systems are engaged and the first and fourth electric caliper brake systems are disengaged. Fourth speed ratio is produced when the first and third electric caliper brake systems are engaged and the second and fourth electric caliper brake systems are disengaged.

2 Claims, 15 Drawing Sheets

(30) Foreign Application Priority Data

| | | |
|---|---|---|
| Dec. 28, 2017 | (CN) | 2017 1 1461366 |
| Jan. 30, 2018 | (CN) | 2018 1 0090955 |
| Mar. 15, 2018 | (CN) | 2018 1 0212143 |

(51) Int. Cl.
- *B60K 7/00* (2006.01)
- *B60K 17/16* (2006.01)
- *F16H 3/62* (2006.01)
- *F16H 57/10* (2006.01)
- *B60K 1/00* (2006.01)
- *B60K 17/08* (2006.01)
- *F16D 65/18* (2006.01)
- *F16H 25/20* (2006.01)
- *F16H 63/30* (2006.01)
- *F16D 55/226* (2006.01)
- *F16D 121/24* (2012.01)
- *F16D 125/40* (2012.01)

(52) U.S. Cl.
CPC ............ *B60K 17/16* (2013.01); *B60K 17/165* (2013.01); *F16D 65/18* (2013.01); *F16H 3/62* (2013.01); *F16H 3/66* (2013.01); *F16H 25/20* (2013.01); *F16H 57/10* (2013.01); *F16H 63/3043* (2013.01); B60K 2001/001 (2013.01); F16D 55/226 (2013.01); F16D 2121/24 (2013.01); F16D 2125/40 (2013.01); F16H 2063/3063 (2013.01); F16H 2063/3093 (2013.01); F16H 2200/0021 (2013.01); F16H 2200/0043 (2013.01); F16H 2200/201 (2013.01); *F16H 2200/2012* (2013.01); *F16H 2200/2023* (2013.01); *F16H 2200/2041* (2013.01)

(58) Field of Classification Search
CPC ....... F16H 2200/201; F16H 2200/2012; F16H 2200/2023; F16H 2200/0021; F16H 2063/3063; F16H 2063/3093; F16H 2200/0043; F16H 2200/2041; F16H 2200/2005; F16H 2200/2007; F16H 2200/0017; B60K 7/0007; B60K 17/165; B60K 1/00; B60K 17/08; B60K 17/16; B60K 2001/001; F16D 65/18; F16D 55/226; F16D 2121/24; F16D 2125/40

See application file for complete search history.

(56) References Cited

U.S. PATENT DOCUMENTS

| | | | |
|---|---|---|---|
| 2010/0062893 A1* | 3/2010 | Antonov | F16H 3/66 475/275 |
| 2010/0234168 A1* | 9/2010 | Antonov | F16H 3/66 475/296 |
| 2011/0111912 A1* | 5/2011 | Wittkopp | F16H 3/66 475/219 |
| 2012/0329601 A1* | 12/2012 | Antonov | F16H 3/66 475/280 |
| 2017/0219055 A1* | 8/2017 | Lee | F16H 3/66 |
| 2017/0219056 A1* | 8/2017 | Lee | F16H 3/66 |
| 2017/0219059 A1* | 8/2017 | Lee | F16H 3/66 |

* cited by examiner

FOUR-SPEED TRANSAXLE FOR ELECTRIC VEHICLE

CROSS-REFERENCE TO RELATED APPLICATIONS

The present application claims the benefit of Chinese Patent Application No. 201710807608.9 filed on Sep. 8, 2017; Chinese Patent Application No. 201710891299.8 filed on Sep. 27, 2017; Chinese Patent Application No. 201710967159.4 filed on Oct. 17, 2017; Chinese Patent Application No. 201711015033.3 filed on Oct. 25, 2017; Chinese Patent Application No. 201711084984.6 filed on Nov. 7, 2017; Chinese Patent Application No. 201711461366.9 filed on Dec. 28, 2017; Chinese Patent Application No. 201810090955.9 filed on Jan. 30, 2018; Chinese Patent Application No. 201810140978.6 filed on Feb. 11, 2018; and Chinese Patent Application No. 201810212143.7 filed on Mar. 15, 2018, the disclosure of all of which are hereby incorporated by reference in their entirety.

TECHNICAL FIELD

The present invention relates generally to vehicular transaxle. More particularly, the present invention relates to a vehicular transaxle that is capable of receiving input power from a source of stored electrical energy. Specifically, the present invention relates to a four-speed transaxle that utilizes four planetary gear sets that is operatively connected to an electric motor and four electric caliper brake systems as well as one stage gears that is used to transmit power to differential assembly.

BACKGROUND ART

Public concern about air quality and the federal air law have created a large demand for low emission vehicles. One form of a low emission vehicle is an electric vehicle, and the first electric powered vehicles employed power trains that received power from a source of stored electrical energy, such as a battery. At the present time, power trains used for electric vehicles are primarily single-speed transaxles, i.e., pure reduction stages having an output speed that is reduced in comparison to an input speed. However, with such a configuration the electric drive must cover the entire rotational speed range, which significantly reduces its overall efficiency. In addition, the realizable speed range is rather narrow.

It has therefore already been proposed to use two-speed transaxle as drive trains for electric vehicles. Conventional two-speed transaxles may include an input shaft having two driving gears. Speed selection is achieved by sliding a synchronizer sleeve between two positions on an intermediate shaft assembly. A drive pinion of a final drive gear set may be part of the intermediate shaft assembly. A final drive output gear is attached to a bevel and side gear differential assembly that distributes output torque to left and right wheels of an electric vehicle. If such a two-speed transaxle is used, the electric drive trains can be of smaller design, which results in a clear cost benefit. However, the very configuration of the transmission with a sliding synchronizer sleeve causes a drop in traction force during shifting. However, for electric vehicles such a drop in traction force means a substantial sacrifice of comfort, which is not acceptable to the driver.

Speed selection is also achieved by engagement and disengagement is known to be accomplished within the transmission by employing selectively operable clutches. One known type of clutch within the transmission is a mechanical clutch operating by separating or joining two connective surfaces, for instances, wet clutch plates, operating, when joined, to apply frictional torque to each other. Engagement operation while engaged operation, and disengagement operation while disengaged operation are all clutch states that must be managed in order for the vehicle to operate properly and smoothly. Therefore, slip, or relative rotational movement between the connective surfaces of the clutch when the clutch connective surfaces are intended to be synchronized and locked, occurs whenever reactive torque applied to the clutch exceeds actual capacity torque created by applied clamping force. These cause several issues including (i) slip in the transmission results in a lot of heat and dust causing degradation for the performance and life of the transmission; (ii) resistance force between two connective surfaces for wet clutch plates becomes larger as the input member speed becomes higher resulting in a large amount of heat and a decrease in efficiency for the transmission; (iii) the oil roads of clutches are very complex and precise resulting in a significant increase in costs; (iv) once the clutches are damaged, the transmission must be disassembled for repair or replacement; (v) lubricating oil selection for the transmission must take into account clutch performance and transmission life, such as gears and bearings, it is difficult to give full play to the best performance of lubricating oil. However, for electric vehicles such a decrease in efficiency means a drop in the mileage of a continuation, which is not acceptable to the driver.

SUMMARY

The four-speed transaxle has a compact configuration, which is suitable as an exclusive drive for a vehicle or as an additional drive source in a vehicle, which has a combustion engine as the main drive source, which are also designated as hybrid drives. The four-speed transaxle can be used for any drive axle, i.e. front axle as well as rear axle.

It is therefore an object of the present invention to specify a four-speed transaxle for a drive train of a vehicle, preferably for use in a drive train for electric vehicles, in an auxiliary drive train for hybrid vehicles, whereby shifting without an interruption of traction, "load shifting" is enabled.

It is, therefore, a primary object of the present invention to provide a novel transaxle that provides electric caliper brake systems to achieve maximum power quickly for passing, towing and hauling in a vehicle, while providing four fixed speed ratios.

It is another object of the present invention to provide novel transaxle, as above, wherein the planetary gear sets and the electric motor or the differential assembly is coaxially disposed.

It is a further object of the present invention to a novel transaxle, as above, wherein the operational results can be achieved with four planetary gear sets.

It is still another object of the present invention to a novel transaxle, as above, wherein the electric caliper brake systems are installed outside the transaxle housing, there are very small stirring oil loss and without shifting heat (the produced heat from shifting is transmitted to free air) which results the high efficiency and high reliability for the four-speed transaxle.

It is still further object of the present invention to a novel transaxle, as above, wherein the transaxle is operated by four electric caliper brake systems.

It is an even further object of the present invention to provide a novel transaxle, as above, wherein the regulatable clutch system is designed as an electric caliper brake system with a dry brake disc having at least one pair pad plates and two pairs of independent screw-nut.

These and other objects of the present invention, as well as the advantages thereof over existing and prior art forms, which will be apparent in view of the following detailed specification, are accomplished by means hereinafter described and claimed.

By way of a general introductory description, a four-speed transaxle embodying the concepts of the present invention utilizes an input means to receive power from the electric motor and a power output means to deliver power to drive the vehicle. The electric motor is connected to energy storage devices, such as batteries, so that the energy storage devices can accept power from, and supply power to, the electric motor. A control unit regulates power flow between the energy storage devices and the electric motor.

A four-speed transaxle for an electric vehicle is proposed, which is compact and enables a simple integration into existing space requirements. More specifically, an electric four-speed transaxle for a vehicle is disclosed that comprises an electric motor and four-speed transmission that is driveable by the electric motor. The four-speed transmission has four planetary gear sets, one stage gears, four electric caliper brake systems and a differential assembly. The electric motor and the planetary gear sets may be arranged coaxially to a rotational axis. The differential assembly and the planetary gear sets may be arranged coaxially to a rotational axis. The subject transmission employs four planetary gear sets. Each planetary gear set has a sun gear and a ring gear, each of which meshingly engage a plurality of planet gears. The electric motor and the first and second planetary gear sets are coaxially aligned. The sun gear in the first planetary gear set and the sun gear in the second planetary gear set are successively connected to the electric motor. The carrier in the first planetary gear set is connected to the ring gear in the second planetary gear set. The carrier in the second planetary gear set is connected to the carrier in the third planetary gear set and the sun gear in the fourth planetary gear set. The carrier in the fourth planetary gear set is connected to a differential carrier of the differential assembly that distributes output torque to left and right wheels of an electric vehicle.

The electric caliper brake system is floating caliper architecture, comprises shifting motor, shifting reducer, shifting driving gear, shifting driven gear, the left pair of independent screw-nut, the right pair of independent screw-nut, the left pad plate, the right pad plate, a dry disc, the speed sensors for watching state of the dry disc as well as the floating caliper. The electric caliper brake system, the left pad plate and the right pad plate are pressed against the dry disc by the right pair of screw-nut and the left pair of screw-nut inside the caliper, respectively, driven by the shifting driven gear power from the shifting driving gear by using the shifting motor. The floating caliper and the dry disc are mounted on outside of the transaxle housing.

The sun gear in the third planetary gear set may be connected with the third connecting gear by a third sun gear shaft. The carrier in the third planetary gear set may be connected with the sun gear in the fourth planetary gear set. The ring gear in the third planetary gear set may be connected with the ring gear in the fourth planetary gear set by a fourth connecting gear. The sun gear in the third planetary gear set and the sun gear in the fourth planetary gear set are hollow allowing the right shaft to pass through them center from the differential assembly to the right wheel of the electric vehicle.

Two first shift gears are symmetrically arranged on the outer circumference of the ring gear in the first planetary gear set, and the two first shift gears are simultaneously engaged with the ring gear in the first planetary gear set. The first shift gear is fixedly connected with a first dry disc by a first gear shaft.

Two second shift gears are symmetrically arranged on the outer circumference of the ring gear in second planetary gear set, and the two second shift gears are simultaneously engaged with the ring gear in second planetary gear set. The second shift gear is fixedly connected with a second dry disc by a second gear shaft.

Two third shift gears are symmetrically arranged on the outer circumference of the third connecting gear, and the two third shift gears are simultaneously engaged with the third connecting gear. The third shift gear is fixedly connected with a third dry disc by a third gear shaft.

Two fourth shift gears are symmetrically arranged on the outer circumference of a fourth connecting gear, and the two fourth shift gears are simultaneously engaged with a fourth connecting gear. The fourth shift gear is fixedly connected with a fourth dry disc by a fourth gear shaft.

To acquaint persons skilled in the arts most closely related to the present invention, one highly preferred alternative embodiment of a four-speed transaxle that illustrate the best modes now contemplated for putting the invention into practice are described herein by, and with reference to, the annexed drawings that form a part of the specification. The exemplary transaxles described in detail without attempting to show all of the various forms and modification in which the invention might be embodied. As such, the embodiments shown and described herein are illustrative, and as will become apparent to those skilled in these arts, can be modified in numerous ways within the spirit and scope of the invention; the invention being measured by the appended claims and not by the details of the specification.

DETAILED DESCRIPTION

Description of the Exemplary Preferred Embodiment

Figure 1A:
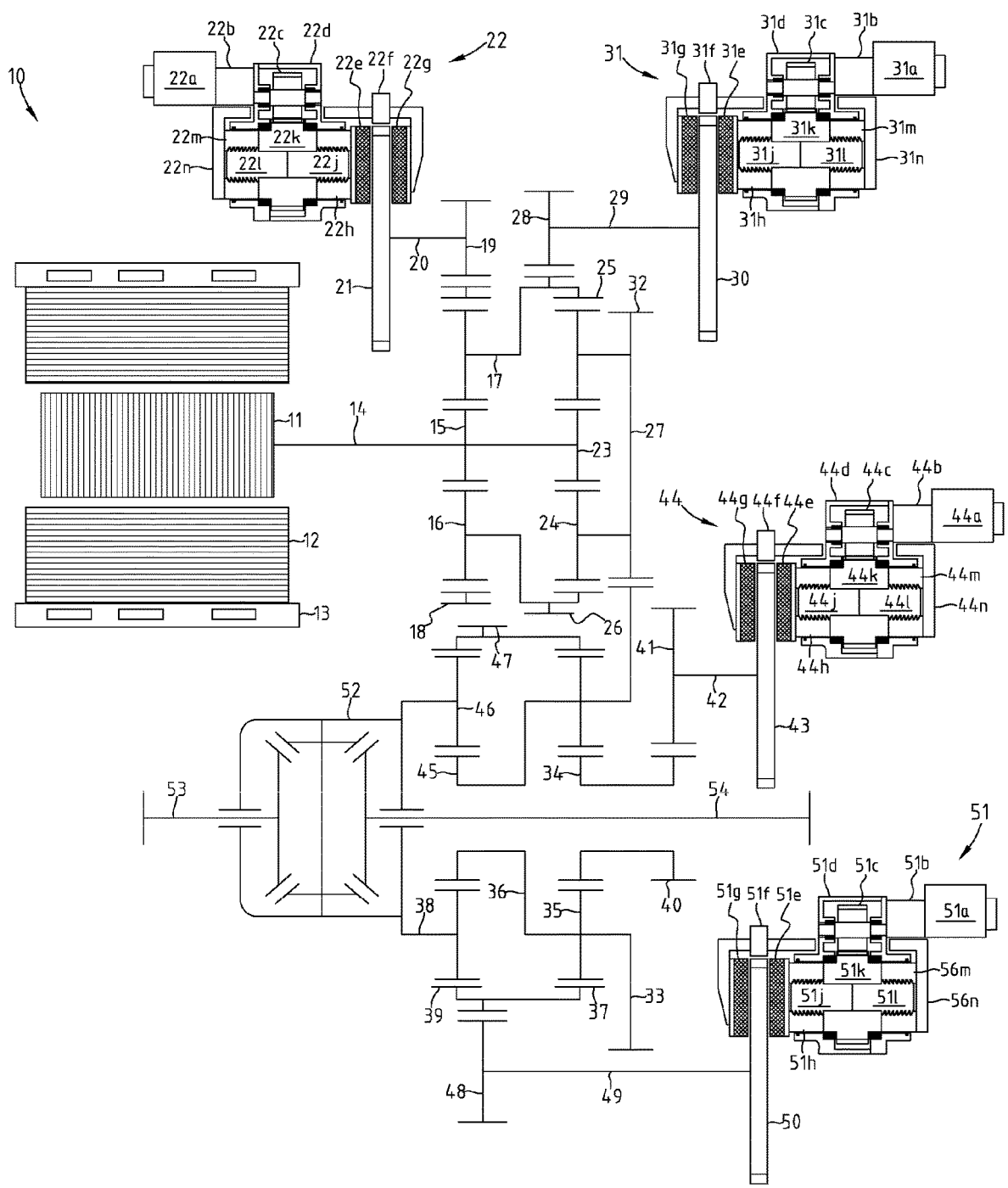
FIG. 1A is a schematic representation of the four-speed transaxle according to a first embodiment.
Figure 1B:
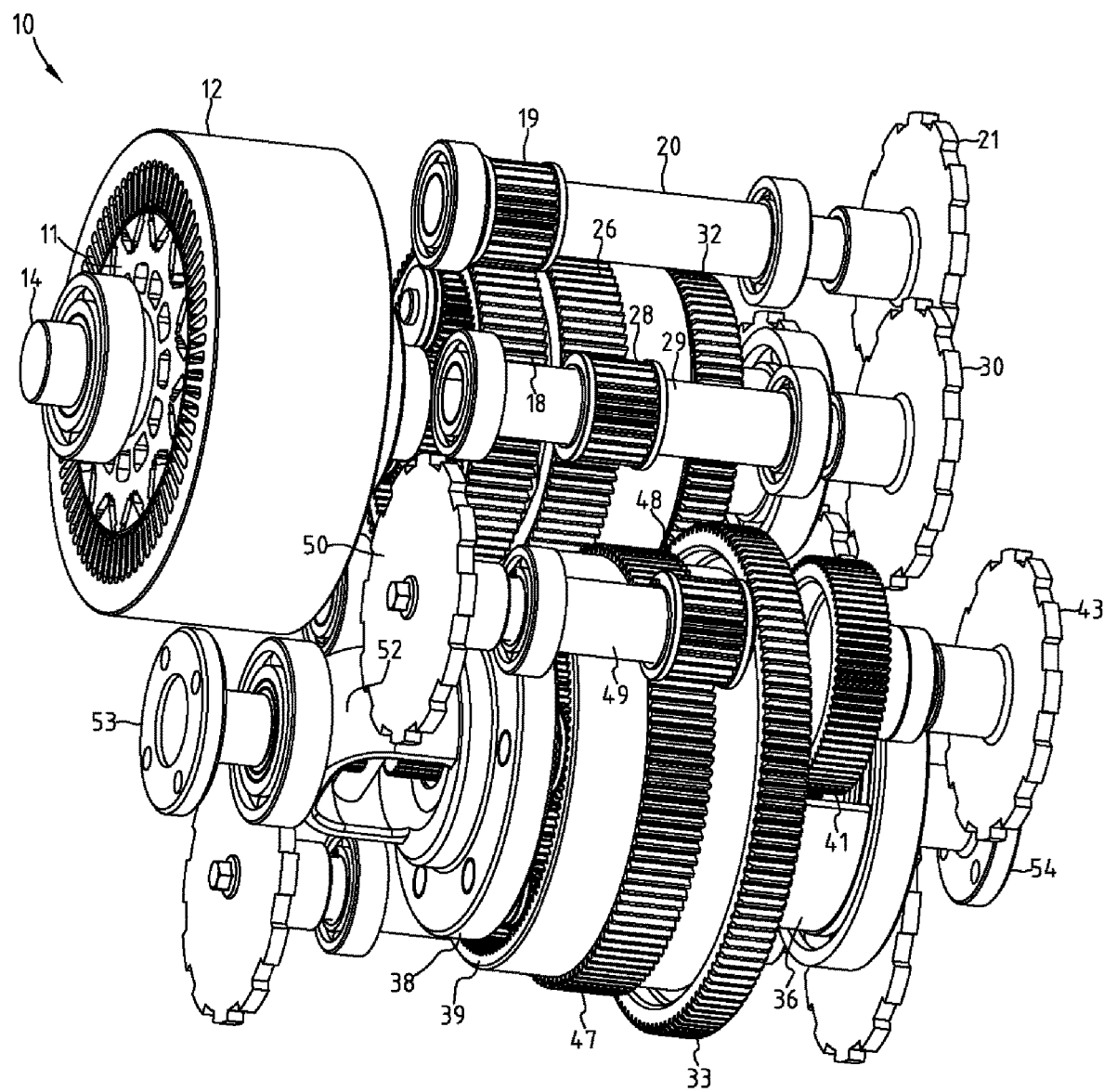
FIG. 1B is a partial sectional view showing the four-speed transaxle in FIG. 1A.
Figure 1C:
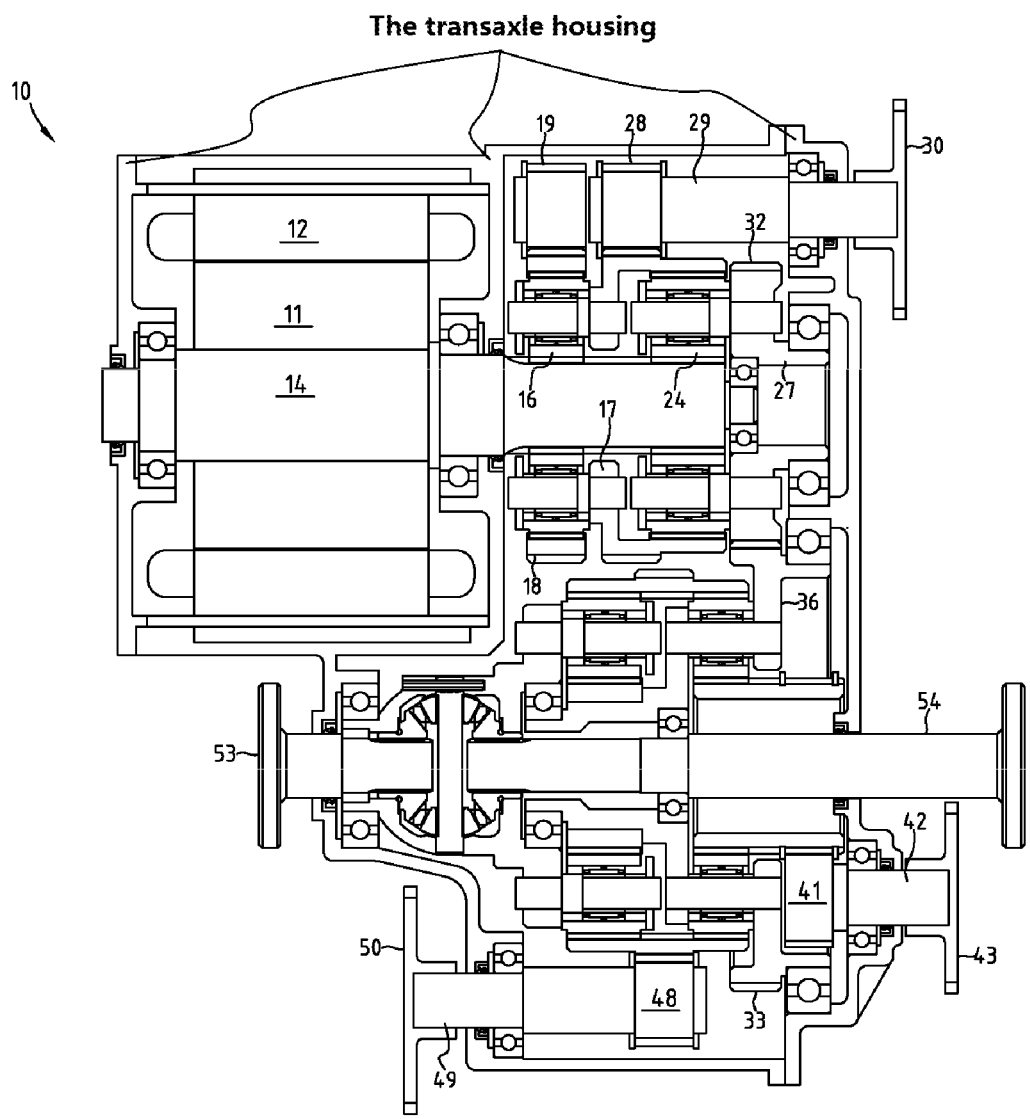
FIG. 1C is a diagrammatic, longitudinal cross section view of the four-speed transaxle according to a representative preferred embodiment of the invention depicted in FIG. 1A.

One representative form of a four-speed transaxle embodying the concepts of the present invention is designated generally by the numeral 10 on FIGS. 1A, 1B and 1C. As shown in FIGS. 1A, 1B and 1C, the four-speed transaxle 10 utilizes four planetary gear sets. The four-speed transaxle 10 has an input member 14 that may be in the nature of shaft which may be directly driven by an electric motor rotor 11. The input shaft 14 is successively connected to a first sun gear 15 in a first planetary gear set and a second sun gear 23 in a second planetary gear set in the four-speed transaxle 10. In the first and second planetary gear sets embodiment, the first carrier 17 is connected to the second ring gear 25. A differential assembly 52 comprises a differential carrier, which is rotatingly driveable around its axis, as well as a left shaft 53 and a right shaft 54.

The first planetary gear set has a first inner gear member 18, which may generally be designated as a first ring gear 18, which circumscribes a first outer gear member 15, generally designated as the first sun gear 15. A plurality of first planet gear members 16 are rotatably mounted on a first carrier 17 such that each first planet gear 16 meshingly engages both the first ring gear 18 and the first sun gear 15. The first ring gear 18 has both the internal and external teeth. There are two symmetrically arranged a first shift gear systems. The first shift gear system comprises a first shift gear 19 which meshingly engages the external gear teeth of the first ring gear 18 and a first shift gear shaft 20 which is fixedly secured to a first dry disc 21. The first shift gear 19 is fixedly secured to the other end of the first shift gear shaft 20.

The second planetary gear set has a second inner gear member 25, which may generally be designated as a second ring gear 25, which circumscribes a second outer gear member 23, generally designated as the second sun gear 23. A plurality of second planet gear members 24 are rotatably mounted on a second carrier 27 such that each second planet gear 24 meshingly engages both the second ring gear 25 and the second sun gear 23. The second ring gear 25 has both the internal and external teeth 26. There are two symmetrically arranged a second shift gear systems. The second shift gear system comprises a second shift gear 28 which meshingly engages the external gear teeth 26 of the second ring gear 25 and a second shift gear shaft 29 which is fixedly secured to a second dry disc 30. The second shift gear 28 is fixedly secured to the other end of the second shift gear shaft 29.

A third planetary gear set has a third inner gear member 37, which may generally be designated as a third ring gear 37, which circumscribes a third outer gear member 34, generally designated as a third sun gear 34. A plurality of third planet gear members 35 are rotatably mounted on a third carrier 36 such that each third planet gear 35 meshingly engages both the third ring gear 37 and the third sun gear 34. The third sun gear 34 in the third planetary gear set is connected with a first connecting gear 40 by a third sun gear shaft. There are two symmetrically arranged a third shift gear systems. The third shift gear system comprises a third shift gear 41 which meshingly engages the first connecting gear 40 and a third shift gear shaft 42 which is fixedly secured to a third dry disc 43. The third shift gear 41 is fixedly secured to the other end of the third shift gear shaft 42.

A fourth planetary gear set has a fourth inner gear member 39, which may generally be designated as a fourth ring gear 39, which circumscribes a fourth outer gear member 45, generally designated as a fourth sun gear 45. A plurality of fourth planet gear members are rotatably mounted on a fourth carrier 38 such that each fourth planet gear 46 meshingly engages both the fourth ring gear 39 and the fourth sun gear 45. A second connecting gear 47 has an outer tooth structure, which is mounted on the outer circumference of the whole ring formed by the third ring gear 37 and the fourth ring gear 39. There are two symmetrically arranged a fourth shift gear systems. The fourth shift gear system comprises a fourth shift gear 48 which meshingly engages the second connecting gear 47 and a fourth shift gear shaft 49 which is fixedly secured to a fourth dry disc 50. The fourth shift gear 48 is fixedly secured to the other end of the fourth shift gear shaft 49.

A driving gear 32 is fixed for rotation with the second carrier 27 providing power from the first and second planetary gear sets. A driven gear 33 is fixed for rotation with the third carrier 36 and the fourth sun gear 45 provided power to the third and fourth planetary gear sets. The driving gear 32 meshingly engages the driven gear 33. The third sun gear 34 and the fourth sun gear 45 are hollow allowing the right shaft 54 to pass through them center from the differential assembly 52 to the right wheel of the electric vehicle. The third carrier 36 is fixedly connected with the fourth sun gear 45. The fourth carrier 38 is fixedly connected to a differential carrier of the differential assembly 52 that distributes output torque to left and right wheels of an electric vehicle by the left shaft 53 and the right shaft 54.

A first electric caliper brake system 22 is floating caliper architecture, comprises shifting motor 22a, shifting reducer 22b, a casing 22d, shifting driving gear 22c, shifting driven gear 22k, a left nut 22m, a left screw 22l, a right nut 22h, a right screw 22j, a left pad plate 22e, a right pad plate 22g, a speed sensor 22f for watching state of the first dry disc 21 as well as a floating caliper 22n. The first electric caliper brake system 22, the left pad plate 22e and the right pad plate 22g are pressed against the first dry disc 21 by the right pair of screw-nut and the left pair of screw-nut inside the floating caliper 22n, respectively, driven by the shifting driven gear 22k power from the shifting driving gear 22c by using the shifting motor 22a. The first electric caliper brake system 22 and the first dry disc 21 are mounted on outside of the transaxle housing. A plurality of speed teeth are uniformly processed on the circumferential surface of the first dry disc 21. There is a clearance about 2 mm between the speed sensor 22f and the circumferential surface of the first dry disc 21. There is a clearance about 0.2 mm between the left and right pad plates 22e, 22g and the first dry disc 21. The shifting motor 22a and the shifting reducer 22b are fixedly secured to outside surface of the casing 22d. The casing 22d is fixedly secured to outside surface the transaxle housing by two guide bolts. The floating caliper 22n mounted on the casing 22d can move along the two guide bolts. The ends of the left screw 22l and the right screw 22j are fixed in an inner hole of the shifting driven gear 22k. The end of the left nut 22m is contacted with an inner wall of the floating caliper 22n. The end of the right nut 22h is contacted with the wall of the left pad plate 22e. The wall of the right pad plate 22g is contacted with the other inner wall of the floating caliper 22n. The speed sensor 22f is mounted on the top of the floating caliper 22n. As the left and right pairs of screw-nut are pulled away from the first dry disc 21 by the shifting motor 22a, there are no friction between the left and right pad plates 22e, 22g and the first dry disc 21. The high pressure force from the shifting motor 22a feeds into the left and right pairs of screw-nut through the shifting reducer 22b, shifting driving gear 22c and shifting driven gear 22k, which drives the left and right pad plates 22e, 22g to fix the first dry disc 21.

A second electric caliper brake system 31 is floating caliper architecture, comprises shifting motor 31a, shifting reducer 31b, a casing 31d, shifting driving gear 31c, shifting driven gear 31k, a left nut 31m, a left screw 31l, a right nut 31h, a right screw 31j, a left pad plate 31e, a right pad plate 31g, a speed sensor 31f for watching state of the second dry disc 30 as well as a floating caliper 31n. The second electric caliper brake system 31, the left pad plate 31e and the right pad plate 31g are pressed against the second dry disc 30 by the right pair of screw-nut and the left pair of screw-nut inside the floating caliper 31n, respectively, driven by the shifting driven gear 31k power from the shifting driving gear 31c by using the shifting motor 31a. The second electric caliper brake system 31 and the second dry disc 30 are mounted on outside of a transaxle housing. A plurality of speed teeth are uniformly processed on the circumferential surface of the second dry disc 30. There is a clearance about 2 mm between the speed sensor 31f and the circumferential surface of the second dry disc 30. There is a clearance about 0.2 mm between the left and right pad plates 31e, 31g and the second dry disc 30. The shifting motor 31a and the shifting reducer 31b are fixedly secured to outside surface of the casing 31d. The casing 31d is fixedly secured to outside surface the transaxle housing by two guide bolts. The floating caliper 31n mounted on the casing 31d can move along the two guide bolts. The ends of the left screw 31l and the right screw 31j are fixed in an inner hole of the shifting driven gear 31k. The end of the left nut 31m is contacted with an inner wall of the floating caliper 31n. The end of the right nut 31h is contacted with the wall of the left pad plate 31e. The wall of the right pad plate 31g is contacted with the other inner wall of the floating caliper 31n. The speed sensor 31f is mounted on the top of the floating caliper 31n. As the left and right pairs of screw-nut are pulled away from the second dry disc 30 by the shifting motor 31a, there are no friction between the left and right pad plates 31e, 31g and the second dry disc 30. The high pressure force from the shifting motor 31a feeds into the left and right pairs of screw-nut through the shifting reducer 31b, shifting driving gear 31c and shifting driven gear 31k, which drives the left and right pad plates 31e, 31g to fix the second dry disc 30.

A third electric caliper brake system 44 is floating caliper architecture, comprises shifting motor 44a, shifting reducer 44b, a casing 44d, shifting driving gear 44c, shifting driven gear 44k, a left nut 44m, a left screw 44l, a right nut 44h, a right screw 44j, a left pad plate 44e, a right pad plate 44g, a speed sensor 44f for watching state of the third dry disc 43 as well as a floating caliper 44n. The third electric caliper brake system 44, the left pad plate 44e and the right pad plate 44g are pressed against the third dry disc 43 by the right pair of screw-nut and the left pair of screw-nut inside the floating caliper 44n, respectively, driven by the shifting driven gear 44k power from the shifting driving gear 44c by using the shifting motor 44a. The third electric caliper brake system 44 and the third dry disc 43 are mounted on outside of the transaxle housing. A plurality of speed teeth are uniformly processed on the circumferential surface of the third dry disc 43. There is a clearance about 2 mm between the speed sensor 44f and the circumferential surface of the third dry disc 43. There is a clearance about 0.2 mm between the left and right pad plates 44e, 44g and the third dry disc 43. The shifting motor 44a and the shifting reducer 44b are fixedly secured to outside surface of the casing 44d. The casing 44d is fixedly secured to outside surface the transaxle housing by two guide bolts. The floating caliper 44n mounted on the casing 44d can move along the two guide bolts. The ends of the left screw 44l and the right screw 44j are fixed in an inner hole of the shifting driven gear 44k. The end of the left nut 44m is contacted with an inner wall of the floating caliper 44n. The end of the right nut 44h is contacted with the wall of the left pad plate 44e. The wall of the right pad plate 44g is contacted with the other inner wall of the floating caliper 44n. The speed sensor 44f is mounted on the top of the floating caliper 44n. As the left and right pairs of screw-nut are pulled away from the third dry disc 43 by the shifting motor 44a, there are no friction between the left and right pad plates 44e, 44g and the third dry disc 43. The high pressure force from the shifting motor 44a feeds into the left and right pairs of screw-nut through the shifting reducer 44b, shifting driving gear 44c and shifting driven gear 44k, which drives the left and right pad plates 44e, 44g to fix the third dry disc 43.

A fourth electric caliper brake system 51 is floating caliper architecture, comprises shifting motor 51a, shifting reducer 51b, a casing 51d, shifting driving gear 51c, shifting driven gear 51k, a left nut 51m, a left screw 51l, a right nut 51h, a right screw 51j, a left pad plate 51e, a right pad plate 51g, a speed sensor 51f for watching state of the fourth dry disc 50 as well as a floating caliper 51n. The fourth electric caliper brake system 51, the left pad plate 51e and the right pad plate 51g are pressed against the fourth dry disc 50 by the right pair of screw-nut and the left pair of screw-nut inside the floating caliper 51n, respectively, driven by the shifting driven gear 51k power from the shifting driving gear 51c by using the shifting motor 51a. The fourth electric caliper brake system 51 and the fourth dry disc 50 are mounted on outside of the transaxle housing. A plurality of speed teeth are uniformly processed on the circumferential surface of the fourth dry disc 50. There is a clearance about 2 mm between the speed sensor 51f and the circumferential surface of the fourth dry disc 50. There is a clearance about 0.2 mm between the left and right pad plates 51e, 51g and the fourth dry disc 50. The shifting motor 51a and the shifting reducer 51b are fixedly secured to outside surface of the casing 51d. The casing 51d is fixedly secured to outside surface the transaxle housing by two guide bolts. The floating caliper 51n mounted on the casing 51d can move along the two guide bolts. The ends of the left screw 51l and the right screw 51j are fixed in an inner hole of the shifting driven gear 51k. The end of the left nut 51m is contacted with an inner wall of the floating caliper 51n. The end of the right nut 51h is contacted with the wall of the left pad plate 51e. The wall of the right pad plate 51g is contacted with the other inner wall of the floating caliper 51n. The speed sensor 51f is mounted on the top of the floating caliper 51n. As the left and right pairs of screw-nut are pulled away from the fourth dry disc 50 by the shifting motor 51a, there are no friction between the left and right pad plates 51e, 51g and the fourth dry disc 50. The high pressure force from the shifting motor 51a feeds into the left and right pairs of screw-nut through the shifting reducer 51b, shifting driving gear 51c and shifting driven gear 51k, which drives the left and right pad plates 51e, 51g to fix the fourth dry disc 50.

Operation of the Exemplary Embodiment

In response to an operator's action, the control device (not shown) determines what is required and then manipulates the selectively operated components of the four-speed transaxle 10 appropriately to respond to the operator demand. As will become apparent as the detailed description proceeds, the four-speed transaxle 10 includes four planetary gear sets mechanically-operatively connected to a electric motor adapted to selectively transmit mechanical power to a differential assembly through selective application of four electric caliper brake systems. In other words, four speed ratios are provided by changing the states of four electric caliper brake systems. The power supplied by the four-speed transaxle 10 is predicated solely by the power delivered to the four-speed transaxle 10 from the electric motor. To produce the four fixed speed ratios, there are four delivery paths obtained by selecting the first, second, third and fourth electric caliper brake systems to disengage and engage.

First Speed Ratio

First speed ratio results when the first electric caliper brake system 22 and the third electric caliper brake system 44 are disengaged and the second electric caliper brake system 31 and the fourth electric brake system 51 are engaged. The clearance is kept up between the left and right pad plates 22e, 22g and the first dry disc 21. The clearance is also kept up between the left and right pad plates 44e, 44g and the third dry disc 43. There are setting pressure force from the shifting motor 31a is used to push the left and right pairs of screw-nut to move the left and right pad plates 31e, 31g braking the second dry disc 30. There are also setting pressure force from the shifting motor 51a is used to push the left and right pairs of screw-nut to move the left and right pad plates 51e, 51g braking the fourth dry disc 50. Because the second shift gear shaft 29 which is fixedly secured to the second dry disc 30, and the second shift gear 28 is fixedly secured to the second shift gear shaft 29 and meshingly engages the outer gear teeth 26 of the second ring gear 25, so the second ring gear 25 is locked which provides the torque reaction point for the second planetary gear set. At the same time, because the fourth shift gear shaft 49 which is fixedly secured to the fourth dry disc 50, and the fourth shift gear 48 is fixedly secured to the fourth shift gear shaft 49 and meshingly engages the fourth connecting gear 47, so the fourth ring gear 39 is locked which provides the torque reaction point for the fourth planetary gear set. The first ring gear 18 and the third sun gear 34 drive the first dry disc 21 and the third dry disc 43 to freely rotatably around the first shift gear shaft 20 and the third shift gear shaft 42 through the first shift gear 19 and the third shift gear 41 without friction, respectively.

The torque delivery path for the first speed ratio for the four-speed transaxle 10 includes the second sun gear 23, which is driven by the electric motor through the input shaft 14, the plurality of second planet gears 24, the second ring gear 25 locked which provides the torque reaction point for the second planetary gear set, the second carrier 27 transmits the torque from the input shaft 14 through the driving gear 32 and the driven gear 33 to the third carrier 36 and the fourth sun gear 45, the plurality of fourth planet gears 46, the fourth ring gear 39 locked which provides the torque reaction point for the fourth planetary gear set, the fourth carrier 38 transmits the torque from the second carrier 27 to the differential assembly 52 through the differential carrier, the differential assembly 52 transmits the torque to the left side shaft 53 and the right side shaft 54.

Based on size constrains and the planetary gear sets, which are well known in the art, the relationship between the motor rotor 11 rotational speed and the differential carrier of the differential assembly 52 rotational speed through the first speed ratio of the four-speed transaxle 10 are selected based on gear teeth ratios:

$$Ni=(Z6/Z5)((Z3+Z4)/Z3)((Z9+Z10)/Z9)No$$

Where:
Z1 is the number of gear teeth of the first sun gear 15.
Z2 is the number of inner gear teeth of the first ring gear 18.
Z3 is the number of gear teeth of the second sun gear 23.
Z4 is the number of gear teeth of the second ring gear 25.
Z5 is the number of gear teeth of the driving gear 32.
Z6 is the number of gear teeth of the driven gear 33.
Z7 is the number of gear teeth of the third sun gear 34.
Z8 is the number of gear teeth of the third ring gear 37.
Z9 is the number of gear teeth of the fourth sun gear 45.
Z10 is the number of gear teeth of the fourth ring gear 39.
Ni is the rotational speed of the electric motor rotor 11.
No is the rotational speed of the differential carrier of the differential assembly 52.

These symbols are used in the present invention, except for special instruction.

Second Speed Ratio

Second speed ratio results when the second electric caliper brake system 31 and the third electric caliper brake system 44 are disengaged and the first electric caliper brake system 22 and the fourth electric brake system 51 are engaged. The clearance is kept up between the left and right pad plates 31e, 31g and the second dry disc 30. The clearance is also kept up between the left and right pad plates 44e, 44g and the third dry disc 43. There are setting pressure force from the shifting motor 22a is used to push the left and right pairs of screw-nut to move the left and right pad plates 22e, 22g braking the first dry disc 21. There are also setting pressure force from the shifting motor 51a is used to push the left and right pairs of screw-nut to move the left and right pad plates 51e, 51g braking the fourth dry disc 50. Because the first shift gear shaft 20 which is fixedly secured to the first dry disc 21, and the first shift gear 19 is fixedly secured to the first shift gear shaft 20 and meshingly engages the outer gear teeth of the first ring gear 18, so the first ring gear 18 is locked which provides the torque reaction point for the first planetary gear set. At the same time, because the fourth shift gear shaft 49 which is fixedly secured to the fourth dry disc 50, and the fourth shift gear 48 is fixedly secured to the fourth shift gear shaft 49 and meshingly engages the fourth connecting gear 47, so the fourth ring gear 39 is locked which provides the torque reaction point for the fourth planetary gear set. The second ring gear 25 and the third sun gear 34 drive the second dry disc 30 and the third dry disc 43 to freely rotatably around the second shift gear shaft 29 and the third shift gear shaft 42 through the second shift gear 28 and the third shift gear 41 without friction, respectively.

The torque delivery path for the second speed ratio for the four-speed transaxle 10 includes the first sun gear 15 and the second sun gear 23, which are driven by the electric motor through the input shaft 14, the plurality of first and second planet gears 16 and 24, the first carrier 17 and the second ring gear 25, the first ring gear 18 locked which provides the torque reaction point for the first planetary gear set, the second carrier 27 transmits the torque from the input shaft 14 through the driving gear 32 and the driven gear 33 to the third carrier 36 and the fourth sun gear 45, the plurality of fourth planet gears 46, the fourth ring gear 39 locked which provides the torque reaction point for the fourth planetary gear set, the fourth carrier 38 transmits the torque from the second carrier 27 to the differential assembly 52 through the differential carrier, the differential assembly 52 transmits the torque to the left side shaft 53 and the right side shaft 54.

Based on size constrains and the planetary gear sets, which are well known in the art, the relationship between the motor rotor 11 rotational speed and the differential carrier of the differential assembly 52 rotational speed through the second speed ratio of the four-speed transaxle 10 are selected based on gear teeth ratios:

$$Ni=(Z6/Z5)((Z1Z3+Z1Z4+Z2Z3+Z2Z4)/(Z1Z3+Z2Z3+Z1Z4))((Z9+Z10)/Z9)No$$

Third Speed Ratio

Third speed ratio results when the first electric caliper brake system 22 and the fourth electric caliper brake system 51 are disengaged and the second electric caliper brake system 31 and the third electric brake system 44 are engaged. The clearance is kept up between the left and right pad plates 22e, 22g and the first dry disc 21. The clearance is also kept up between the left and right pad plates 51e, 51g and the fourth dry disc 50. There are setting pressure force from the shifting motor 31a is used to push the left and right pairs of screw-nut to move the left and right pad plates 31e, 31g braking the second dry disc 30. There are also setting pressure force from the shifting motor 44a is used to push the left and right pairs of screw-nut to move the left and right pad plates 44e, 44g braking the third dry disc 43. Because the second shift gear shaft 29 which is fixedly secured to the second dry disc 30, and the second shift gear 28 is fixedly secured to the second shift gear shaft 29 and meshingly engages the outer gear teeth 26 of the second ring gear 25, so the second ring gear 25 is locked which provides the torque reaction point for the second planetary gear set. At the same time, because the third shift gear shaft 42 which is fixedly secured to the third dry disc 43, and the third shift gear 41 is fixedly secured to the third shift gear shaft 42 and meshingly engages the third connecting gear 40, so the third sun gear 34 is locked which provides the torque reaction point for the third planetary gear set. The first ring gear 18 and the fourth ring gear 39 drive the first dry disc 21 and the fourth dry disc 50 to freely rotatably around the first shift gear shaft 20 and the fourth shift gear shaft 49 through the first shift gear 19 and the fourth shift gear 48 without friction, respectively.

The torque delivery path for the third speed ratio for the four-speed transaxle 10 includes the second sun gear 23, which is driven by the electric motor through the input shaft 14, the plurality of second planet gears 24, the second ring gear 25 locked which provides the torque reaction point for the second planetary gear set, the second carrier 27 transmits the torque from the input shaft 14 through the driving gear 32 and the driven gear 33 to the third carrier 36 and the fourth sun gear 45, the plurality of third and fourth planet gears 35 and 46, the third and fourth ring gear 39 and 39, the third sun gear 34 locked which provides the torque reaction point for the third planetary gear set, the fourth carrier 38 transmits the torque from the second carrier 27 to the differential assembly 52 through the differential carrier, the differential assembly 52 transmits the torque to the left side shaft 53 and the right side shaft 54.

Based on size constrains and the planetary gear sets, which are well known in the art, the relationship between the motor rotor 11 rotational speed and the differential carrier of the differential assembly 52 rotational speed through the third speed ratio of the four-speed transaxle 10 are selected based on gear teeth ratios:

$$Ni=(Z6/Z5)((Z3+Z4)/Z3)((Z8Z9+Z8Z10)/(Z8Z9+Z7Z10+Z8Z10))No$$

Fourth Speed Ratio

Fourth speed ratio results when the second electric caliper brake system 31 and the fourth electric caliper brake system 51 are disengaged and the first electric caliper brake system 22 and the third electric brake system 44 are engaged. The clearance is kept up between the left and right pad plates 31e, 31g and the second dry disc 30. The clearance is also kept up between the left and right pad plates 51e, 51g and the fourth dry disc 50. There are setting pressure force from the shifting motor 22a is used to push the left and right pairs of screw-nut to move the left and right pad plates 22e, 22g braking the first dry disc 21. There are also setting pressure force from the shifting motor 44a is used to push the left and right pairs of screw-nut to move the left and right pad plates 44e, 44g braking the third dry disc 43. Because the first shift gear shaft 20 which is fixedly secured to the first dry disc 21, and the first shift gear 19 is fixedly secured to the first shift gear shaft 20 and meshingly engages the outer gear teeth of the first ring gear 18, so the first ring gear 18 is locked which provides the torque reaction point for the first planetary gear set. At the same time, because the third shift gear shaft 42 which is fixedly secured to the third dry disc 43, and the third shift gear 41 is fixedly secured to the third shift gear shaft 42 and meshingly engages the third connecting gear 40, so the third sun gear 34 is locked which provides the torque reaction point for the third planetary gear set. The second ring gear 25 and the fourth ring gear 39 drive the second dry disc 30 and the fourth dry disc 50 to freely rotatably around the second shift gear shaft 29 and the fourth shift gear shaft 49 through the second shift gear 28 and the fourth shift gear 48 without friction, respectively.

The torque delivery path for the second speed ratio for the four-speed transaxle 10 includes the first sun gear 15 and the second sun gear 23, which are driven by the electric motor through the input shaft 14, the plurality of first and second planet gears 16 and 24, the first carrier 17 and the second ring gear 25, the first ring gear 18 locked which provides the torque reaction point for the first planetary gear set, the second carrier 27 transmits the torque from the input shaft 14 through the driving gear 32 and the driven gear 33 to the third carrier 36 and the fourth sun gear 45, the plurality of third and fourth planet gears 35 and 46, the third and fourth ring gear 39 and 39, the third sun gear 34 locked which provides the torque reaction point for the third planetary gear set, the fourth carrier 38 transmits the torque from the second carrier 27 to the differential assembly 52 through the differential carrier, the differential assembly 52 transmits the torque to the left side shaft 53 and the right side shaft 54.

Based on size constrains and the planetary gear sets, which are well known in the art, the relationship between the motor rotor 11 rotational speed and the differential carrier of the differential assembly 52 rotational speed through the fourth speed ratio of the four-speed transaxle 10 are selected based on gear teeth ratios:

$$Ni=(Z6/Z5)((Z1Z3+Z1Z4+Z2Z3+Z2Z4)/(Z1Z3+Z2Z3+Z1Z4))((Z8Z9+Z8Z10)/(Z8Z9+Z7Z10+Z8Z10))No$$

Description of a Second Alternative Embodiment

Figure 2A:
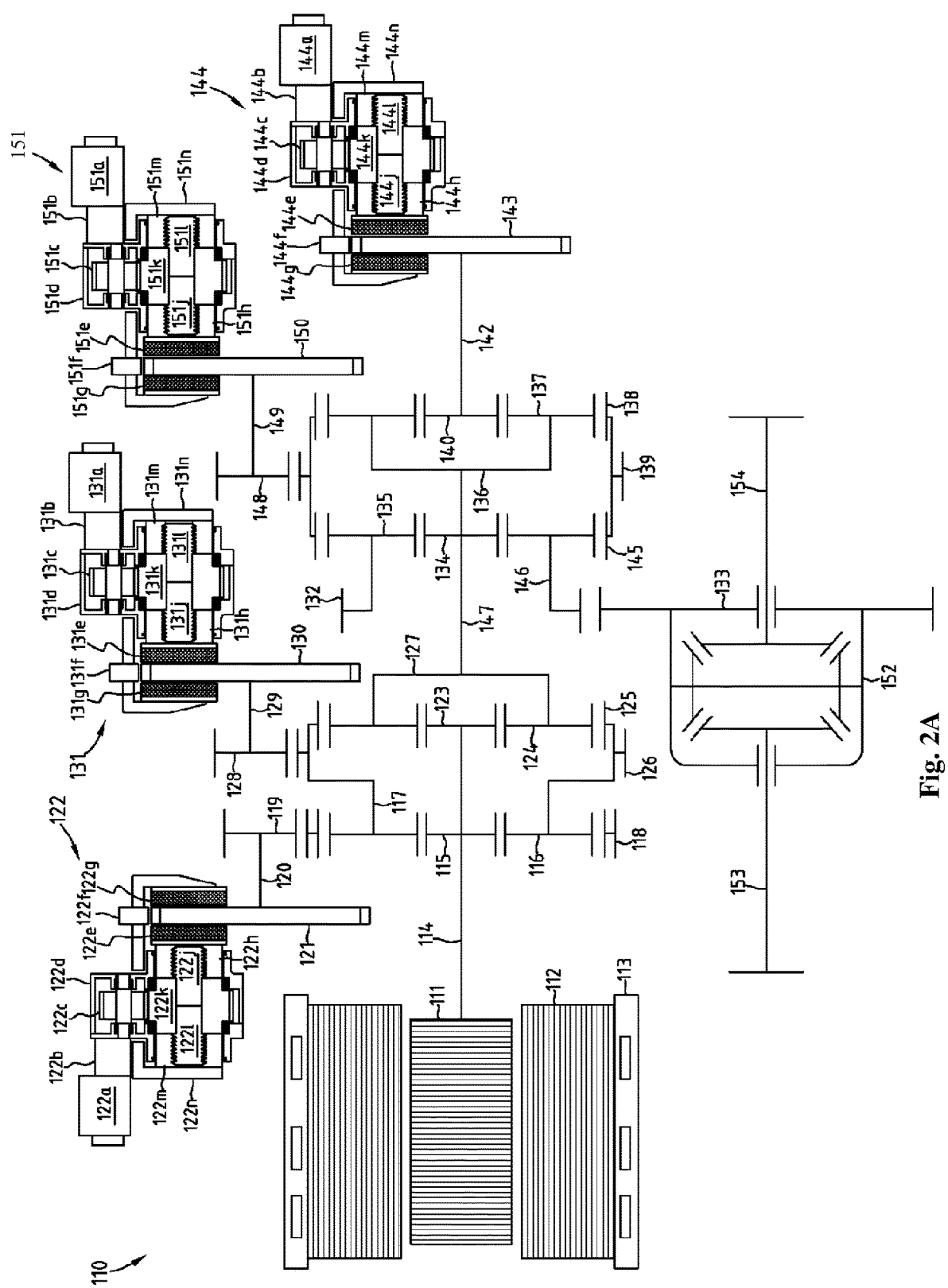
FIG. 2A is a schematic representation of the four-speed transaxle according to a second embodiment.
Figure 2B:
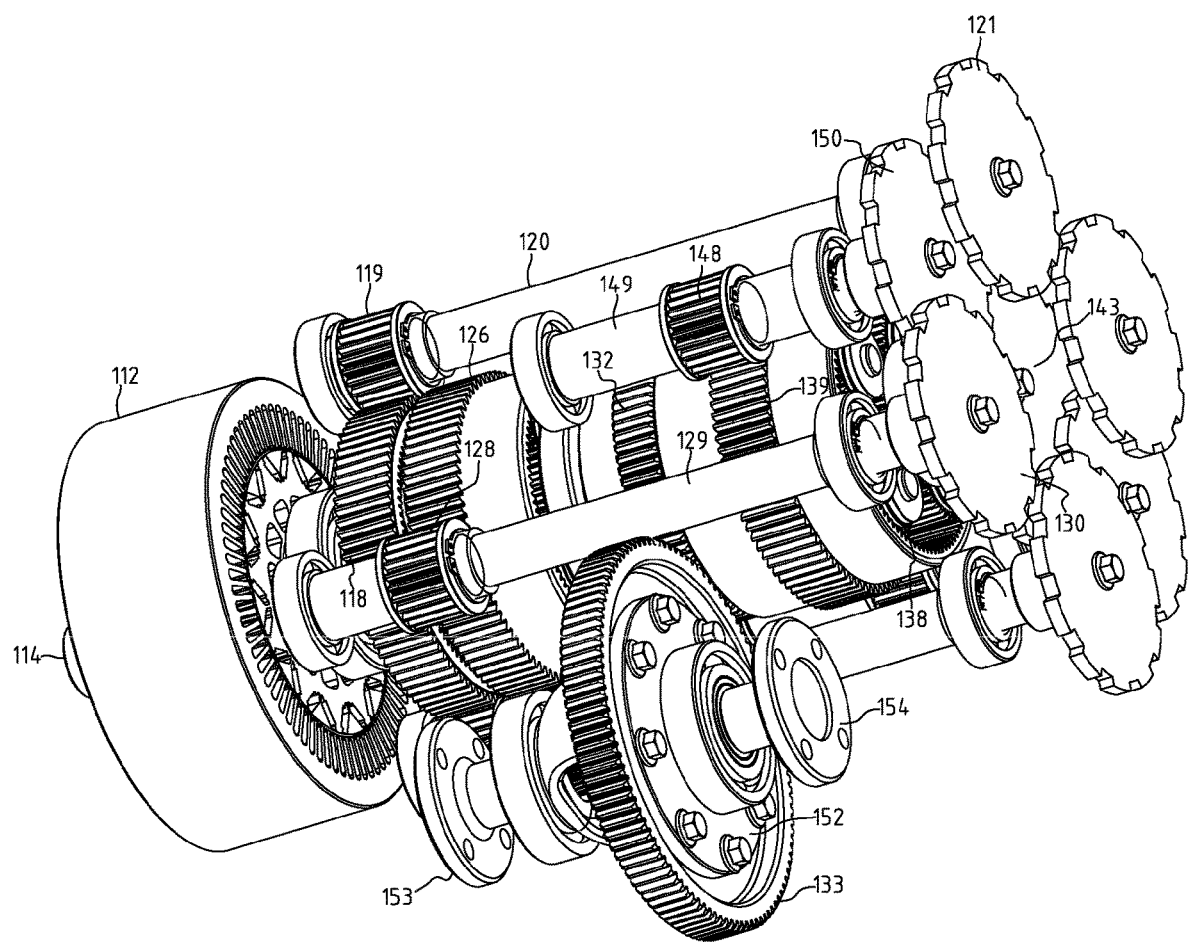
FIG. 2B is a partial sectional view showing the four-speed transaxle in FIG. 2A.

A second alternative and also a highly preferred form of a four-speed transaxle embodying the concepts of the present invention, is designated generally by the numeral 110 on the FIGS. 2A and 2B. With particular reference to FIG. 2A, it well be observed that the four-speed transaxle 110 utilizes four planetary gear sets. The electric motor is coaxially aligned with four planetary gear sets. The four-speed transaxle 110 has an input member 114 that may be in the nature of shaft which may be directly driven by an electric motor rotor 111. The input shaft 114 is successively connected to a first sun gear 115 in a first planetary gear set and a second sun gear 123 in a second planetary gear set in the four-speed transaxle 110. A differential assembly 152 comprises a differential carrier, which is rotatingly driveable around its axis, as well as a left shaft 153 and a right shaft 154.

The first planetary gear set has a first inner gear member 118, which may generally be designated as the first ring gear 118, which circumscribes a first outer gear member 115, generally designated as the first sun gear 115. A plurality of first planet gear members 116 are rotatably mounted on a first carrier 117 such that each first planet gear 116 meshingly engages both the first ring gear 118 and the first sun gear 115. The first ring gear 118 has both the internal and external teeth. There are two symmetrically arranged a first shift gear systems. The first shift gear system comprises a first shift gear 119 which meshingly engages the outer gear teeth of the first ring gear 118 and a first shift gear shaft 120 which is fixedly secured to a first dry disc 121. The first shift gear 119 is fixedly secured to the other end of the first shift gear shaft 120.

The second planetary gear set has a second inner gear member 125, which may generally be designated as a second ring gear 125, which circumscribes a second outer gear member 123, generally designated as the second sun gear 123. A plurality of second planet gear members 124 are rotatably mounted on a second carrier 127 such that each second planet gear 124 meshingly engages both the second ring gear 125 and the second sun gear 123. The second ring gear 125 has both the internal and external teeth 126. There are two symmetrically arranged a second shift gear systems. The second shift gear system comprises a second shift gear 128 which meshingly engages the outer gear teeth 126 of the second ring gear 125 and a second shift gear shaft 129 which is fixedly secured to a second dry disc 130. The second shift gear 128 is fixedly secured to the other end of the second shift gear shaft 129.

The third planetary gear set has a third inner gear member 145, which may generally be designated as the third ring gear 145, which circumscribes a third outer gear member 134, generally designated as the third sun gear 134. A plurality of third planet gear members 135 are rotatably mounted on a third carrier 146 such that each third planet gear 135 meshingly engages both the third ring gear 145 and the third sun gear 134.

The fourth planetary gear set has a fourth inner gear member 138, which may generally be designated as the fourth ring gear 138, which circumscribes a fourth outer gear member 140, generally designated as the fourth sun gear 140. A plurality of fourth planet gear members 137 are rotatably mounted on a fourth carrier 136 such that each fourth planet gear 137 meshingly engages both the fourth ring gear 138 and the fourth sun gear 140.

A connecting gear 139 has an outer tooth structure, which is mounted on the outer circumference of the whole ring formed by the third ring gear 145 and the fourth ring gear 138. There are two symmetrically arranged a fourth shift gear system. The fourth shift gear system comprises a fourth shift gear 148 which meshingly engages the connecting gear 139 and a fourth shift gear shaft 149 which is fixedly secured to a fourth dry disc 150. The fourth shift gear 148 is fixedly secured to the other end of the fourth shift gear shaft 149. The fourth sun gear 140 is fixedly secured to a third dry disc 143 through a third shift gear shaft 142.

The first carrier 117 is fixedly connected to the second ring gear 125. A driving gear 132 is fixed for rotation with the third carrier 132 providing power from the third and fourth planetary gear sets. The second carrier 127 is successively connected to the third sun gear 134 and the fourth carrier 140 through a middle shaft 147. The driving gear 132 meshingly engages a driven gear 133. The driven gear 133 is fixed for rotation with the differential carrier of the differential assembly 152. The differential assembly 152 distributes output torque from the electric motor to left and right wheels of an electric vehicle by the left shaft 153 and the right shaft 154.

A first electric caliper brake system 122 is floating caliper architecture, comprises a shifting motor 122a, a shifting reducer 122b, a casing 122d, a shifting driving gear 122c, a shifting driven gear 122k, a left nut 122m, a left screw 122l, a right nut 122h, a right screw 122j, a left pad plate 122e, a right pad plate 122g, a speed sensor 122f for watching state of the first dry disc 121 as well as a floating caliper 122n. The first electric caliper brake system 122, the left pad plate 122e and the right pad plate 122g are pressed against the first dry disc 121 by the right pair of screw-nut and the left pair of screw-nut inside the floating caliper 122n, respectively, driven by the shifting driven gear 122k power from the shifting driving gear 122c by using the shifting motor 122a. The first electric caliper brake system 122 and the first dry disc 121 are mounted on outside of the transaxle housing. A plurality of speed teeth are uniformly processed on the circumferential surface of the first dry disc 121. There is a clearance about 2 mm between the speed sensor 122f and the circumferential surface of the first dry disc 121. There is a clearance about 0.2 mm between the left and right pad plates 122e, 122g and the first dry disc 121. The shifting motor 122a and the shifting reducer 122b are fixedly secured to outside surface of the casing 122d. The casing 122d is fixedly secured to outside surface the transaxle housing by two guide bolts. The floating caliper 122n mounted on the casing 122d can move along the two guide bolts. The ends of the left screw 122l and the right screw 122j are fixed in an inner hole of the shifting driven gear 122k. The end of the left nut 122m is contacted with an inner wall of the floating caliper 122n. The end of the right nut 122h is contacted with the wall of the left pad plate 122e. The wall of the right pad plate 122g is contacted with the other inner wall of the floating caliper 122n. The speed sensor 122f is mounted on the top of the floating caliper 122n.

A second electric caliper brake system 131 is floating caliper architecture, comprises a shifting motor 131a, a shifting reducer 131b, a casing 131d, a shifting driving gear 131c, a shifting driven gear 131k, a left nut 131m, a left screw 131l, a right nut 131h, a right screw 131j, a left pad plate 131e, a right pad plate 131g, a speed sensor 131f for watching state of the second dry disc 130 as well as a floating caliper 131n. The second electric caliper brake system 131, the left pad plate 131e and the right pad plate 131g are pressed against the second dry disc 130 by the right pair of screw-nut and the left pair of screw-nut inside the floating caliper 131n, respectively, driven by the shifting driven gear 131k power from the shifting driving gear 131c by using the shifting motor 131a. The second electric caliper brake system 131 and the second dry disc 130 are mounted on outside of the transaxle housing. A plurality of speed teeth are uniformly processed on the circumferential surface of the second dry disc 130. There is a clearance about 2 mm between the speed sensor 131*f* and the circumferential surface of the second dry disc 130. There is a clearance about 0.2 mm between the left and right pad plates 131*e*, 131*g* and the second dry disc 130. The shifting motor 131*a* and the shifting reducer 131*b* are fixedly secured to outside surface of the casing 131*d*. The casing 131*d* is fixedly secured to outside surface the transaxle housing by two guide bolts. The floating caliper 131*n* mounted on the casing 131*d* can move along the two guide bolts. The ends of the left screw 131*l* and the right screw 131*j* are fixed in an inner hole of the shifting driven gear 131*k*. The end of the left nut 131*m* is contacted with an inner wall of the floating caliper 131*n*. The end of the right nut 131*h* is contacted with the wall of the left pad plate 131*e*. The wall of the right pad plate 131*g* is contacted with the other inner wall of the floating caliper 131*n*. The speed sensor 131*f* is mounted on the top of the floating caliper 131*n*.

A third electric caliper brake system 144 is floating caliper architecture, comprises a shifting motor 144*a*, a shifting reducer 144*b*, a casing 144*d*, a shifting driving gear 144*c*, a shifting driven gear 144*k*, a left nut 144*m*, a left screw 144*l*, a right nut 144*h*, a right screw 144*j*, a left pad plate 144*e*, a right pad plate 144*g*, a speed sensor 144*f* for watching state of the third dry disc 143 as well as a floating caliper 144*n*. The third electric caliper brake system 144, the left pad plate 144*e* and the right pad plate 144*g* are pressed against the third dry disc 143 by the right pair of screw-nut and the left pair of screw-nut inside the floating caliper 144*n*, respectively, driven by the shifting driven gear 144*k* power from the shifting driving gear 144*c* by using the shifting motor 144*a*. The third electric caliper brake system 144 and the third dry disc 143 are mounted on outside of the transaxle housing. A plurality of speed teeth are uniformly processed on the circumferential surface of the third dry disc 143. There is a clearance about 2 mm between the speed sensor 144*f* and the circumferential surface of the third dry disc 143. There is a clearance about 0.2 mm between the left and right pad plates 144*e*, 144*g* and the third dry disc 143. The shifting motor 144*a* and the shifting reducer 144*b* are fixedly secured to outside surface of the casing 144*d*. The casing 144*d* is fixedly secured to outside surface the transaxle housing by two guide bolts. The floating caliper 144*n* mounted on the casing 144*d* can move along the two guide bolts. The ends of the left screw 144*l* and the right screw 144*j* are fixed in an inner hole of the shifting driven gear 144*k*. The end of the left nut 144*m* is contacted with an inner wall of the floating caliper 144*n*. The end of the right nut 144*h* is contacted with the wall of the left pad plate 144*e*. The wall of the right pad plate 144*g* is contacted with the other inner wall of the floating caliper 144*n*. The speed sensor 144*f* is mounted on the top of the floating caliper 144*n*.

The fourth electric caliper brake system 151 is floating caliper architecture, comprises shifting motor 151*a*, shifting reducer 151*b*, a casing 151*d*, shifting driving gear 151*c*, shifting driven gear 151*k*, a left nut 151*m*, a left screw 151*l*, a right nut 151*h*, a right screw 151*j*, a left pad plate 151*e*, right pad plate 151*g*, a speed sensor 151*f* for watching state of the fourth dry disc 150 as well as a floating caliper 151*n*. The fourth electric caliper brake system 151, the left pad plate 151*e* and the right pad plate 151*g* are pressed against the fourth dry disc 150 by the right pair of screw-nut and the left pair of screw-nut inside the floating caliper 151*n*, respectively, driven by the shifting driven gear 151*k* power from the shifting driving gear 151*c* by using the shifting motor 151*a*. The fourth electric caliper brake system 151 and the fourth dry disc 150 are mounted on outside of the transaxle housing. A plurality of speed teeth are uniformly processed on the circumferential surface of the fourth dry disc 150. There is a clearance about 2 mm between the speed sensor 151*f* and the circumferential surface of the fourth dry disc 150. There is a clearance about 0.2 mm between the left and right pad plates 151*e*, 151*g* and the fourth dry disc 150. The shifting motor 151*a* and the shifting reducer 151*b* are fixedly secured to outside surface of the casing 151*d*. The casing 151*d* is fixedly secured to outside surface the transaxle housing by two guide bolts. The floating caliper 151*n* mounted on the casing 151*d* can move along the two guide bolts. The ends of the left screw 151*l* and the right screw 151*j* are fixed in an inner hole of the shifting driven gear 151*k*. The end of the left nut 151*m* is contacted with an inner wall of the floating caliper 151*n*. The end of the right nut 151*h* is contacted with the wall of the left pad plate 151*e*. The wall of the right pad plate 151*g* is contacted with the other inner wall of the floating caliper 151*n*. The speed sensor 151*f* is mounted on the top of the floating caliper 151*n*.

In response to an operator's action, the control device (not shown) determines what is required and then manipulates the selectively operated components of the four-speed transaxle 110 appropriately to respond to the operator demand. Four speed ratios are provided by changing the states of four electric caliper brake systems. The power supplied by the four-speed transaxle 110 is predicated solely by the power delivered to the four-speed transaxle 110 from the electric motor. To produce the four fixed speed ratios, there are four delivery paths obtained by selecting the first, second, third and fourth electric caliper brake systems to disengage and engage.

First speed ratio results when the first electric caliper brake system 122 and the third electric caliper brake system 144 are disengaged and the second electric caliper brake system 131 and the fourth electric brake system 151 are engaged. And then, the second ring gear 125 and the third ring gear 145 are locked.

Second speed ratio results when the second electric caliper brake system 131 and the third electric caliper brake system 144 are disengaged and the first electric caliper brake system 122 and the fourth electric brake system 151 are engaged. And then, the first ring gear 118 and the third ring gear 145 are locked.

Third speed ratio results when the first electric caliper brake system 122 and the fourth electric caliper brake system 151 are disengaged and the second electric caliper brake system 131 and the third electric brake system 144 are engaged. And then, the second ring gear 125 and the fourth sun gear 140 are locked.

Fourth speed ratio results when the second electric caliper brake system 131 and the fourth electric caliper brake system 151 are disengaged and the first electric caliper brake system 122 and the third electric brake system 144 are engaged. And then, the first ring gear 118 and the fourth sun gear 140 are locked.

Description of a Third Alternative Embodiment

Figure 3:
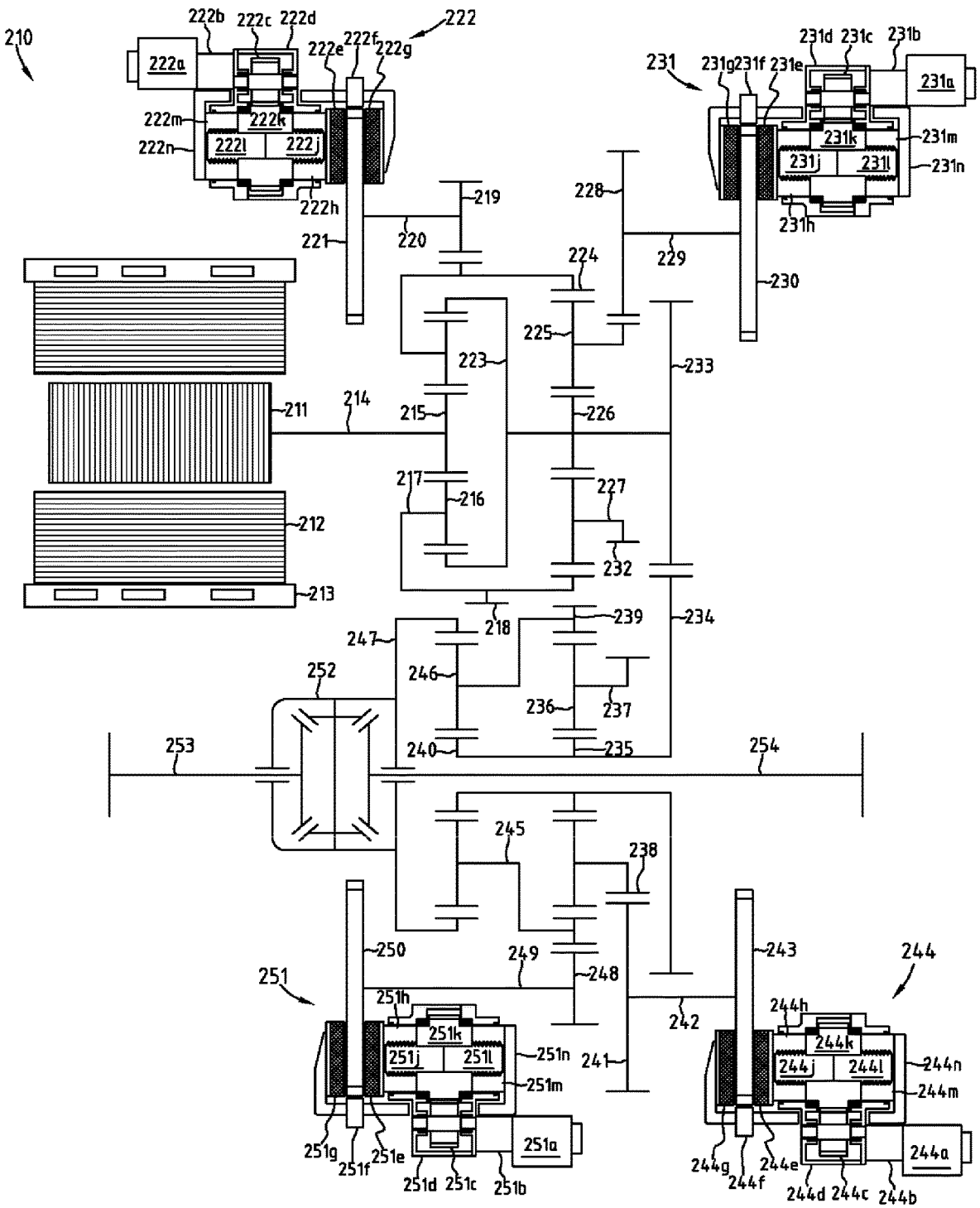
FIG. 3 is a schematic representation of the four-speed transaxle according to a third embodiment.

A third alternative and also a highly preferred form of a four-speed transaxle embodying the concepts of the present invention, is designated generally by the numeral 210 on the FIG. 3. It well be observed that the four-speed transaxle 210 utilizes four planetary gear sets. The electric motor is coaxially aligned with the first and second planetary gear sets. A differential assembly 252 is coaxially aligned with the third and fourth planetary gear sets. The four-speed transaxle 210 has an input member 214 that may be in the nature of shaft which may be directly driven by an electric motor rotor 211. The input shaft 214 is connected to a first sun gear 215 in a first planetary gear set in the four-speed transaxle 210.

The first planetary gear set has a first inner gear member 223, which may generally be designated as a first ring gear 223, which circumscribes a first outer gear member 215, generally designated as the first sun gear 215. A plurality of first planet gear members 216 are rotatably mounted on a first carrier 217 such that each first planet gear 216 meshingly engages both the first ring gear 223 and the first sun gear 215. A first connecting gear 218 has an outer tooth structure, which is mounted on the outer circumference of the whole ring formed by the first carrier 217 and a second ring gear 224. There are two symmetrically arranged a first shift gear systems. The first shift gear system comprises a first shift gear 219 which meshingly engages the outer gear teeth of the first connecting gear 218 and a first shift gear shaft 220 which is fixedly secured to a first dry disc 221. The first shift gear 219 is fixedly secured to the other end of the first shift gear shaft 220.

The second planetary gear set has a second inner gear member 224, which may generally be designated as a second ring gear 224, which circumscribes a second outer gear member 226, generally designated as a second sun gear 226. A plurality of second planet gear members 225 are rotatably mounted on a second carrier 227 such that each second planet gear 225 meshingly engages both the second ring gear 224 and the second sun gear 226. A second connecting gear 232 is mounted on the second carrier gear 227. There are two symmetrically arranged a second shift gear systems. The second shift gear system comprises a second shift gear 228 which meshingly engages the outer gear teeth of the second connecting gear 232 and a second shift gear shaft 229 which is fixedly secured to a second dry disc 230. The second shift gear 228 is fixedly secured to the other end of the second shift gear shaft 229.

The third planetary gear set has a third inner gear member 239, which may generally be designated as a third ring gear 239, which circumscribes a third outer gear member 235, generally designated as a third sun gear 235. A plurality of third planet gear members 236 are rotatably mounted on a third carrier 237 such that each third planet gear 236 meshingly engages both the third ring gear 239 and the third sun gear 235. A third connecting gear 232 is mounted on the third carrier 237. There are two symmetrically arranged a third shift gear systems. The third shift gear system comprises a third shift gear 241 which meshingly engages the outer gear teeth of the third connecting gear 238 and a third shift gear shaft 242 which is fixedly secured to a third dry disc 243. The third shift gear 241 is fixedly secured to the other end of the third shift gear shaft 242. The third ring gear 239 has both the internal and external teeth. There are two symmetrically arranged a fourth shift gear systems. The fourth shift gear system comprises a fourth shift gear 248 which meshingly engages the outer gear teeth of the third ring gear 239 and a fourth shift gear shaft 249 which is fixedly secured to a fourth dry disc 250. The fourth shift gear 248 is fixedly secured to the other end of the fourth shift gear shaft 249.

The fourth planetary gear set has a fourth inner gear member 247, which may generally be designated as the fourth ring gear 247, which circumscribes a fourth outer gear member 240, generally designated as the fourth sun gear 240. A plurality of fourth planet gear members 246 are rotatably mounted on a fourth carrier 245 such that each fourth planet gear 246 meshingly engages both the fourth ring gear 247 and the fourth sun gear 240.

The first carrier 217 is fixedly connected to the second ring gear 224. A driving gear 233 is successively fixed for rotation with the second sun gear 226 and the first ring gear 223 providing power from the first and second planetary gear sets. A driven gear 234 is successively fixed for rotation with the third sun gear 235 and the fourth sun gear 240 providing power from the third and fourth planetary gear sets. The fourth carrier 245 is fixedly connected to the third ring gear 239. The driving gear 233 meshingly engages the driven gear 234.

The forth ring gear 247 is fixed for rotation with the differential carrier of the differential assembly 252. The differential assembly 252 distributes output torque from the electric motor to left and right wheels of an electric vehicle by a left shaft 253 and a right shaft 254.

A first electric caliper brake system 222 is floating caliper architecture, comprises a shifting motor 222a, a shifting reducer 222b, a casing 222d, shifting driving gear 222c, a shifting driven gear 222k, a left nut 222m, a left screw 222l, a right nut 222h, a right screw 222j, a left pad plate 222e, a right pad plate 222g, a speed sensor 222f for watching state of the first dry disc 221 as well as a floating caliper 222n. The first electric caliper brake system 222, the left pad plate 222e and the right pad plate 222g are pressed against the first dry disc 221 by the right pair of screw-nut and the left pair of screw-nut inside the floating caliper 222n, respectively, driven by the shifting driven gear 222k power from the shifting driving gear 222c by using the shifting motor 222a. The first electric caliper brake system 222 and the first dry disc 221 are mounted on outside of the transaxle housing. A plurality of speed teeth are uniformly processed on the circumferential surface of the first dry disc 221. There is a clearance about 2 mm between the speed sensor 222f and the circumferential surface of the first dry disc 221. There is a clearance about 0.2 mm between the left and right pad plates 222e, 222g and the first dry disc 221. The shifting motor 222a and the shifting reducer 222b are fixedly secured to outside surface of the casing 222d. The casing 222d is fixedly secured to outside surface the transaxle housing by two guide bolts. The floating caliper 222n mounted on the casing 222d can move along the two guide bolts. The ends of the left screw 222l and the right screw 222j are fixed in an inner hole of the shifting driven gear 222k. The end of the left nut 222m is contacted with an inner wall of the floating caliper 222n. The end of the right nut 222h is contacted with the wall of the left pad plate 222e. The wall of the right pad plate 222g is contacted with the other inner wall of the floating caliper 222n. The speed sensor 222f is mounted on the top of the floating caliper 222n.

A second electric caliper brake system 231 is floating caliper architecture, comprises a shifting motor 231a, a shifting reducer 231b, a casing 231d, shifting driving gear 231c, a shifting driven gear 231k, a left nut 231m, a left screw 231l, a right nut 231h, a right screw 231j, a left pad plate 231e, a right pad plate 231g, a speed sensor 231f for watching state of the second dry disc 230 as well as a floating caliper 231n. The second electric caliper brake system 231, the left pad plate 231e and the right pad plate 231g are pressed against the second dry disc 230 by the right pair of screw-nut and the left pair of screw-nut inside the floating caliper 231n, respectively, driven by the shifting driven gear 231k power from the shifting driving gear 231c by using the shifting motor 231a. The second electric caliper brake system 231 and the second dry disc 230 are mounted on outside of the transaxle housing. A plurality of speed teeth are uniformly processed on the circumferential surface of the second dry disc 230. There is a clearance about 2 mm between the speed sensor 231f and the circumferential surface of the second dry disc 230. There is a clearance about 0.2 mm between the left and right pad plates 231e, 231g and the second dry disc 230. The shifting motor 231a and the shifting reducer 231b are fixedly secured to outside surface of the casing 231d. The casing 231d is fixedly secured to outside surface the transaxle housing by two guide bolts. The floating caliper 231n mounted on the casing 231d can move along the two guide bolts. The ends of the left screw 231l and the right screw 231j are fixed in an inner hole of the shifting driven gear 231k. The end of the left nut 231m is contacted with an inner wall of the floating caliper 231n. The end of the right nut 231h is contacted with the wall of the left pad plate 231e. The wall of the right pad plate 231g is contacted with the other inner wall of the floating caliper 231n. The speed sensor 231f is mounted on the top of the floating caliper 231n.

A third electric caliper brake system 244 is floating caliper architecture, comprises a shifting motor 244a, a shifting reducer 244b, a casing 244d, shifting driving gear 244c, a shifting driven gear 244k, a left nut 244m, a left screw 244l, a right nut 244h, a right screw 244j, a left pad plate 244e, a right pad plate 244g, a speed sensor 244f for watching state of the third dry disc 243 as well as a floating caliper 244n. The third electric caliper brake system 244, the left pad plate 244e and the right pad plate 244g are pressed against the third dry disc 243 by the right pair of screw-nut and the left pair of screw-nut inside the floating caliper 244n, respectively, driven by the shifting driven gear 244k power from the shifting driving gear 244c by using the shifting motor 244a. The third electric caliper brake system 244 and the third dry disc 243 are mounted on outside of the transaxle housing. A plurality of speed teeth are uniformly processed on the circumferential surface of the third dry disc 243. There is a clearance about 2 mm between the speed sensor 244f and the circumferential surface of the third dry disc 243. There is a clearance about 0.2 mm between the left and right pad plates 244e, 244g and the third dry disc 243. The shifting motor 244a and the shifting reducer 244b are fixedly secured to outside surface of the casing 244d. The casing 244d is fixedly secured to outside surface the transaxle housing by two guide bolts. The floating caliper 244n mounted on the casing 244d can move along the two guide bolts. The ends of the left screw 244l and the right screw 244j are fixed in an inner hole of the shifting driven gear 244k. The end of the left nut 244m is contacted with an inner wall of the floating caliper 244n. The end of the right nut 244h is contacted with the wall of the left pad plate 244e. The wall of the right pad plate 244g is contacted with the other inner wall of the floating caliper 244n. The speed sensor 244f is mounted on the top of the floating caliper 244n.

A fourth electric caliper brake system 251 is floating caliper architecture, comprises a shifting motor 251a, a shifting reducer 251b, a casing 251d, a shifting driving gear 251c, a shifting driven gear 251k, a left nut 251m, a left screw 251l, a right nut 251h, a right screw 251j, a left pad plate 251e, a right pad plate 251g, a speed sensor 251f for watching state of the fourth dry disc 250 as well as a floating caliper 251n. The fourth electric caliper brake system 251, the left pad plate 251e and the right pad plate 251g are pressed against the fourth dry disc 250 by the right pair of screw-nut and the left pair of screw-nut inside the floating caliper 251n, respectively, driven by the shifting driven gear 251k power from the shifting driving gear 251c by using the shifting motor 251a. The fourth electric caliper brake system 251 and the fourth dry disc 250 are mounted on outside of the transaxle housing. A plurality of speed teeth are uniformly processed on the circumferential surface of the fourth dry disc 250. There is a clearance about 2 mm between the speed sensor 251f and the circumferential surface of the fourth dry disc 250. There is a clearance about 0.2 mm between the left and right pad plates 251e, 251g and the fourth dry disc 250. The shifting motor 251a and the shifting reducer 251b are fixedly secured to outside surface of the casing 251d. The casing 251d is fixedly secured to outside surface the transaxle housing by two guide bolts. The floating caliper 251n mounted on the casing 251d can move along the two guide bolts. The ends of the left screw 251l and the right screw 251j are fixed in an inner hole of the shifting driven gear 251k. The end of the left nut 251m is contacted with an inner wall of the floating caliper 251n. The end of the right nut 251h is contacted with the wall of the left pad plate 251e. The wall of the right pad plate 251g is contacted with the other inner wall of the floating caliper 251n. The speed sensor 251f is mounted on the top of the floating caliper 251n.

In response to an operator's action, the control device (not shown) determines what is required and then manipulates the selectively operated components of the four-speed transaxle 210 appropriately to respond to the operator demand. Four speed ratios are provided by changing the states of four electric caliper brake systems. The power supplied by the four-speed transaxle 210 is predicated solely by the power delivered to the four-speed transaxle 210 from the electric motor. To produce the four fixed speed ratios, there are four delivery paths obtained by selecting the first, second, third and fourth electric caliper brake systems to disengage and engage.

First speed ratio results when the first electric caliper brake system 222 and the third electric caliper brake system 244 are disengaged and the second electric caliper brake system 231 and the fourth electric brake system 251 are engaged. And then, the second carrier 227 and the third ring gear 239 are locked.

Second speed ratio results when the second electric caliper brake system 231 and the third electric caliper brake system 244 are disengaged and the first electric caliper brake system 222 and the fourth electric brake system 251 are engaged. And then, the first carrier 217 and the third ring gear 239 are locked.

Third speed ratio results when the first electric caliper brake system 222 and the fourth electric caliper brake system 251 are disengaged and the second electric caliper brake system 231 and the third electric brake system 244 are engaged. And then, the second carrier 227 and the third carrier 237 are locked.

Fourth speed ratio results when the second electric caliper brake system 231 and the fourth electric caliper brake system 251 are disengaged and the first electric caliper brake system 222 and the third electric brake system 244 are engaged. And then, the first carrier 217 and the third carrier 237 are locked.

Description of a Fourth Alternative Embodiment

Figure 4:
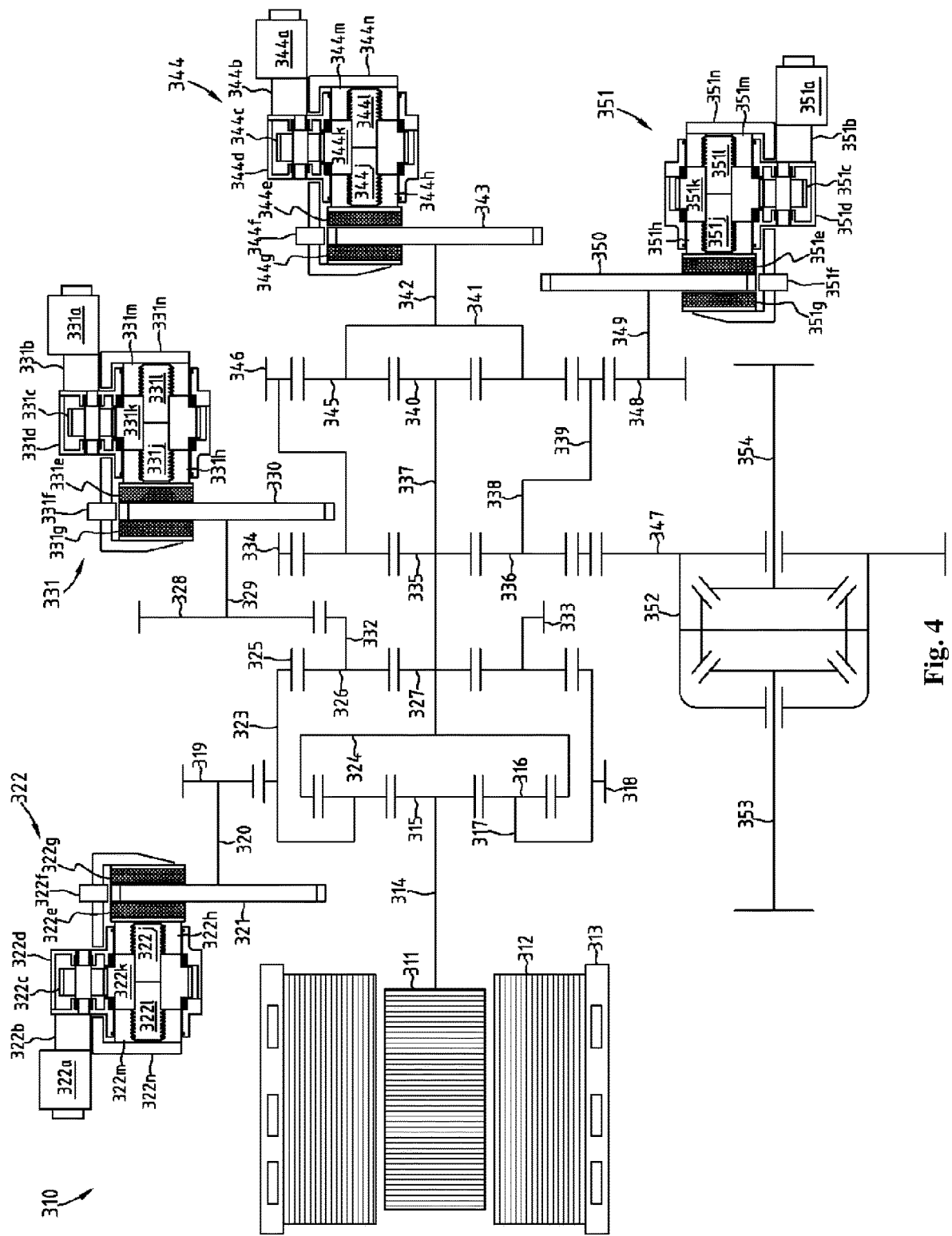
FIG. 4 is a schematic representation of the four-speed transaxle according to a fourth embodiment.

A fourth alternative and also a highly preferred form of a four-speed transaxle embodying the concepts of the present invention, is designated generally by the numeral 310 on the FIG. 4. It well be observed that the four-speed transaxle 310 utilizes four planetary gear sets. The electric motor is coaxially aligned with the four planetary gear sets. The four-speed transaxle 310 has an input member 314 that may be in the nature of shaft which may be directly driven by an electric motor rotor 311. The input shaft 314 is connected to a first sun gear 315 in a first planetary gear set in the four-speed transaxle 310.

A first planetary gear set has a first inner gear member 324, which may generally be designated as the first ring gear 324, which circumscribes a first outer gear member 315, generally designated as a first sun gear 315. A plurality of first planet gear members 316 are rotatably mounted on a first carrier 317 such that each first planet gear 316 meshingly engages both the first ring gear 324 and the first sun gear 315. A first connecting gear 318 has an outer tooth structure, which is mounted on the outer circumference of the whole ring 323 formed by the first carrier 317 and a second ring gear 325. There are two symmetrically arranged a first shift gear systems. The first shift gear system comprises a first shift gear 319 which meshingly engages the outer gear teeth of the first connecting gear 318 and a first shift gear shaft 320 which is fixedly secured to a first dry disc 321. The first shift gear 319 is fixedly secured to the other end of the first shift gear shaft 320.

A second planetary gear set has a second inner gear member 325, which may generally be designated as the second ring gear 325, which circumscribes a second outer gear member 327, generally designated as a second sun gear 327. A plurality of second planet gear members 326 are rotatably mounted on a second carrier 332 such that each second planet gear 326 meshingly engages both the second ring gear 325 and the second sun gear 327. A second connecting gear 333 is mounted on the second carrier gear 332. There are two symmetrically arranged a second shift gear systems. The second shift gear system comprises a second shift gear 328 which meshingly engages the outer gear teeth of the second connecting gear 333 and a second shift gear shaft 329 which is fixedly secured to a second dry disc 330. The second shift gear 328 is fixedly secured to the other end of the second shift gear shaft 329.

A third planetary gear set has a third inner gear member 334, which may generally be designated as a third ring gear 334, which circumscribes a third outer gear member 335, generally designated as a third sun gear 335. A plurality of third planet gear members 336 are rotatably mounted on a third carrier 338 such that each third planet gear 336 meshingly engages both the third ring gear 334 and the third sun gear 335.

A fourth planetary gear set has a fourth inner gear member 346, which may generally be designated as a fourth ring gear 346, which circumscribes a fourth outer gear member 340, generally designated as a fourth sun gear 340. A plurality of fourth planet gear members 345 are rotatably mounted on a fourth carrier 341 such that each fourth planet gear 345 meshingly engages both the fourth ring gear 346 and the fourth sun gear 340. The fourth carrier 341 is fixedly secured to a fourth dry disc 343 through a fourth shift gear shaft 342. The fourth ring gear 346 has both the internal and external teeth. There are two symmetrically arranged a fourth shift gear systems. The fourth shift gear system comprises a fourth shift gear 348 which meshingly engages the outer gear teeth of the fourth ring gear 346 and a fourth shift gear shaft 349 which is fixedly secured to a third dry disc 350. The fourth shift gear 348 is fixedly secured to the other end of the fourth shift gear shaft 349.

The first carrier 317 is fixedly connected to the second ring gear 325 through the whole ring 323. The first ring gear 324 is successively connected to the second sun gear 327, the third sun gear 335 and the fourth sun gear 340. The third ring gear 334 has both the internal and external teeth. The external teeth of the third ring gear 334 as a driving gear which meshingly engages a driven gear 347. The third carrier 338 is connected to the fourth ring gear 346 through a middle connecting member 339. The driven gear 347 is fixed for rotation with the differential carrier of a differential assembly 352. The differential assembly 352 distributes output torque from the electric motor to left and right wheels of an electric vehicle by the left shaft 353 and the right shaft 354.

A first electric caliper brake system 322 is floating caliper architecture, comprises a shifting motor 322a, a shifting reducer 322b, a casing 322d, shifting driving gear 322c, a shifting driven gear 322k, a left nut 322m, a left screw 322l, a right nut 322h, a right screw 322j, a left pad plate 322e, a right pad plate 322g, a speed sensor 322f for watching state of the first dry disc 321 as well as a floating caliper 322n. The first electric caliper brake system 322, the left pad plate 322e and the right pad plate 322g are pressed against the first dry disc 321 by the right pair of screw-nut and the left pair of screw-nut inside the floating caliper 322n, respectively, driven by the shifting driven gear 322k power from the shifting driving gear 322c by using the shifting motor 322a. The first electric caliper brake system 322 and the first dry disc 321 are mounted on outside of the transaxle housing. A plurality of speed teeth are uniformly processed on the circumferential surface of the first dry disc 321. There is a clearance about 2 mm between the speed sensor 322f and the circumferential surface of the first dry disc 321. There is a clearance about 0.2 mm between the left and right pad plates 322e, 322g and the first dry disc 321. The shifting motor 322a and the shifting reducer 322b are fixedly secured to outside surface of the casing 322d. The casing 322d is fixedly secured to outside surface the transaxle housing by two guide bolts. The floating caliper 322n mounted on the casing 322d can move along the two guide bolts. The ends of the left screw 322l and the right screw 322j are fixed in an inner hole of the shifting driven gear 322k. The end of the left nut 322m is contacted with an inner wall of the floating caliper 322n. The end of the right nut 322h is contacted with the wall of the left pad plate 322e. The wall of the right pad plate 322g is contacted with the other inner wall of the floating caliper 322n. The speed sensor 322f is mounted on the top of the floating caliper 322n.

A second electric caliper brake system 331 is floating caliper architecture, comprises shifting motor 331a, shifting reducer 331b, a casing 331d, shifting driving gear 331c, shifting driven gear 331k, a left nut 331m, a left screw 331l, a right nut 331h, a right screw 331j, a left pad plate 331e, a right pad plate 331g, a speed sensor 331f for watching state of the second dry disc 330 as well as a floating caliper 331n. The second electric caliper brake system 331, the left pad plate 331e and the right pad plate 331g are pressed against the second dry disc 330 by the right pair of screw-nut and the left pair of screw-nut inside the floating caliper 331n, respectively, driven by the shifting driven gear 331k power from the shifting driving gear 331c by using the shifting motor 331a. The second electric caliper brake system 331 and the second dry disc 330 are mounted on outside of the transaxle housing. A plurality of speed teeth are uniformly processed on the circumferential surface of the second dry disc 330. There is a clearance about 2 mm between the speed sensor 331f and the circumferential surface of the second dry disc 330. There is a clearance about 0.2 mm between the left and right pad plates 331e, 331g and the second dry disc 330. The shifting motor 331a and the shifting reducer 331b are fixedly secured to outside surface of the casing 331d. The casing 331d is fixedly secured to outside surface the transaxle housing by two guide bolts. The floating caliper 331n mounted on the casing 331d can move along the two guide bolts. The ends of the left screw 331l and the right screw 331j are fixed in an inner hole of the shifting driven gear 331k. The end of the left nut 331m is contacted with an inner wall of the floating caliper 331n. The end of the right nut 331h is contacted with the wall of the left pad plate 331e. The wall of the right pad plate 331g is contacted with the other inner wall of the floating caliper 331n. The speed sensor 331f is mounted on the top of the floating caliper 331n.

A third electric caliper brake system 344 is floating caliper architecture, comprises a shifting motor 344a, a shifting reducer 344b, a casing 344d, a shifting driving gear 344c, a shifting driven gear 344k, a left nut 344m, a left screw 344l, a right nut 344h, a right screw 344j, a left pad plate 344e, a right pad plate 344g, a speed sensor 344f for watching state of the third dry disc 343 as well as a floating caliper 344n. The third electric caliper brake system 344, the left pad plate 344e and the right pad plate 344g are pressed against the third dry disc 343 by the right pair of screw-nut and the left pair of screw-nut inside the floating caliper 344n, respectively, driven by the shifting driven gear 344k power from the shifting driving gear 344c by using the shifting motor 344a. The third electric caliper brake system 344 and the third dry disc 343 are mounted on outside of the transaxle housing. A plurality of speed teeth are uniformly processed on the circumferential surface of the third dry disc 343. There is a clearance about 2 mm between the speed sensor 344f and the circumferential surface of the third dry disc 343. There is a clearance about 0.2 mm between the left and right pad plates 344e, 344g and the third dry disc 343. The shifting motor 344a and the shifting reducer 344b are fixedly secured to outside surface of the casing 344d. The casing 344d is fixedly secured to outside surface the transaxle housing by two guide bolts. The floating caliper 344n mounted on the casing 344d can move along the two guide bolts. The ends of the left screw 344l and the right screw 344j are fixed in an inner hole of the shifting driven gear 344k. The end of the left nut 344m is contacted with an inner wall of the floating caliper 344n. The end of the right nut 344h is contacted with the wall of the left pad plate 344e. The wall of the right pad plate 344g is contacted with the other inner wall of the floating caliper 344n. The speed sensor 344f is mounted on the top of the floating caliper 344n.

A fourth electric caliper brake system 351 is floating caliper architecture, comprises a shifting motor 351a, a shifting reducer 351b, a casing 351d, a shifting driving gear 351c, a shifting driven gear 351k, a left nut 351m, a left screw 351l, a right nut 351h, a right screw 351j, a left pad plate 351e, a right pad plate 351g, a speed sensor 351f for watching state of the fourth dry disc 350 as well as a floating caliper 351n. The fourth electric caliper brake system 351, the left pad plate 351e and the right pad plate 351g are pressed against the fourth dry disc 350 by the right pair of screw-nut and the left pair of screw-nut inside the floating caliper 351n, respectively, driven by the shifting driven gear 351k power from the shifting driving gear 351c by using the shifting motor 351a. The fourth electric caliper brake system 351 and the fourth dry disc 350 are mounted on outside of the transaxle housing. A plurality of speed teeth are uniformly processed on the circumferential surface of the fourth dry disc 350. There is a clearance about 2 mm between the speed sensor 351f and the circumferential surface of the fourth dry disc 350. There is a clearance about 0.2 mm between the left and right pad plates 351e, 351g and the fourth dry disc 350. The shifting motor 351a and the shifting reducer 351b are fixedly secured to outside surface of the casing 351d. The casing 351d is fixedly secured to outside surface the transaxle housing by two guide bolts. The floating caliper 351n mounted on the casing 351d can move along the two guide bolts. The ends of the left screw 351l and the right screw 351j are fixed in an inner hole of the shifting driven gear 351k. The end of the left nut 351m is contacted with an inner wall of the floating caliper 351n. The end of the right nut 351h is contacted with the wall of the left pad plate 351e. The wall of the right pad plate 351g is contacted with the other inner wall of the floating caliper 351n. The speed sensor 351f is mounted on the top of the floating caliper 351n.

In response to an operator's action, the control device (not shown) determines what is required and then manipulates the selectively operated components of the four-speed transaxle 310 appropriately to respond to the operator demand. Four speed ratios are provided by changing the states of four electric caliper brake systems. The power supplied by the four-speed transaxle 310 is predicated solely by the power delivered to the four-speed transaxle 310 from the electric motor. To produce the four fixed speed ratios, there are four delivery paths obtained by selecting the first, second, third and fourth electric caliper brake systems to disengage and engage.

First speed ratio results when the first electric caliper brake system 322 and the third electric caliper brake system 344 are disengaged and the second electric caliper brake system 331 and the fourth electric brake system 351 are engaged. And then, the second carrier 332 and the fourth ring gear 346 are locked.

Second speed ratio results when the second electric caliper brake system 331 and the third electric caliper brake system 344 are disengaged and the first electric caliper brake system 322 and the fourth electric brake system 351 are engaged. And then, the first carrier 317 and the fourth ring gear 346 are locked.

Third speed ratio results when the first electric caliper brake system 322 and the fourth electric caliper brake system 351 are disengaged and the second electric caliper brake system 331 and the third electric brake system 344 are engaged. And then, the second carrier 332 and the fourth carrier 341 are locked.

Fourth speed ratio results when the second electric caliper brake system 331 and the fourth electric caliper brake system 351 are disengaged and the first electric caliper brake system 322 and the third electric brake system 344 are engaged. And then, the first carrier 317 and the fourth carrier 341 are locked.

Description of a Fifth Alternative Embodiment

Figure 5:
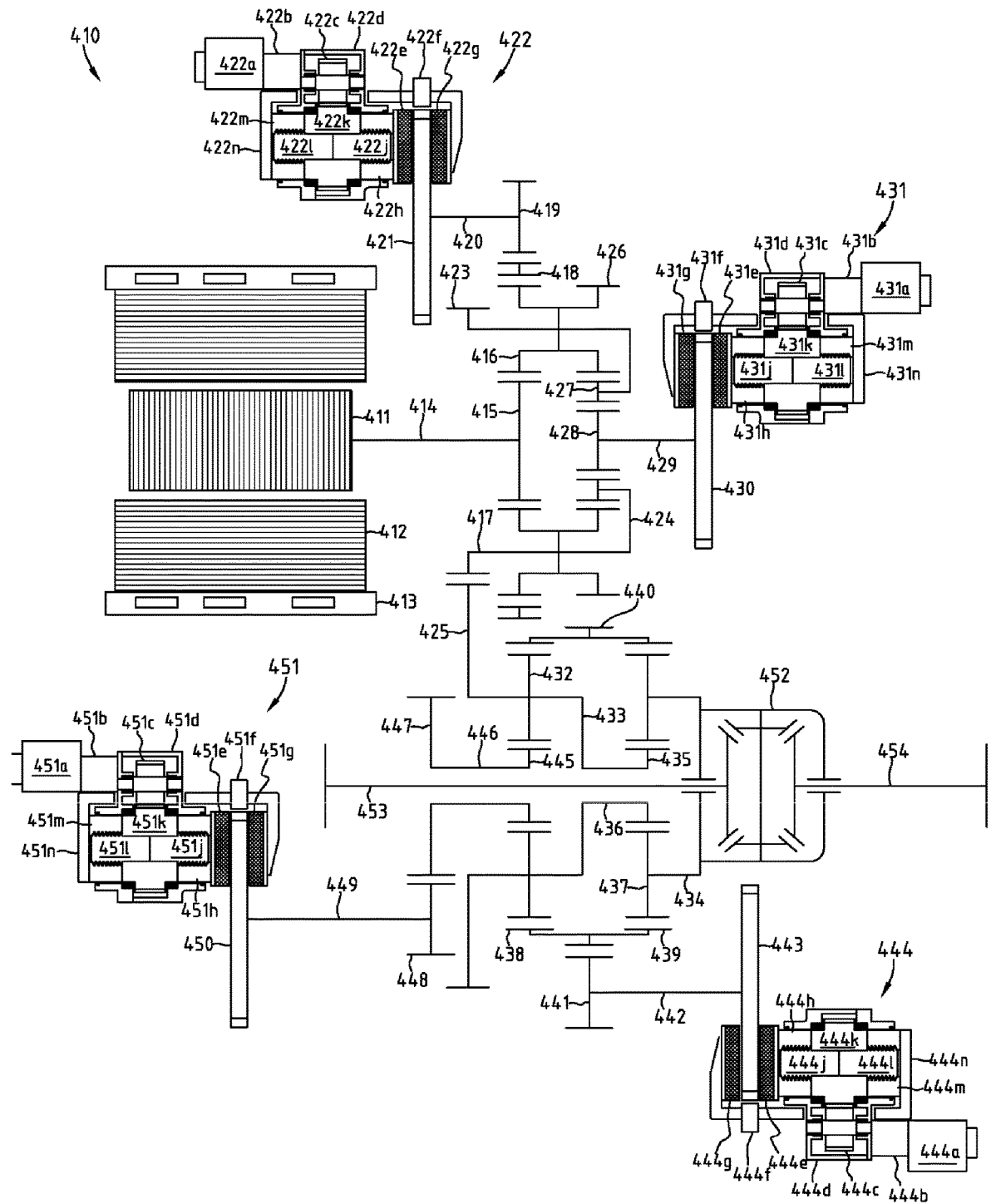
FIG. 5 is a schematic representation of the four-speed transaxle according to a fifth embodiment.

A fifth alternative and also a highly preferred form of a four-speed transaxle embodying the concepts of the present invention, is designated generally by the numeral 410 on the FIG. 5. It is observed that the four-speed transaxle 410 utilizes four planetary gear sets. The electric motor is coaxially aligned with a first and second planetary gear sets. A differential assembly 452 is coaxially aligned with a third and fourth planetary gear sets. The four-speed transaxle 410 has an input member 414 that may be in the nature of shaft which may be directly driven by an electric motor rotor 411. The input shaft 414 is connected to a first sun gear 415 in a first planetary gear set in the four-speed transaxle 410.

The first planetary gear set has a first inner gear member 418, which may generally be designated as a first ring gear 418, which circumscribes a first outer gear member 415, generally designated as a first sun gear 415. A plurality of first planet gear members 416 are rotatably mounted on a first carrier 424 such that each first planet gear 416 meshingly engages both the first ring gear 418 and the first sun gear 415. The first ring gear 418 has both the internal and external teeth. There are two symmetrically arranged a first shift gear systems. The first shift gear system comprises a first shift gear 419 which meshingly engages the outer gear teeth of the first ring gear 418 and a first shift gear shaft 420 which is fixedly secured to a first dry disc 421. The first shift gear 419 is fixedly secured to the other end of the first shift gear shaft 420.

The second planetary gear set has a second outer gear member 428, generally designated as a second sun gear 428. A plurality of second planet gear members 426 and idle gears 427 are rotatably mounted on the first carrier 424 such that each idle gear 427 meshingly engages both the second sun gear 428 and each second planet gear 426. The first planet gear 416 is coaxially installed with the second planet gear 426. The second sun gear 428 is fixedly secured to a second dry disc 430 through a second shift gear shaft 429.

The third planetary gear set has a third inner gear member 438, which may generally be designated as a third ring gear 438, which circumscribes a third outer gear member 445, generally designated as a third sun gear 445. A plurality of third planet gear members 442 are rotatably mounted on a third carrier 433 such that each third planet gear 432 meshingly engages both the third ring gear 438 and the third sun gear 445. A first connecting gear 447 is fixedly secured to the third sun gear 445 through a shaft 446.

The fourth planetary gear set has a fourth inner gear member 439, which may generally be designated as a fourth ring gear 439, which circumscribes a fourth outer gear member 435, generally designated as a fourth sun gear 435. A plurality of fourth planet gear members 437 are rotatably mounted on a fourth carrier 434 such that each fourth planet gear 437 meshingly engages both the fourth ring gear 439 and the fourth sun gear 435. A second connecting gear 440 has an outer tooth structure, which is mounted on the outer circumference of the whole ring formed by the third ring gear 438 and the fourth ring gear 439. There are two symmetrically arranged a third shift gear systems. The third shift gear system comprises a third shift gear 441 which meshingly engages the outer gear teeth of the second connecting gear 440 and a third shift gear shaft 442 which is fixedly secured to a third dry disc 443. The third shift gear 441 is fixedly secured to the other end of the third shift gear shaft 442. There are two symmetrically arranged a fourth shift gear systems. The fourth shift gear system comprises a fourth shift gear 448 which meshingly engages the first connecting gear 447 and a fourth shift gear shaft 449 which is fixedly secured to a fourth dry disc 450. The fourth shift gear 448 is fixedly secured to the other end of the fourth shift gear shaft 449.

The first carrier 424 is fixedly connected to a driving gear 423 through a connecting member 417. A driven gear 425 is successively connected to the third carrier 433 and the fourth sun gear 435. The driving gear 423 meshingly engages the driven gear 425. The fourth carrier 434 is fixed for rotation with the differential carrier of the differential assembly 452. The differential assembly 452 distributes output torque from the electric motor to left and right wheels of an electric vehicle by a left shaft 453 and a right shaft 454.

A first electric caliper brake system 422 is floating caliper architecture, comprises a shifting motor 422a, a shifting reducer 422b, a casing 422d, a shifting driving gear 422c, a shifting driven gear 422k, a left nut 422m, a left screw 422l, a right nut 422h, a right screw 422j, a left pad plate 422e, a right pad plate 422g, a speed sensor 422f for watching state of the first dry disc 421 as well as a floating caliper 422n. The first electric caliper brake system 422, the left pad plate 422e and the right pad plate 422g are pressed against the first dry disc 421 by the right pair of screw-nut and the left pair of screw-nut inside the floating caliper 422n, respectively, driven by the shifting driven gear 422k power from the shifting driving gear 422c by using the shifting motor 422a. The first electric caliper brake system 422 and the first dry disc 421 are mounted on outside of the transaxle housing. A plurality of speed teeth are uniformly processed on the circumferential surface of the first dry disc 421. There is a clearance about 2 mm between the speed sensor 422f and the circumferential surface of the first dry disc 421. There is a clearance about 0.2 mm between the left and right pad plates 422e, 422g and the first dry disc 421. The shifting motor 422a and the shifting reducer 422b are fixedly secured to outside surface of the casing 422d. The casing 422d is fixedly secured to outside surface the transaxle housing by two guide bolts. The floating caliper 422n mounted on the casing 422d can move along the two guide bolts. The ends of the left screw 422l and the right screw 422j are fixed in an inner hole of the shifting driven gear 422k. The end of the left nut 422m is contacted with an inner wall of the floating caliper 422n. The end of the right nut 422h is contacted with the wall of the left pad plate 422e. The wall of the right pad plate 422g is contacted with the other inner wall of the floating caliper 422n. The speed sensor 422f is mounted on the top of the floating caliper 422n.

A second electric caliper brake system 431 is floating caliper architecture, comprises a shifting motor 431a, a shifting reducer 431b, a casing 431d, a shifting driving gear 431c, a shifting driven gear 431k, a left nut 431m, a left screw 431l, a right nut 431h, a right screw 431j, a left pad plate 431e, a right pad plate 431g, a speed sensor 431f for watching state of the second dry disc 430 as well as a floating caliper 431n. The second electric caliper brake system 431, the left pad plate 431e and the right pad plate 431g are pressed against the second dry disc 430 by the right pair of screw-nut and the left pair of screw-nut inside the floating caliper 431n, respectively, driven by the shifting driven gear 431k power from the shifting driving gear 431c by using the shifting motor 431a. The second electric caliper brake system 431 and the second dry disc 430 are mounted on outside of the transaxle housing. A plurality of speed teeth are uniformly processed on the circumferential surface of the second dry disc 430. There is a clearance about 2 mm between the speed sensor 431f and the circumferential surface of the second dry disc 430. There is a clearance about 0.2 mm between the left and right pad plates 431e, 431g and the second dry disc 430. The shifting motor 431a and the shifting reducer 431b are fixedly secured to outside surface of the casing 431d. The casing 431d is fixedly secured to outside surface the transaxle housing by two guide bolts. The floating caliper 431n mounted on the casing 431d can move along the two guide bolts. The ends of the left screw 431l and the right screw 431j are fixed in an inner hole of the shifting driven gear 431k. The end of the left nut 431m is contacted with an inner wall of the floating caliper 431n. The end of the right nut 431h is contacted with the wall of the left pad plate 431e. The wall of the right pad plate 431g is contacted with the other inner wall of the floating caliper 431n. The speed sensor 431f is mounted on the top of the floating caliper 431n.

A third electric caliper brake system 444 is floating caliper architecture, comprises a shifting motor 444a, a shifting reducer 444b, a casing 444d, shifting driving gear 444c, a shifting driven gear 444k, a left nut 444m, a left screw 444l, a right nut 444*h*, a right screw 444*j*, a left pad plate 444*e*, a right pad plate 444*g*, a speed sensor 444*f* for watching state of the third dry disc 443 as well as a floating caliper 444*n*. The third electric caliper brake system 444, the left pad plate 444*e* and the right pad plate 444*g* are pressed against the third dry disc 443 by the right pair of screw-nut and the left pair of screw-nut inside the floating caliper 444*n*, respectively, driven by the shifting driven gear 444*k* power from the shifting driving gear 444*c* by using the shifting motor 444*a*. The third electric caliper brake system 444 and the third dry disc 443 are mounted on outside of the transaxle housing. A plurality of speed teeth are uniformly processed on the circumferential surface of the third dry disc 443. There is a clearance about 2 mm between the speed sensor 444*f* and the circumferential surface of the third dry disc 443. There is a clearance about 0.2 mm between the left and right pad plates 444*e*, 444*g* and the third dry disc 443. The shifting motor 444*a* and the shifting reducer 444*b* are fixedly secured to outside surface of the casing 444*d*. The casing 444*d* is fixedly secured to outside surface the transaxle housing by two guide bolts. The floating caliper 444*n* mounted on the casing 444*d* can move along the two guide bolts. The ends of the left screw 444*l* and the right screw 444*j* are fixed in an inner hole of the shifting driven gear 444*k*. The end of the left nut 444*m* is contacted with an inner wall of the floating caliper 444*n*. The end of the right nut 444*h* is contacted with the wall of the left pad plate 444*e*. The wall of the right pad plate 444*g* is contacted with the other inner wall of the floating caliper 444*n*. The speed sensor 444*f* is mounted on the top of the floating caliper 444*n*.

A fourth electric caliper brake system 451 is floating caliper architecture, comprises a shifting motor 451*a*, a shifting reducer 451*b*, a casing 451*d*, a shifting driving gear 451*c*, a shifting driven gear 451*k*, a left nut 451*m*, a left screw 451*l*, a right nut 451*h*, a right screw 451*j*, a left pad plate 451*e*, a right pad plate 451*g*, a speed sensor 451*f* for watching state of the fourth dry disc 450 as well as a floating caliper 451*n*. The fourth electric caliper brake system 451, the left pad plate 451*e* and the right pad plate 451*g* are pressed against the fourth dry disc 450 by the right pair of screw-nut and the left pair of screw-nut inside the floating caliper 451*n*, respectively, driven by the shifting driven gear 451*k* power from the shifting driving gear 451*c* by using the shifting motor 451*a*. The fourth electric caliper brake system 451 and the fourth dry disc 450 are mounted on outside of the transaxle housing. A plurality of speed teeth are uniformly processed on the circumferential surface of the fourth dry disc 450. There is a clearance about 2 mm between the speed sensor 451*f* and the circumferential surface of the fourth dry disc 450. There is a clearance about 0.2 mm between the left and right pad plates 451*e*, 451*g* and the fourth dry disc 450. The shifting motor 451*a* and the shifting reducer 451*b* are fixedly secured to outside surface of the casing 451*d*. The casing 451*d* is fixedly secured to outside surface the transaxle housing by two guide bolts. The floating caliper 451*n* mounted on the casing 451*d* can move along the two guide bolts. The ends of the left screw 451*l* and the right screw 451*j* are fixed in an inner hole of the shifting driven gear 451*k*. The end of the left nut 451*m* is contacted with an inner wall of the floating caliper 451*n*. The end of the right nut 451*h* is contacted with the wall of the left pad plate 451*e*. The wall of the right pad plate 451*g* is contacted with the other inner wall of the floating caliper 451*n*. The speed sensor 451*f* is mounted on the top of the floating caliper 451*n*.

In response to an operator's action, the control device (not shown) determines what is required and then manipulates the selectively operated components of the four-speed transaxle 410 appropriately to respond to the operator demand. Four speed ratios are provided by changing the states of four electric caliper brake systems. The power supplied by the four-speed transaxle 410 is predicated solely by the power delivered to the four-speed transaxle 410 from the electric motor. To produce the four fixed speed ratios, there are four delivery paths obtained by selecting the first, second, third and fourth electric caliper brake systems to disengage and engage.

First speed ratio results when the second electric caliper brake system 431 and the fourth electric caliper brake system 451 are disengaged and the first electric caliper brake system 422 and the third electric brake system 444 are engaged. And then, the first ring gear 418 and the fourth ring gear 439 are locked.

Second speed ratio results when the first electric caliper brake system 422 and the fourth electric caliper brake system 451 are disengaged and the second electric caliper brake system 431 and the third electric brake system 444 are engaged. And then, the second sun gear 428 and the fourth ring gear 439 are locked.

Third speed ratio results when the second electric caliper brake system 431 and the third electric brake system 444 are disengaged and the first electric caliper brake system 422 and the fourth electric caliper brake system 451 are engaged. And then, the first ring gear 418 and the third sun gear 445 are locked.

Fourth speed ratio results when the first electric caliper brake system 422 and the third electric brake system 444 are disengaged and the second electric caliper brake system 431 and the fourth electric caliper brake system 451 are engaged. And then, the second sun gear 428 and the third sun gear 445 are locked.

Description of a Sixth Alternative Embodiment

Figure 6:
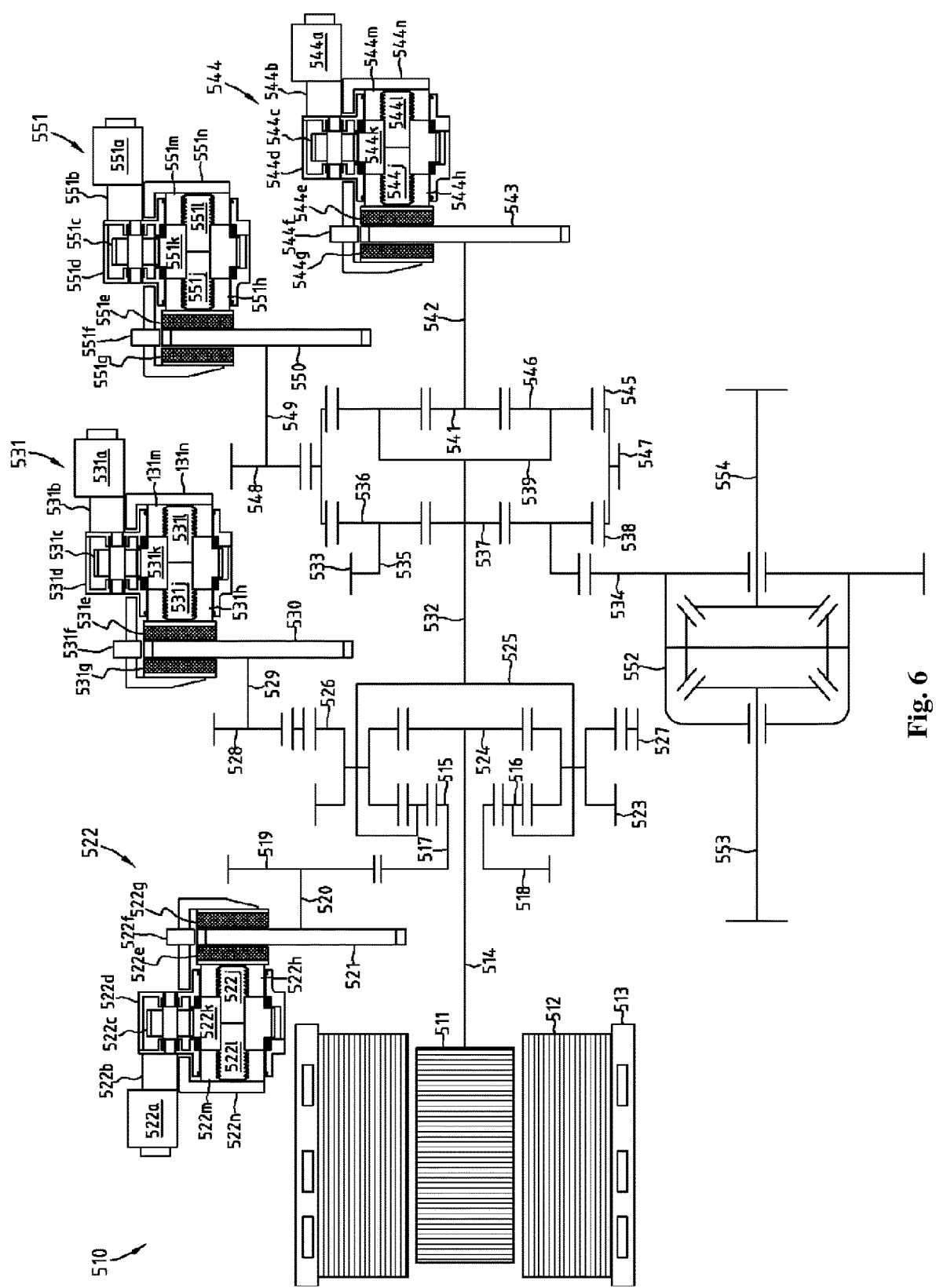
FIG. 6 is a schematic representation of the four-speed transaxle according to a sixth embodiment.

A sixth alternative and also a highly preferred form of a four-speed transaxle embodying the concepts of the present invention, is designated generally by the numeral 510 on the FIG. 6. It is observed that the four-speed transaxle 510 utilizes four planetary gear sets. The electric motor is coaxially aligned with the four planetary gear sets. The four-speed transaxle 510 has an input member 514 that may be in the nature of shaft which may be directly driven by an electric motor rotor 511. The input shaft 514 is connected to a second sun gear 524 in a second planetary gear set in the four-speed transaxle 510.

A first planetary gear set has a first outer gear member 515, generally designated as a first sun gear 515. A plurality of first planet gear members 523 and idle gears 516 are rotatably mounted on a first carrier 525 such that each idle gear 516 meshingly engages both the first sun gear 515 and each first planet gear 523. A first connecting gear 518 is fixed to the first sun gear 515 through a shaft 517. There are two symmetrically arranged a first shift gear systems. The first shift gear system comprises a first shift gear 519 which meshingly engages the first connecting gear 518 and a first shift gear shaft 520 which is fixedly secured to a first dry disc 512. The first shift gear 519 is fixedly secured to the other end of the first shift gear shaft 520. The first sun gear 515 and the shaft 517 are hollow allowing the input shaft 514 to pass through them center from the motor rotor 511 to the second sun gear 524.

The second planetary gear set has a second inner gear member 527, which may generally be designated as a second ring gear 527, which circumscribes a second outer gear member 524, generally designated as the second sun gear 524. A plurality of second planet gear members 526 are rotatably mounted on the first carrier 525 such that each second planet gear member 526 meshingly engages both the second ring gear 527 and the second sun gear 524. The second ring gear 527 has both the internal and external teeth. There are two symmetrically arranged a second shift gear systems. The second shift gear system comprises a second shift gear 528 which meshingly engages the outer gear teeth of the second ring gear 527 and a second shift gear shaft 529 which is fixedly secured to a second dry disc 530. The second shift gear 528 is fixedly secured to the other end of the second shift gear shaft 529.

A third planetary gear set has a third inner gear member 538, which may generally be designated as a third ring gear 538, which circumscribes a third outer gear member 537, generally designated as a third sun gear 537. A plurality of third planet gear members 536 are rotatably mounted on a third carrier 535 such that each third planet gear 536 meshingly engages both the third ring gear 538 and the third sun gear 537. A second connecting gear 547 has an outer tooth structure, which is mounted on the outer circumference of the whole ring formed by the third ring gear 538 and the fourth ring gear 545. There are two symmetrically arranged a fourth shift gear systems. The fourth shift gear system comprises a fourth shift gear 548 which meshingly engages the second connecting gear 547 and a fourth shift gear shaft 549 which is fixedly secured to a fourth dry disc 550. The fourth shift gear 548 is fixedly secured to the other end of the fourth shift gear shaft 549.

A fourth planetary gear set has a fourth inner gear member 545, which may generally be designated as a fourth ring gear 545, which circumscribes a fourth outer gear member 541, generally designated as a fourth sun gear 541. A plurality of fourth planet gear members 546 are rotatably mounted on a fourth carrier 539 such that each fourth planet gear 546 meshingly engages both the fourth ring gear 545 and the fourth sun gear 541. The fourth sun gear 541 is fixedly secured to a third dry disc 543 through a shaft 542.

The first carrier 525 is successively connected to the third sun gear 537 and the fourth carrier 539 through a middle shaft 532. The third carrier 535 is fixedly connected to a driving gear 533. A driven gear 534 is fixed for rotation with the differential carrier of a differential assembly 552. The driving gear 533 meshingly engages the driven gear 534. The differential assembly 552 distributes output torque from the electric motor to left and right wheels of an electric vehicle by a left shaft 553 and a right shaft 554.

A first electric caliper brake system 522 is floating caliper architecture, comprises a shifting motor 522a, a shifting reducer 522b, a casing 522d, a shifting driving gear 522c, a shifting driven gear 522k, a left nut 522m, a left screw 522l, a right nut 522h, a right screw 522j, a left pad plate 522e, a right pad plate 522g, a speed sensor 522f for watching state of the first dry disc 521 as well as a floating caliper 522n. The first electric caliper brake system 522, the left pad plate 522e and the right pad plate 522g are pressed against the first dry disc 521 by the right pair of screw-nut and the left pair of screw-nut inside the floating caliper 522n, respectively, driven by the shifting driven gear 522k power from the shifting driving gear 522c by using the shifting motor 522a. The first electric caliper brake system 522 and the first dry disc 521 are mounted on outside of the transaxle housing. A plurality of speed teeth are uniformly processed on the circumferential surface of the first dry disc 521. There is a clearance about 2 mm between the speed sensor 522f and the circumferential surface of the first dry disc 521. There is a clearance about 0.2 mm between the left and right pad plates 522e, 522g and the first dry disc 521. The shifting motor 522a and the shifting reducer 522b are fixedly secured to outside surface of the casing 522d. The casing 522d is fixedly secured to outside surface the transaxle housing by two guide bolts. The floating caliper 522n mounted on the casing 522d can move along the two guide bolts. The ends of the left screw 522l and the right screw 522j are fixed in an inner hole of the shifting driven gear 522k. The end of the left nut 522m is contacted with an inner wall of the floating caliper 522n. The end of the right nut 522h is contacted with the wall of the left pad plate 522e. The wall of the right pad plate 522g is contacted with the other inner wall of the floating caliper 522n. The speed sensor 522f is mounted on the top of the floating caliper 522n.

A second electric caliper brake system 531 is floating caliper architecture, comprises a shifting motor 531a, a shifting reducer 531b, a casing 531d, a shifting driving gear 531c, a shifting driven gear 531k, a left nut 531m, a left screw 531l, a right nut 531h, a right screw 531j, a left pad plate 531e, a right pad plate 531g, a speed sensor 531f for watching state of the second dry disc 530 as well as a floating caliper 531n. The second electric caliper brake system 531, the left pad plate 531e and the right pad plate 531g are pressed against the second dry disc 530 by the right pair of screw-nut and the left pair of screw-nut inside the floating caliper 531n, respectively, driven by the shifting driven gear 531k power from the shifting driving gear 531c by using the shifting motor 531a. The second electric caliper brake system 531 and the second dry disc 530 are mounted on outside of the transaxle housing. A plurality of speed teeth are uniformly processed on the circumferential surface of the second dry disc 530. There is a clearance about 2 mm between the speed sensor 531f and the circumferential surface of the second dry disc 530. There is a clearance about 0.2 mm between the left and right pad plates 531e, 531g and the second dry disc 530. The shifting motor 531a and the shifting reducer 531b are fixedly secured to outside surface of the casing 531d. The casing 531d is fixedly secured to outside surface the transaxle housing by two guide bolts. The floating caliper 531n mounted on the casing 531d can move along the two guide bolts. The ends of the left screw 531l and the right screw 531j are fixed in an inner hole of the shifting driven gear 531k. The end of the left nut 531m is contacted with an inner wall of the floating caliper 531n. The end of the right nut 531h is contacted with the wall of the left pad plate 531e. The wall of the right pad plate 531g is contacted with the other inner wall of the floating caliper 531n. The speed sensor 531f is mounted on the top of the floating caliper 531n.

A third electric caliper brake system 544 is floating caliper architecture, comprises a shifting motor 544a, a shifting reducer 544b, a casing 544d, a shifting driving gear 544c, a shifting driven gear 544k, a left nut 544m, a left screw 544l, a right nut 544h, a right screw 544j, a left pad plate 544e, a right pad plate 544g, a speed sensor 544f for watching state of the third dry disc 543 as well as a floating caliper 544n. The third electric caliper brake system 544, the left pad plate 544e and the right pad plate 544g are pressed against the third dry disc 543 by the right pair of screw-nut and the left pair of screw-nut inside the floating caliper 544n, respectively, driven by the shifting driven gear 544k power from the shifting driving gear 544c by using the shifting motor 544a. The third electric caliper brake system 544 and the third dry disc 543 are mounted on outside of the transaxle housing. A plurality of speed teeth are uniformly processed on the circumferential surface of the third dry disc 543.

There is a clearance about 2 mm between the speed sensor 544*f* and the circumferential surface of the third dry disc 543. There is a clearance about 0.2 mm between the left and right pad plates 544*e*, 544*g* and the third dry disc 543. The shifting motor 544*a* and the shifting reducer 544*b* are fixedly secured to outside surface of the casing 544*d*. The casing 544*d* is fixedly secured to outside surface the transaxle housing by two guide bolts. The floating caliper 544*n* mounted on the casing 544*d* can move along the two guide bolts. The ends of the left screw 544*l* and the right screw 544*j* are fixed in an inner hole of the shifting driven gear 544*k*. The end of the left nut 544*m* is contacted with an inner wall of the floating caliper 544*n*. The end of the right nut 544*h* is contacted with the wall of the left pad plate 544*e*. The wall of the right pad plate 544*g* is contacted with the other inner wall of the floating caliper 544*n*. The speed sensor 544*f* is mounted on the top of the floating caliper 544*n*.

A fourth electric caliper brake system 551 is floating caliper architecture, comprises a shifting motor 551*a*, a shifting reducer 551*b*, a casing 551*d*, shifting driving gear 551*c*, a shifting driven gear 551*k*, a left nut 551*m*, a left screw 551*l*, a right nut 551*h*, a right screw 551*j*, a left pad plate 551*e*, a right pad plate 551*g*, a speed sensor 551*f* for watching state of the fourth dry disc 550 as well as the floating caliper 551*n*. The fourth electric caliper brake system 551, the left pad plate 551*e* and the right pad plate 551*g* are pressed against the fourth dry disc 550 by the right pair of screw-nut and the left pair of screw-nut inside the floating caliper 551*n*, respectively, driven by the shifting driven gear 551*k* power from the shifting driving gear 551*c* by using the shifting motor 551*a*. The fourth electric caliper brake system 551 and the fourth dry disc 550 are mounted on outside of the transaxle housing. A plurality of speed teeth are uniformly processed on the circumferential surface of the fourth dry disc 550. There is a clearance about 2 mm between the speed sensor 551*f* and the circumferential surface of the fourth dry disc 550. There is a clearance about 0.2 mm between the left and right pad plates 551*e*, 551*g* and the fourth dry disc 550. The shifting motor 551*a* and the shifting reducer 551*b* are fixedly secured to outside surface of the casing 551*d*. The casing 551*d* is fixedly secured to outside surface the transaxle housing by two guide bolts. The floating caliper 551*n* mounted on the casing 551*d* can move along the two guide bolts. The ends of the left screw 551*l* and the right screw 551*j* are fixed in an inner hole of the shifting driven gear 551*k*. The end of the left nut 551*m* is contacted with an inner wall of the floating caliper 551*n*. The end of the right nut 551*h* is contacted with the wall of the left pad plate 551*e*. The wall of the right pad plate 551*g* is contacted with the other inner wall of the floating caliper 551*n*. The speed sensor 551*f* is mounted on the top of the floating caliper 551*n*.

In response to an operator's action, the control device (not shown) determines what is required and then manipulates the selectively operated components of the four-speed transaxle 510 appropriately to respond to the operator demand. Four speed ratios are provided by changing the states of four electric caliper brake systems. The power supplied by the four-speed transaxle 510 is predicated solely by the power delivered to the four-speed transaxle 510 from the electric motor. To produce the four fixed speed ratios, there are four delivery paths obtained by selecting the first, second, third and fourth electric caliper brake systems to disengage and engage.

First speed ratio results when the first electric caliper brake system 522 and the third electric caliper brake system 544 are disengaged and the second electric caliper brake system 531 and the fourth electric brake system 544 are engaged. And then, the second ring gear 527 and the third ring gear 538 are locked.

Second speed ratio results when the second electric caliper brake system 531 and the third electric caliper brake system 551 are disengaged and the first electric caliper brake system 522 and the fourth electric brake system 551 are engaged. And then, the first sun gear 515 and the third ring gear 538 are locked.

Third speed ratio results when the first electric caliper brake system 522 and the fourth electric caliper brake system 551 are disengaged and the second electric caliper brake system 531 and the third electric brake system 544 are engaged. And then, the second ring gear 527 and the fourth sun gear 541 are locked.

Fourth speed ratio results when the second electric caliper brake system 531 and the fourth electric caliper brake system 551 are disengaged and the first electric caliper brake system 522 and the third electric brake system 544 are engaged. And then, the first sun gear 515 and the forth sun gear 541 are locked.

Description of a Seventh Alternative Embodiment

Figure 7:
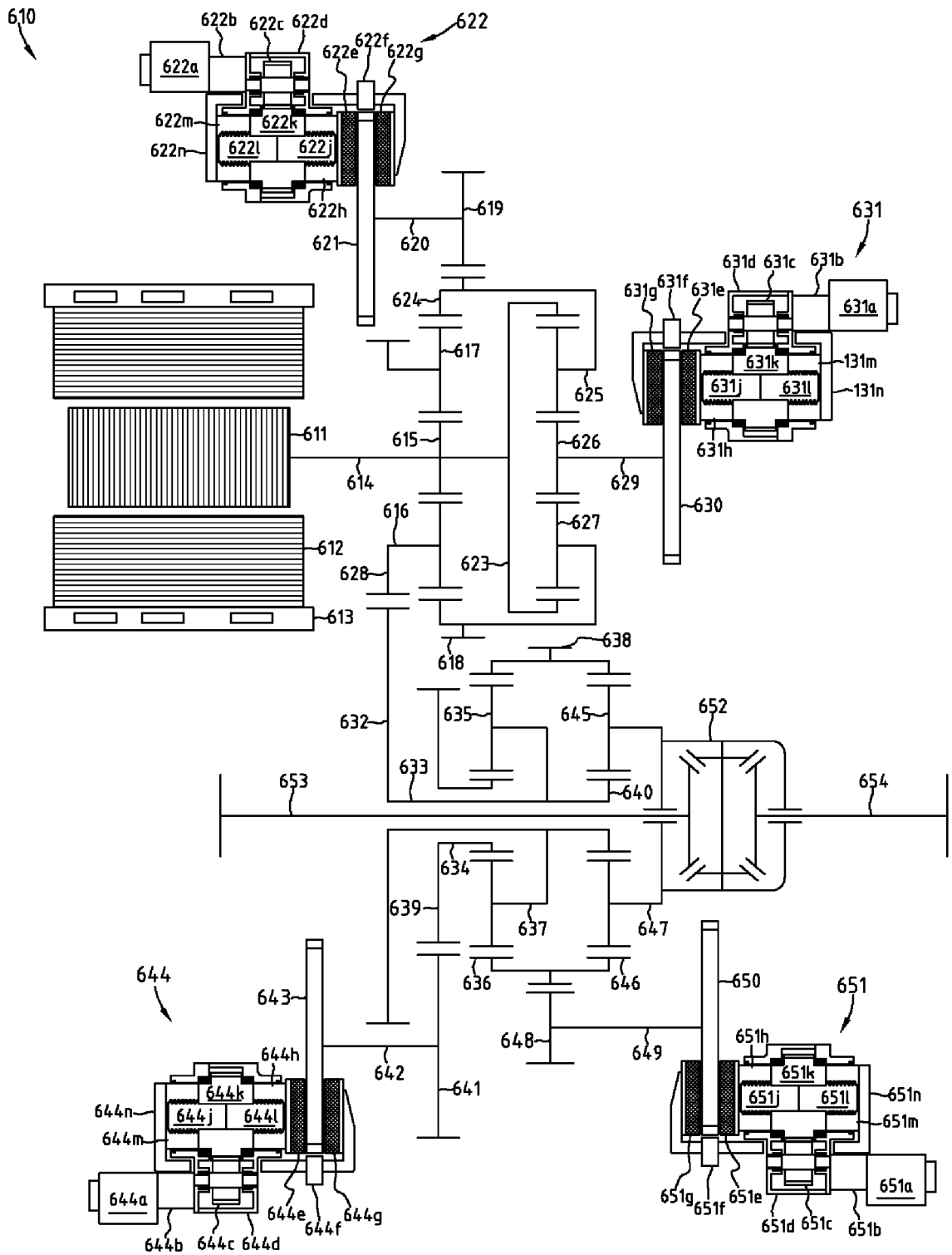
FIG. 7 is a schematic representation of the four-speed transaxle according to a seventh embodiment.

A seventh alternative and also a highly preferred form of a four-speed transaxle embodying the concepts of the present invention, is designated generally by the numeral 610 on the FIG. 7. It is observed that the four-speed transaxle 610 utilizes four planetary gear sets. The electric motor is coaxially aligned with the first and second planetary gear sets. A differential assembly 652 is coaxially aligned with the third and fourth planetary gear sets. The four-speed transaxle 610 has an input member 614 that may be in the nature of shaft which may be directly driven by an electric motor rotor 611. The input shaft 614 is successively connected to a first sun gear 615 in a first planetary gear set and a second ring gear 623 in a second planetary gear set in the four-speed transaxle 610.

The first planetary gear set has a first inner gear member 624 which may generally be designated as a first ring gear 624, which circumscribes a first outer gear member 615, generally designated as a first sun gear 615. A plurality of first planet gear members 617 are rotatably mounted on a first carrier 616 such that each first planet gear 617 meshingly engages both the first ring gear 624 and the first sun gear 615. A first connecting gear 618 has an outer tooth structure, which is mounted on the outer circumference of the whole ring formed by the first ring gear 624 and a second carrier 625. There are two symmetrically arranged a first shift gear systems. The first shift gear system comprises a first shift gear 619 which meshingly engages the first connecting gear 618 and a first shift gear shaft 620 which is fixedly secured to a first dry disc 621. The first shift gear 619 is fixedly secured to the other end of the first shift gear shaft 620.

The second planetary gear set has a second inner gear member 623, which may generally be designated as a second ring gear 623, which circumscribes a fourth outer gear member 626, generally designated as a second sun gear 626. A plurality of second planet gear members 627 are rotatably mounted on a second carrier 625 such that each second planet gear 627 meshingly engages both the second ring gear 623 and the second sun gear 626. The second sun gear 626 is fixedly secured to a second dry disc 630 through a shaft 629.

The third planetary gear set has a third inner gear member 636, which may generally be designated as a third ring gear 636, which circumscribes a third outer gear member 634, generally designated as a third sun gear 634. A plurality of third planet gear members 635 are rotatably mounted on a third carrier 637 such that each third planet gear 635 meshingly engages both the third ring gear 636 and the third sun gear 634. A second connecting gear 639 has an outer tooth structure, which is fixedly secured to the third sun gear 634. There are two symmetrically arranged a third shift gear systems. The third shift gear system comprises a third shift gear 641 which meshingly engages the second connecting gear 639 and a third shift gear shaft 642 which is fixedly secured to a third dry disc 643. The third shift gear 641 is fixedly secured to the other end of the third shift gear shaft 642.

The fourth planetary gear set has a fourth inner gear member 646, which may generally be designated as a fourth ring gear 646, which circumscribes a fourth outer gear member 640, generally designated as a fourth sun gear 640. A plurality of fourth planet gear members 645 are rotatably mounted on a fourth carrier 647 such that each fourth planet gear 645 meshingly engages both the fourth ring gear 646 and the fourth sun gear 640. A third connecting gear 638 has an outer tooth structure, which is mounted on the outer circumference of the whole ring formed by the third ring gear 636 and the fourth ring gear 646. There are two symmetrically arranged a fourth shift gear systems. The fourth shift gear system comprises a fourth shift gear 648 which meshingly engages the third connecting gear 638 and a fourth shift gear shaft 648 which is fixedly secured to a fourth dry disc 650. The fourth shift gear 648 is fixedly secured to the other end of the fourth shift gear shaft 649.

The third sun gear 634, a shaft 633, the third carrier 637 and the fourth sun gear 640 are hollow allowing the left shaft 653 to pass through them center from the differential assembly 652 to the left wheel of the electric vehicle. The first carrier 616 is fixedly connected to a driving gear 628. The first ring gear 624 is fixedly secured to the second carrier 625. A driven gear 632 is successively connected to the third carrier 637 and the fourth sun gear 640 through the shaft 633. The driving gear 628 meshingly engages the driven gear 632. The fourth carrier 647 is fixed for rotation with the differential carrier of the differential assembly 652. The differential assembly 652 distributes output torque from the electric motor to left and right wheels of an electric vehicle by the left shaft 653 and the right shaft 654.

A first electric caliper brake system 622 is floating caliper architecture, comprises a shifting motor 622a, a shifting reducer 622b, a casing 622d, a shifting driving gear 622c, a shifting driven gear 622k, a left nut 622m, a left screw 622l, a right nut 622h, a right screw 622j, a left pad plate 622e, a right pad plate 622g, a speed sensor 622f for watching state of the first dry disc 621 as well as a floating caliper 622n. The first electric caliper brake system 622, the left pad plate 622e and the right pad plate 622g are pressed against the first dry disc 621 by the right pair of screw-nut and the left pair of screw-nut inside the floating caliper 622n, respectively, driven by the shifting driven gear 622k power from the shifting driving gear 622c by using the shifting motor 622a. The first electric caliper brake system 622 and the first dry disc 621 are mounted on outside of the transaxle housing. A plurality of speed teeth are uniformly processed on the circumferential surface of the first dry disc 621. There is a clearance about 2 mm between the speed sensor 622f and the circumferential surface of the first dry disc 621. There is a clearance about 0.2 mm between the left and right pad plates 622e, 622g and the first dry disc 621. The shifting motor 622a and the shifting reducer 622b are fixedly secured to outside surface of the casing 622d. The casing 622d is fixedly secured to outside surface the transaxle housing by two guide bolts. The floating caliper 622n mounted on the casing 622d can move along the two guide bolts. The ends of the left screw 622l and the right screw 622j are fixed in an inner hole of the shifting driven gear 622k. The end of the left nut 622m is contacted with an inner wall of the floating caliper 622n. The end of the right nut 622h is contacted with the wall of the left pad plate 622e. The wall of the right pad plate 622g is contacted with the other inner wall of the floating caliper 622n. The speed sensor 622f is mounted on the top of the floating caliper 622n.

A second electric caliper brake system 631 is floating caliper architecture, comprises a shifting motor 631a, a shifting reducer 631b, a casing 631d, a shifting driving gear 631c, a shifting driven gear 631k, a left nut 631m, a left screw 631l, a right nut 631h, a right screw 631j, a left pad plate 631e, a right pad plate 631g, a speed sensor 631f for watching state of the second dry disc 630 as well as a floating caliper 631n. The second electric caliper brake system 631, the left pad plate 631e and the right pad plate 631g are pressed against the second dry disc 630 by the right pair of screw-nut and the left pair of screw-nut inside the floating caliper 631n, respectively, driven by the shifting driven gear 631k power from the shifting driving gear 631c by using the shifting motor 631a. The second electric caliper brake system 631 and the second dry disc 630 are mounted on outside of the transaxle housing. A plurality of speed teeth are uniformly processed on the circumferential surface of the second dry disc 630. There is a clearance about 2 mm between the speed sensor 631f and the circumferential surface of the second dry disc 630. There is a clearance about 0.2 mm between the left and right pad plates 631e, 631g and the second dry disc 630. The shifting motor 631a and the shifting reducer 631b are fixedly secured to outside surface of the casing 631d. The casing 631d is fixedly secured to outside surface the transaxle housing by two guide bolts. The floating caliper 631n mounted on the casing 631d can move along the two guide bolts. The ends of the left screw 631l and the right screw 631j are fixed in an inner hole of the shifting driven gear 631k. The end of the left nut 631m is contacted with an inner wall of the floating caliper 631n. The end of the right nut 631h is contacted with the wall of the left pad plate 631e. The wall of the right pad plate 631g is contacted with the other inner wall of the floating caliper 631n. The speed sensor 631f is mounted on the top of the floating caliper 631n.

A third electric caliper brake system 644 is floating caliper architecture, comprises a shifting motor 644a, a shifting reducer 644b, a casing 644d, a shifting driving gear 644c, a shifting driven gear 644k, a left nut 644m, a left screw 644l, a right nut 644h, a right screw 644j, a left pad plate 644e, a right pad plate 644g, a speed sensor 644f for watching state of the third dry disc 643 as well as a floating caliper 644n. The third electric caliper brake system 644, the left pad plate 644e and the right pad plate 644g are pressed against the third dry disc 643 by the right pair of screw-nut and the left pair of screw-nut inside the floating caliper 644n, respectively, driven by the shifting driven gear 644k power from the shifting driving gear 644c by using the shifting motor 644a. The third electric caliper brake system 644 and the third dry disc 643 are mounted on outside of the transaxle housing. A plurality of speed teeth are uniformly processed on the circumferential surface of the third dry disc 643. There is a clearance about 2 mm between the speed sensor 644f and the circumferential surface of the third dry disc 643. There is a clearance about 0.2 mm between the left and right pad plates 644e, 644g and the third dry disc 643. The shifting motor 644a and the shifting reducer 644b are fixedly secured to outside surface of the casing 644d. The casing 644d is fixedly secured to outside surface the transaxle housing by two guide bolts. The floating caliper 644n mounted on the casing 644d can move along the two guide bolts. The ends of the left screw 644l and the right screw 644j are fixed in an inner hole of the shifting driven gear 644k. The end of the left nut 644m is contacted with an inner wall of the floating caliper 644n. The end of the right nut 644h is contacted with the wall of the left pad plate 644e. The wall of the right pad plate 644g is contacted with the other inner wall of the floating caliper 644n. The speed sensor 644f is mounted on the top of the floating caliper 644n.

A fourth electric caliper brake system 651 is floating caliper architecture, comprises a shifting motor 651a, a shifting reducer 651b, a casing 651d, a shifting driving gear 651c, a shifting driven gear 651k, a left nut 651m, a left screw 651l, a right nut 651h, a right screw 651j, a left pad plate 651e, a right pad plate 651g, a speed sensor 651f for watching state of the fourth dry disc 650 as well as the floating caliper 651n. The fourth electric caliper brake system 651, the left pad plate 651e and the right pad plate 651g are pressed against the fourth dry disc 650 by the right pair of screw-nut and the left pair of screw-nut inside the floating caliper 651n, respectively, driven by the shifting driven gear 651k power from the shifting driving gear 651c by using the shifting motor 651a. The fourth electric caliper brake system 651 and the fourth dry disc 650 are mounted on outside of the transaxle housing. A plurality of speed teeth are uniformly processed on the circumferential surface of the fourth dry disc 650. There is a clearance about 2 mm between the speed sensor 651f and the circumferential surface of the fourth dry disc 650. There is a clearance about 0.2 mm between the left and right pad plates 651e, 651g and the fourth dry disc 650. The shifting motor 651a and the shifting reducer 651b are fixedly secured to outside surface of the casing 651d. The casing 651d is fixedly secured to outside surface the transaxle housing by two guide bolts. The floating caliper 651n mounted on the casing 651d can move along the two guide bolts. The ends of the left screw 651l and the right screw 651j are fixed in an inner hole of the shifting driven gear 651k. The end of the left nut 651m is contacted with an inner wall of the floating caliper 651n. The end of the right nut 651h is contacted with the wall of the left pad plate 651e. The wall of the right pad plate 651g is contacted with the other inner wall of the floating caliper 651n. The speed sensor 651f is mounted on the top of the floating caliper 651n.

In response to an operator's action, the control device (not shown) determines what is required and then manipulates the selectively operated components of the four-speed transaxle 610 appropriately to respond to the operator demand. Four speed ratios are provided by changing the states of four electric caliper brake systems. The power supplied by the four-speed transaxle 610 is predicated solely by the power delivered to the four-speed transaxle 610 from the electric motor. To produce the four fixed speed ratios, there are four delivery paths obtained by selecting the first, second, third and fourth electric caliper brake systems to disengage and engage.

First speed ratio results when the second electric caliper brake system 631 and the third electric brake system 644 are disengaged, the first electric caliper brake system 622 and the fourth electric caliper brake system 651 are engaged. And then, the first ring gear 624 and the fourth ring gear 646 are locked.

Second speed ratio results when the first electric caliper brake system 622 and the third electric brake system 644 are disengaged, the second electric caliper brake system 631 and the fourth electric caliper brake system 651 are engaged. And then, the second sun gear 626 and the fourth ring gear 646 are locked.

Third speed ratio results when the second electric caliper brake system 631 and the fourth electric caliper brake system 651 are disengaged, the first electric caliper brake system 622 and the third electric brake system 644 are engaged. And then, the first ring gear 624 and the third sun gear 634 are locked.

Fourth speed ratio results when the first electric caliper brake system 622 and the fourth electric caliper brake system 651 are disengaged, the second electric caliper brake system 631 and the third electric brake system 644 are engaged. And then, the second sun gear 626 and the third sun gear 634 are locked.

Description of a Eighth Alternative Embodiment

Figure 8:
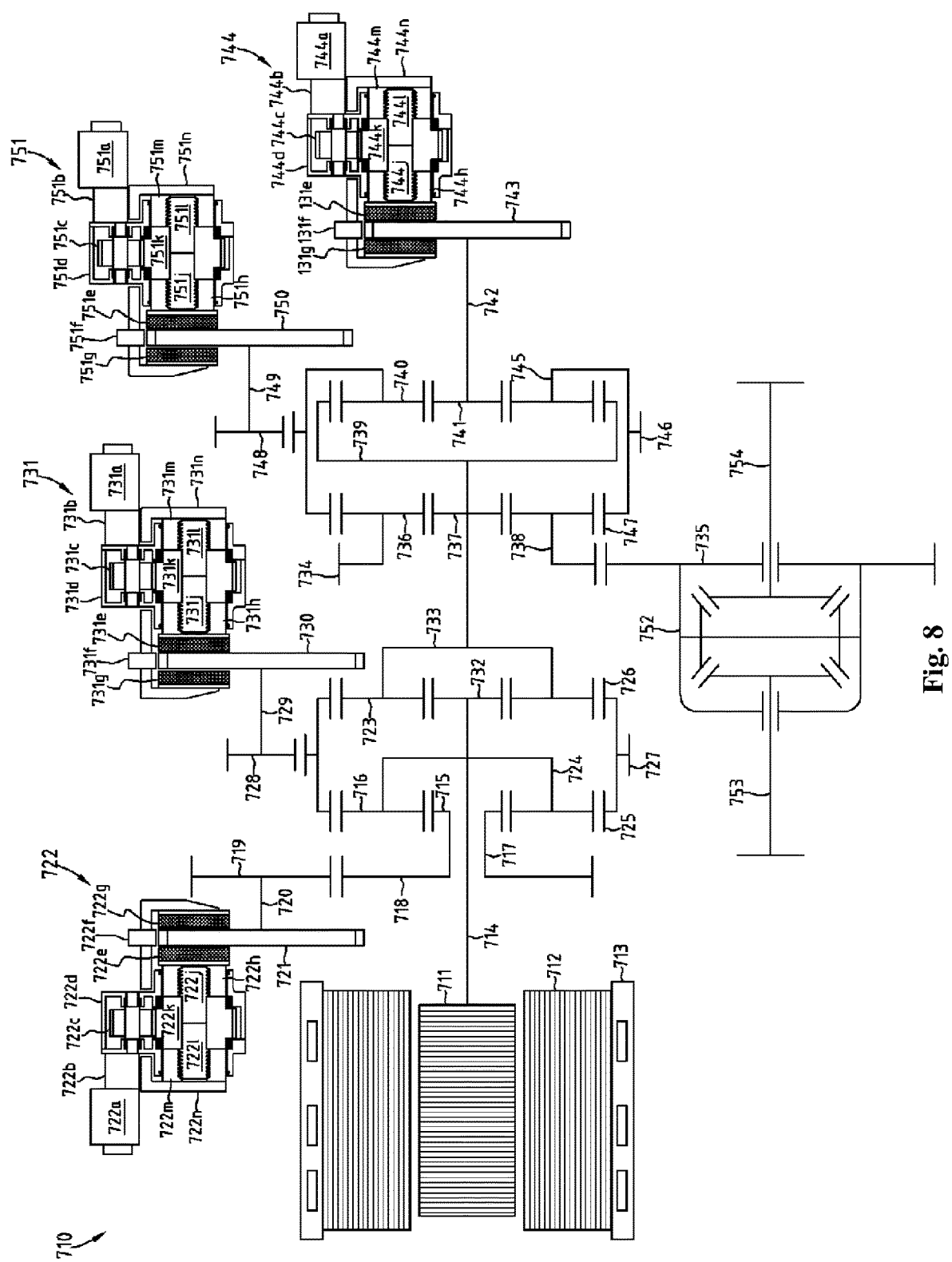
FIG. 8 is a schematic representation of the four-speed transaxle according to an eighth embodiment.

A eighth alternative and also a highly preferred form of a four-speed transaxle embodying the concepts of the present invention, is designated generally by the numeral 710 on the FIG. 8. It is observed that the four-speed transaxle 710 utilizes four planetary gear sets. The electric motor is coaxially aligned with the four planetary gear sets. The four-speed transaxle 710 has an input member 714 that may be in the nature of shaft which may be directly driven by an electric motor rotor 711. The input shaft 714 is successively connected to a first carrier 724 in a first planetary gear set and a second sun gear 732 in a second planetary gear set in the four-speed transaxle 710.

The first planetary gear set has a first inner gear member 725 which may generally be designated as a first ring gear 725, which circumscribes a first outer gear member 715, generally designated as a first sun gear 715. A plurality of first planet gear members 716 are rotatably mounted on a first carrier 724 such that each first planet gear 716 meshingly engages both the first ring gear 725 and the first sun gear 715. A first connecting gear 718 has an outer tooth structure, which is fixedly secured to the first sun gear 715 through a shaft 717. There are two symmetrically arranged a first shift gear systems. The first shift gear system comprises a first shift gear 719 which meshingly engages the first connecting gear 718 and a first shift gear shaft 720 which is fixedly secured to a first dry disc 721. The first shift gear 719 is fixedly secured to the other end of the first shift gear shaft 720.

The second planetary gear set has a second inner gear member 726 which may generally be designated as a second ring gear 726, which circumscribes a second outer gear member 732, generally designated as the second sun gear 732. A plurality of second planet gear members 723 are rotatably mounted on a second carrier 733 such that each second planet gear 723 meshingly engages both the second ring gear 726 and the second sun gear 732. A second connecting gear 727 has an outer tooth structure, which is mounted on the outer circumference of the whole ring formed by the first ring gear 725 and the second ring gear 726. There are two symmetrically arranged a second shift gear systems. The second shift gear system comprises a second shift gear 728 which meshingly engages the second connecting gear 727 and a second shift gear shaft 729 which is fixedly secured to a second dry disc 730. The second shift gear 728 is fixedly secured to the other end of the second shift gear shaft 729.

A third planetary gear set has a third inner gear member 747, which may generally be designated as a third ring gear 747, which circumscribes a third outer gear member 737, generally designated as a third sun gear 737. A plurality of third planet gear members 736 are rotatably mounted on a third carrier 738 such that each third planet gear 736 meshingly engages both the third ring gear 747 and the third sun gear 737. A third connecting gear 746 has an outer tooth structure, which is mounted on the outer circumference of the whole ring formed by the third ring gear 747 and a fourth carrier 745 in the fourth planetary gear set. There are two symmetrically arranged a fourth shift gear systems. The fourth shift gear system comprises a fourth shift gear 748 which meshingly engages the third connecting gear 746 and a fourth shift gear shaft 749 which is fixedly secured to a fourth dry disc 750. The fourth shift gear 748 is fixedly secured to the other end of the fourth shift gear shaft 749.

A fourth planetary gear set has a fourth inner gear member 739, which may generally be designated as a fourth ring gear 739, which circumscribes a fourth outer gear member 741, generally designated as a fourth sun gear 741. A plurality of fourth planet gear members 740 are rotatably mounted on a fourth carrier 745 such that each fourth planet gear 740 meshingly engages both the fourth ring gear 739 and the fourth sun gear 741. The fourth sun gear 741 is fixedly connected to a third dry disc 743 through a shaft 742.

The third carrier 738 is fixedly connected to a driving gear 734. The second carrier 733 is successively connected to the third sun gear 737 and the fourth ring gear 739. The third ring gear 747 is fixedly connected to the fourth carrier 745 through the third connecting gear 746. The driving gear 734 meshingly engages a driven gear 735. The driven gear 735 is fixed for rotation with the differential carrier of a differential assembly 752. The differential assembly 752 distributes output torque from the electric motor to left and right wheels of an electric vehicle by the left shaft 753 and the right shaft 754.

A first electric caliper brake system 722 is floating caliper architecture, comprises a shifting motor 722a, a shifting reducer 722b, a casing 722d, a shifting driving gear 722c, a shifting driven gear 722k, a left nut 722m, a left screw 722l, a right nut 722h, a right screw 722j, a left pad plate 722e, a right pad plate 722g, a speed sensor 722f for watching state of the first dry disc 721 as well as a floating caliper 722n. The first electric caliper brake system 722, the left pad plate 722e and the right pad plate 722g are pressed against the first dry disc 721 by the right pair of screw-nut and the left pair of screw-nut inside the floating caliper 722n, respectively, driven by the shifting driven gear 722k power from the shifting driving gear 722c by using the shifting motor 722a. The first electric caliper brake system 722 and the first dry disc 721 are mounted on outside of the transaxle housing. A plurality of speed teeth are uniformly processed on the circumferential surface of the first dry disc 721. There is a clearance about 2 mm between the speed sensor 722f and the circumferential surface of the first dry disc 721. There is a clearance about 0.2 mm between the left and right pad plates 722e, 722g and the first dry disc 721. The shifting motor 722a and the shifting reducer 722b are fixedly secured to outside surface of the casing 722d. The casing 722d is fixedly secured to outside surface the transaxle housing by two guide bolts. The floating caliper 722n mounted on the casing 722d can move along the two guide bolts. The ends of the left screw 722l and the right screw 722j are fixed in an inner hole of the shifting driven gear 722k. The end of the left nut 722m is contacted with an inner wall of the floating caliper 722n. The end of the right nut 722h is contacted with the wall of the left pad plate 722e. The wall of the right pad plate 722g is contacted with the other inner wall of the floating caliper 722n. The speed sensor 722f is mounted on the top of the floating caliper 722n.

A second electric caliper brake system 731 is floating caliper architecture, comprises a shifting motor 731a, a shifting reducer 731b, a casing 731d, a shifting driving gear 731c, a shifting driven gear 731k, a left nut 731m, a left screw 731l, a right nut 731h, a right screw 731j, a left pad plate 731e, a right pad plate 731g, a speed sensor 731f for watching state of the second dry disc 730 as well as a floating caliper 731n. The second electric caliper brake system 731, the left pad plate 731e and the right pad plate 731g are pressed against the second dry disc 730 by the right pair of screw-nut and the left pair of screw-nut inside the floating caliper 731n, respectively, driven by the shifting driven gear 731k power from the shifting driving gear 731c by using the shifting motor 731a. The second electric caliper brake system 731 and the second dry disc 730 are mounted on outside of the transaxle housing. A plurality of speed teeth are uniformly processed on the circumferential surface of the second dry disc 730. There is a clearance about 2 mm between the speed sensor 731f and the circumferential surface of the second dry disc 730. There is a clearance about 0.2 mm between the left and right pad plates 731e, 731g and the second dry disc 730. The shifting motor 731a and the shifting reducer 731b are fixedly secured to outside surface of the casing 731d. The casing 731d is fixedly secured to outside surface the transaxle housing by two guide bolts. The floating caliper 731n mounted on the casing 731d can move along the two guide bolts. The ends of the left screw 731l and the right screw 731j are fixed in an inner hole of the shifting driven gear 731k. The end of the left nut 731m is contacted with an inner wall of the floating caliper 731n. The end of the right nut 731h is contacted with the wall of the left pad plate 731e. The wall of the right pad plate 731g is contacted with the other inner wall of the floating caliper 731n. The speed sensor 731f is mounted on the top of the floating caliper 731n.

A third electric caliper brake system 744 is floating caliper architecture, comprises a shifting motor 744a, a shifting reducer 744b, a casing 744d, a shifting driving gear 744c, a shifting driven gear 744k, a left nut 744m, a left screw 744l, a right nut 744h, a right screw 744j, a left pad plate 744e, a right pad plate 744g, a speed sensor 744f for watching state of the third dry disc 743 as well as a floating caliper 744n. The third electric caliper brake system 744, the left pad plate 744e and the right pad plate 744g are pressed against the third dry disc 743 by the right pair of screw-nut and the left pair of screw-nut inside the floating caliper 744n, respectively, driven by the shifting driven gear 744k power from the shifting driving gear 744c by using the shifting motor 744a. The third electric caliper brake system 744 and the third dry disc 743 are mounted on outside of the transaxle housing. A plurality of speed teeth are uniformly processed on the circumferential surface of the third dry disc 743. There is a clearance about 2 mm between the speed sensor 744f and the circumferential surface of the third dry disc 743. There is a clearance about 0.2 mm between the left and right pad plates 744e, 744g and the third dry disc 743. The shifting motor 744a and the shifting reducer 744b are fixedly secured to outside surface of the casing 744d. The casing 744d is fixedly secured to outside surface the transaxle housing by two guide bolts. The floating caliper 744n mounted on the casing 744d can move along the two guide bolts. The ends of the left screw 744l and the right screw 744j are fixed in an inner hole of the shifting driven gear 744k. The end of the left nut 744m is contacted with an inner wall of the floating caliper 744n. The end of the right nut 744*h* is contacted with the wall of the left pad plate 744*e*. The wall of the right pad plate 744*g* is contacted with the other inner wall of the floating caliper 744*n*. The speed sensor 744*f* is mounted on the top of the floating caliper 744*n*.

A fourth electric caliper brake system 751 is floating caliper architecture, comprises a shifting motor 751*a*, a shifting reducer 751*b*, a casing 751*d*, a shifting driving gear 751*c*, a shifting driven gear 751*k*, a left nut 751*m*, a left screw 751*l*, a right nut 751*h*, a right screw 751*j*, a left pad plate 751*e*, a right pad plate 751*g*, a speed sensor 751*f* for watching state of the fourth dry disc 750 as well as a floating caliper 751*n*. The fourth electric caliper brake system 751, the left pad plate 751*e* and the right pad plate 751*g* are pressed against the fourth dry disc 750 by the right pair of screw-nut and the left pair of screw-nut inside the floating caliper 751*n*, respectively, driven by the shifting driven gear 751*k* power from the shifting driving gear 751*c* by using the shifting motor 751*a*. The fourth electric caliper brake system 751 and the fourth dry disc 750 are mounted on outside of the transaxle housing. A plurality of speed teeth are uniformly processed on the circumferential surface of the fourth dry disc 750. There is a clearance about 2 mm between the speed sensor 751*f* and the circumferential surface of the fourth dry disc 750. There is a clearance about 0.2 mm between the left and right pad plates 751*e*, 751*g* and the fourth dry disc 750. The shifting motor 751*a* and the shifting reducer 751*b* are fixedly secured to outside surface of the casing 751*d*. The casing 751*d* is fixedly secured to outside surface the transaxle housing by two guide bolts. The floating caliper 751*n* mounted on the casing 751*d* can move along the two guide bolts. The ends of the left screw 751*l* and the right screw 751*j* are fixed in an inner hole of the shifting driven gear 751*k*. The end of the left nut 751*m* is contacted with an inner wall of the floating caliper 751*n*. The end of the right nut 751*h* is contacted with the wall of the left pad plate 751*e*. The wall of the right pad plate 751*g* is contacted with the other inner wall of the floating caliper 751*n*. The speed sensor 751*f* is mounted on the top of the floating caliper 751*n*.

In response to an operator's action, the control device (not shown) determines what is required and then manipulates the selectively operated components of the four-speed transaxle 710 appropriately to respond to the operator demand. Four speed ratios are provided by changing the states of four electric caliper brake systems. The power supplied by the four-speed transaxle 710 is predicated solely by the power delivered to the four-speed transaxle 710 from the electric motor. To produce the four fixed speed ratios, there are four delivery paths obtained by selecting the first, second, third and fourth electric caliper brake systems to disengage and engage.

First speed ratio results when the first electric caliper brake system 722 and the third electric brake system 744 are disengaged, the second electric caliper brake system 731 and the fourth electric caliper brake system 751 are engaged. And then, the second ring gear 726 and the third ring gear 747 are locked.

Second speed ratio results when the first electric caliper brake system 722 and the fourth electric caliper brake system 751 are disengaged, the second electric caliper brake system 731 and the third electric brake system 744 are engaged. And then, the second ring gear 726 and the fourth sun gear 741 are locked.

Third speed ratio results when the second electric caliper brake system 731 and the third electric brake system 744 are disengaged, the first electric caliper brake system 722 and the fourth electric caliper brake system 751 are engaged. And then, the first sun gear 715 and the third ring gear 747 are locked.

Fourth speed ratio results when the second electric caliper brake system 731 and the fourth electric caliper brake system 751 are disengaged, the first electric caliper brake system 722 and the third electric brake system 744 are engaged. And then, the first sun gear 715 and the fourth sun gear 741 are locked.

Description of a Ninth Alternative Embodiment

Figure 9:
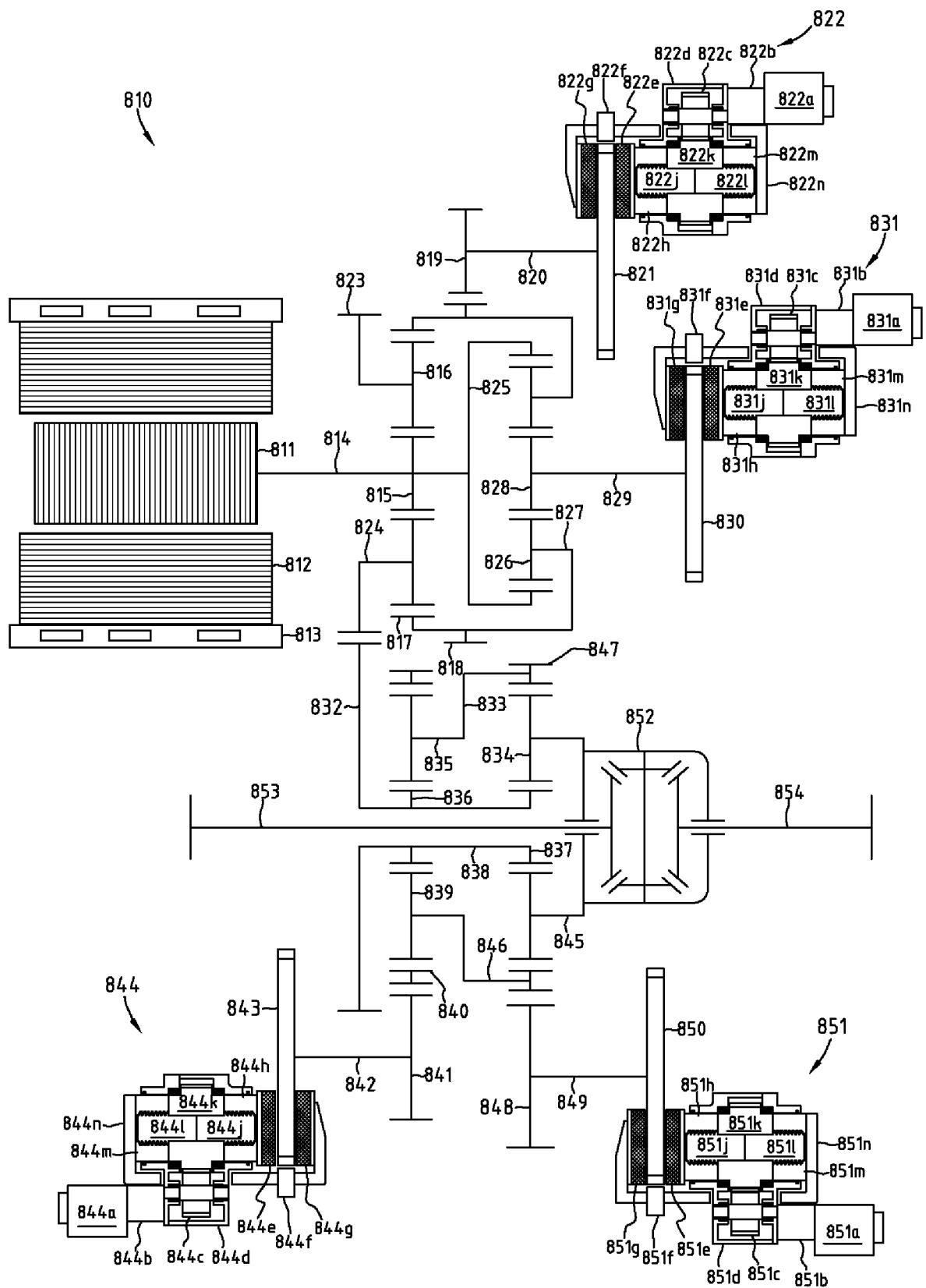
FIG. 9 is a schematic representation of the four-speed transaxle according to a ninth embodiment.

A ninth alternative and also a highly preferred form of a four-speed transaxle embodying the concepts of the present invention, is designated generally by the numeral 810 on the FIG. 9. It is observed that the four-speed transaxle 810 utilizes four planetary gear sets. The electric motor is coaxially aligned with the first and second planetary gear sets. A differential assembly 852 is coaxially aligned with the third and fourth planetary gear sets. The four-speed transaxle 810 has an input member 814 that may be in the nature of shaft which may be directly driven by an electric motor rotor 811. The input shaft 814 is successively connected to a first sun gear 815 in a first planetary gear set and a second ring gear 825 in a second planetary gear set in the four-speed transaxle 810.

The first planetary gear set has a first inner gear member 817 which may generally be designated as a first ring gear 817, which circumscribes a first outer gear member 815, generally designated as a first sun gear 815. A plurality of first planet gear members 816 are rotatably mounted on a first carrier 824 such that each first planet gear 816 meshingly engages both the first ring gear 817 and the first sun gear 815. A first connecting gear 818 has an outer tooth structure, which is mounted on the outer circumference of the whole ring formed by the first ring gear 817 and a second carrier 827. There are two symmetrically arranged a first shift gear systems. The first shift gear system comprises a first shift gear 819 which meshingly engages the first connecting gear 818 and a first shift gear shaft 820 which is fixedly secured to a first dry disc 821. The first shift gear 819 is fixedly secured to the other end of the first shift gear shaft 820.

The second planetary gear set has a second inner gear member 825, which may generally be designated as a second ring gear 825, which circumscribes a second outer gear member 828, generally designated as a second sun gear 828. A plurality of second planet gear members 826 are rotatably mounted on the second carrier 827 such that each second planet gear 826 meshingly engages both the second ring gear 825 and the second sun gear 828. The second sun gear 828 is fixedly secured to a second dry disc 830 through a shaft 829.

The third planetary gear set has a third inner gear member 840, which may generally be designated as a third ring gear 840, which circumscribes a third outer gear member 836, generally designated as a third sun gear 836. A plurality of third planet gear members 839 are rotatably mounted on a third carrier 835 such that each third planet gear 839 meshingly engages both the third ring gear 840 and the third sun gear 836. The third ring gear 840 has both the internal and external teeth. There are two symmetrically arranged a third shift gear systems. The third shift gear system comprises a third shift gear 841 which meshingly engages the external gear teeth of the third ring gear 840 and a third shift gear shaft 842 which is fixedly secured to a third dry disc 843. The third shift gear 842 is fixedly secured to the other end of the third shift gear shaft 842.

The fourth planetary gear set has a fourth inner gear member 846, which may generally be designated as a fourth ring gear 846, which circumscribes a fourth outer gear member 837, generally designated as a fourth sun gear 837. A plurality of fourth planet gear members 834 are rotatably mounted on a fourth carrier 845 such that each fourth planet gear 834 meshingly engages both the fourth ring gear 846 and the fourth sun gear 837. The fourth ring gear 846 has both the internal and external teeth 847. There are two symmetrically arranged a fourth shift gear systems. The fourth shift gear system comprises a fourth shift gear 848 which meshingly engages the external gear teeth 847 of the fourth ring gear 846 and a fourth shift gear shaft 849 which is fixedly secured to a fourth dry disc 850. The fourth shift gear 848 is fixedly secured to the other end of the fourth shift gear shaft 849.

The first ring gear 817 is fixed connected to the second carrier 827 through the first connecting gear 818. The first carrier 824 is fixedly connected to a driving gear 823. A driven gear 832 is successively connected to the third sun gear 836 and the fourth sun gear 837 through a shaft 838. The fourth ring gear 846 is fixedly connected to the third carrier 835 through a connecting member 833. The driving gear 823 meshingly engages the driven gear 832. The fourth carrier 845 is fixed for rotation with the differential carrier of the differential assembly 852. The third sun gear 836, the shaft 838 and the fourth sun gear 837 are hollow allowing the left shaft 853 to pass through them center from the differential assembly 852 to the left wheel of the electric vehicle. The differential assembly 852 distributes output torque from the electric motor to left and right wheels of an electric vehicle by the left shaft 853 and the right shaft 854.

A first electric caliper brake system 822 is floating caliper architecture, comprises a shifting motor 822a, a shifting reducer 822b, a casing 822d, shifting driving gear 822c, a shifting driven gear 822k, a left nut 822m, a left screw 822l, a right nut 822h, a right screw 822j, a left pad plate 822e, a right pad plate 822g, a speed sensor 822f for watching state of the first dry disc 821 as well as a floating caliper 822n. The first electric caliper brake system 822, the left pad plate 822e and the right pad plate 822g are pressed against the first dry disc 821 by the right pair of screw-nut and the left pair of screw-nut inside the floating caliper 822n, respectively, driven by the shifting driven gear 822k power from the shifting driving gear 822c by using the shifting motor 822a. The first electric caliper brake system 822 and the first dry disc 821 are mounted on outside of the transaxle housing. A plurality of speed teeth are uniformly processed on the circumferential surface of the first dry disc 821. There is a clearance about 2 mm between the speed sensor 822f and the circumferential surface of the first dry disc 821. There is a clearance about 0.2 mm between the left and right pad plates 822e, 822g and the first dry disc 821. The shifting motor 822a and the shifting reducer 822b are fixedly secured to outside surface of the casing 822d. The casing 822d is fixedly secured to outside surface the transaxle housing by two guide bolts. The floating caliper 822n mounted on the casing 822d can move along the two guide bolts. The ends of the left screw 822l and the right screw 822j are fixed in an inner hole of the shifting driven gear 822k. The end of the left nut 822m is contacted with an inner wall of the floating caliper 822n. The end of the right nut 822h is contacted with the wall of the left pad plate 822e. The wall of the right pad plate 822g is contacted with the other inner wall of the floating caliper 822n. The speed sensor 822f is mounted on the top of the floating caliper 822n.

A second electric caliper brake system 831 is floating caliper architecture, comprises a shifting motor 831a, a shifting reducer 831b, a casing 831d, a shifting driving gear 831c, a shifting driven gear 831k, a left nut 831m, a left screw 831l, a right nut 831h, a right screw 831j, a left pad plate 831e, a right pad plate 831g, a speed sensor 831f for watching state of the second dry disc 830 as well as a floating caliper 831n. The second electric caliper brake system 831, the left pad plate 831e and the right pad plate 831g are pressed against the second dry disc 830 by the right pair of screw-nut and the left pair of screw-nut inside the floating caliper 831n, respectively, driven by the shifting driven gear 831k power from the shifting driving gear 831c by using the shifting motor 831a. The second electric caliper brake system 831 and the second dry disc 830 are mounted on outside of the transaxle housing. A plurality of speed teeth are uniformly processed on the circumferential surface of the second dry disc 830. There is a clearance about 2 mm between the speed sensor 831f and the circumferential surface of the second dry disc 830. There is a clearance about 0.2 mm between the left and right pad plates 831e, 831g and the second dry disc 830. The shifting motor 831a and the shifting reducer 831b are fixedly secured to outside surface of the casing 831d. The casing 831d is fixedly secured to outside surface the transaxle housing by two guide bolts. The floating caliper 831n mounted on the casing 831d can move along the two guide bolts. The ends of the left screw 831l and the right screw 831j are fixed in an inner hole of the shifting driven gear 831k. The end of the left nut 831m is contacted with an inner wall of the floating caliper 831n. The end of the right nut 831h is contacted with the wall of the left pad plate 831e. The wall of the right pad plate 831g is contacted with the other inner wall of the floating caliper 831n. The speed sensor 831f is mounted on the top of the floating caliper 831n.

A third electric caliper brake system 844 is floating caliper architecture, comprises a shifting motor 844a, a shifting reducer 844b, a casing 844d, a shifting driving gear 844c, a shifting driven gear 844k, a left nut 844m, a left screw 844l, a right nut 844h, a right screw 844j, a left pad plate 844e, a right pad plate 844g, a speed sensor 844f for watching state of the third dry disc 843 as well as a floating caliper 844n. The third electric caliper brake system 844, the left pad plate 844e and the right pad plate 844g are pressed against the third dry disc 843 by the right pair of screw-nut and the left pair of screw-nut inside the floating caliper 844n, respectively, driven by the shifting driven gear 844k power from the shifting driving gear 844c by using the shifting motor 844a. The third electric caliper brake system 844 and the third dry disc 843 are mounted on outside of the transaxle housing. A plurality of speed teeth are uniformly processed on the circumferential surface of the third dry disc 843. There is a clearance about 2 mm between the speed sensor 844f and the circumferential surface of the third dry disc 843. There is a clearance about 0.2 mm between the left and right pad plates 844e, 844g and the third dry disc 843. The shifting motor 844a and the shifting reducer 844b are fixedly secured to outside surface of the casing 844d. The casing 844d is fixedly secured to outside surface the transaxle housing by two guide bolts. The floating caliper 844n mounted on the casing 844d can move along the two guide bolts. The ends of the left screw 844l and the right screw 844j are fixed in an inner hole of the shifting driven gear 844k. The end of the left nut 844m is contacted with an inner wall of the floating caliper 844n. The end of the right nut 844h is contacted with the wall of the left pad plate 844e. The wall of the right pad plate 844g is contacted with the other inner wall of the floating caliper 844*n*. The speed sensor 844*f* is mounted on the top of the floating caliper 844*n*.

A fourth electric caliper brake system 851 is floating caliper architecture, comprises a shifting motor 851*a*, a shifting reducer 851*b*, a casing 851*d*, a shifting driving gear 851*c*, a shifting driven gear 851*k*, a left nut 851*m*, a left screw 851*l*, a right nut 851*h*, a right screw 851*j*, a left pad plate 851*e*, a right pad plate 851*g*, a speed sensor 851*f* for watching state of the fourth dry disc 850 as well as a floating caliper 851*n*. The fourth electric caliper brake system 851, the left pad plate 851*e* and the right pad plate 851*g* are pressed against the fourth dry disc 850 by the right pair of screw-nut and the left pair of screw-nut inside the floating caliper 851*n*, respectively, driven by the shifting driven gear 851*k* power from the shifting driving gear 851*c* by using the shifting motor 851*a*. The fourth electric caliper brake system 851 and the fourth dry disc 850 are mounted on outside of the transaxle housing. A plurality of speed teeth are uniformly processed on the circumferential surface of the fourth dry disc 850. There is a clearance about 2 mm between the speed sensor 851*f* and the circumferential surface of the fourth dry disc 850. There is a clearance about 0.2 mm between the left and right pad plates 851*e*, 851*g* and the fourth dry disc 850. The shifting motor 851*a* and the shifting reducer 851*b* are fixedly secured to outside surface of the casing 851*d*. The casing 851*d* is fixedly secured to outside surface the transaxle housing by two guide bolts. The floating caliper 851*n* mounted on the casing 851*d* can move along the two guide bolts. The ends of the left screw 851*l* and the right screw 851*j* are fixed in an inner hole of the shifting driven gear 851*k*. The end of the left nut 851*m* is contacted with an inner wall of the floating caliper 851*n*. The end of the right nut 851*h* is contacted with the wall of the left pad plate 851*e*. The wall of the right pad plate 851*g* is contacted with the other inner wall of the floating caliper 851*n*. The speed sensor 851*f* is mounted on the top of the floating caliper 851*n*.

In response to an operator's action, the control device (not shown) determines what is required and then manipulates the selectively operated components of the four-speed transaxle 810 appropriately to respond to the operator demand. Four speed ratios are provided by changing the states of four electric caliper brake systems. The power supplied by the four-speed transaxle 810 is predicated solely by the power delivered to the four-speed transaxle 810 from the electric motor. To produce the four fixed speed ratios, there are four delivery paths obtained by selecting the first, second, third and fourth electric caliper brake systems to disengage and engage.

First speed ratio results when the second electric caliper brake system 831 and the third electric caliper brake system 844 are disengaged and the first electric caliper brake system 822 and the fourth electric brake system 851 are engaged. And then, the first ring gear 817 and the fourth ring gear 846 are locked.

Second speed ratio results when the second electric caliper brake system 831 and the fourth electric brake system 851 are disengaged and the first electric caliper brake system 822 and the third electric caliper brake system 844 are engaged. And then, the first ring gear 817 and the third ring gear 840 are locked.

Third speed ratio results when the first electric caliper brake system 822 and the third electric caliper brake system 844 are disengaged and the second electric caliper brake system 831 and the fourth electric brake system 851 are engaged. And then, the second sun gear 828 and the fourth ring gear 846 are locked.

Fourth speed ratio results when the first electric caliper brake system 822 and the fourth electric brake system 851 are disengaged and the second electric caliper brake system 831 and the third electric caliper brake system 844 are engaged. And then, the second sun gear 828 and the third ring gear 840 are locked.

Description of a Tenth Alternative Embodiment

Figure 10:
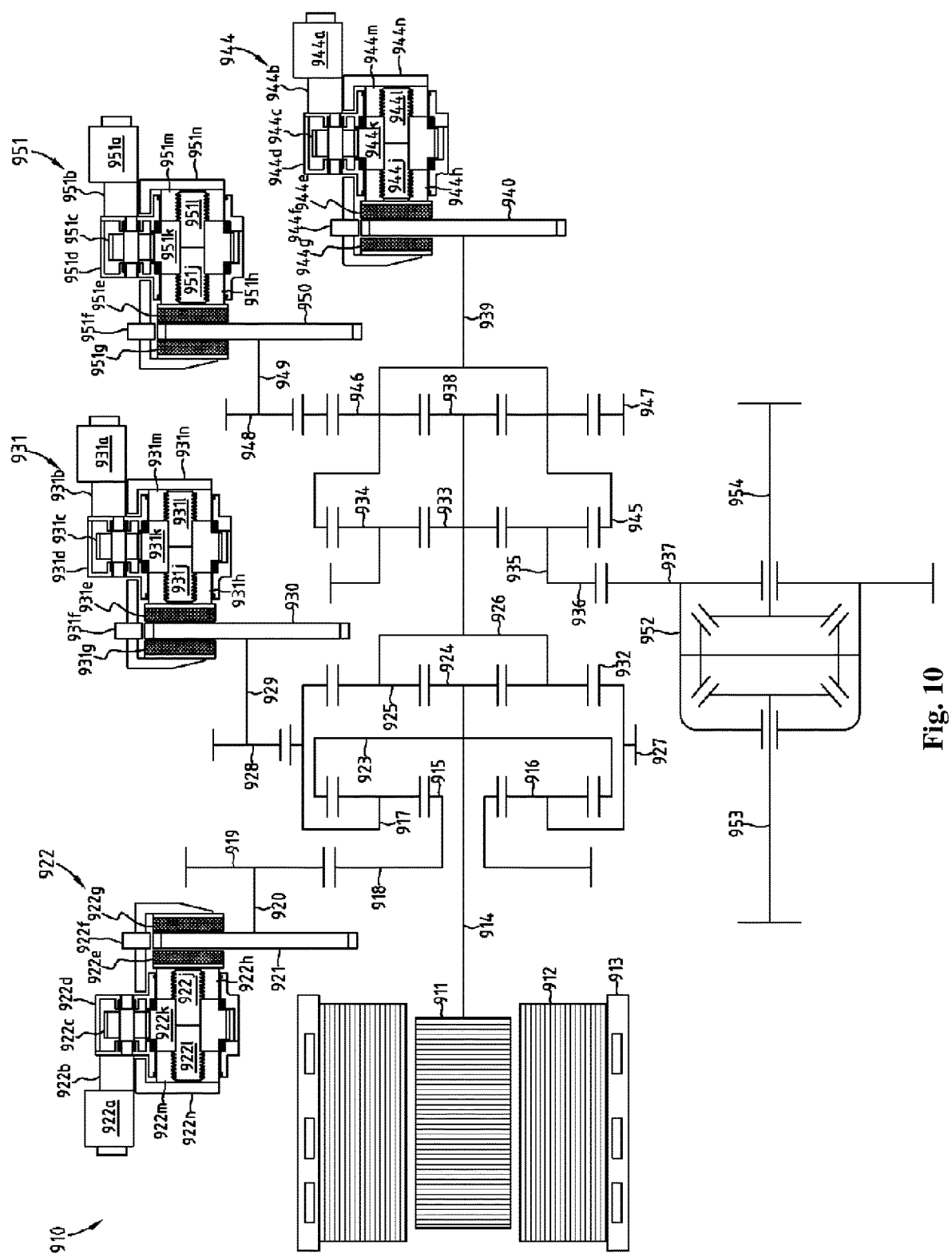
FIG. 10 is a schematic representation of the four-speed transaxle according to a tenth embodiment.

A tenth alternative and also a highly preferred form of a four-speed transaxle embodying the concepts of the present invention, is designated generally by the numeral 910 on the FIG. 10. It is observed that the four-speed transaxle 910 utilizes four planetary gear sets. The electric motor is coaxially aligned with the four planetary gear sets. The four-speed transaxle 910 has an input member 914 that may be in the nature of shaft which may be directly driven by an electric motor rotor 911. The input shaft 914 is successively connected to a first ring gear 923 in a first planetary gear set and a second sun gear 924 in a second planetary gear set in the four-speed transaxle 910.

A first planetary gear set has a first inner gear member 923 which may generally be designated as the first ring gear 923, which circumscribes a first outer gear member 915, generally designated as a first sun gear 915. A plurality of first planet gear members 916 are rotatably mounted on a first carrier 917 such that each first planet gear 916 meshingly engages both the first ring gear 923 and the first sun gear 915. A first connecting gear 918 has an outer tooth structure, which is mounted on the outer circumference of the whole ring formed by the first sun gear 915. There are two symmetrically arranged a first shift gear systems. The first shift gear system comprises a first shift gear 919 which meshingly engages the first connecting gear 918 and a first shift gear shaft 920 which is fixedly secured to a first dry disc 921. The first shift gear 919 is fixedly secured to the other end of the first shift gear shaft 920.

A second planetary gear set has a second inner gear member 932, which may generally be designated as a second ring gear 932, which circumscribes a second outer gear member 924, generally designated as the second sun gear 924. A plurality of second planet gear members 925 are rotatably mounted on the second carrier 926 such that each second planet gear 925 meshingly engages both the second ring gear 932 and the second sun gear 924. A second connecting gear 927 has an outer tooth structure, which is mounted on the outer circumference of the whole ring formed by the first carrier 917 and the second ring gear 932. There are two symmetrically arranged a second shift gear systems. The second shift gear system comprises a second shift gear 928 which meshingly engages the second connecting gear 927 and a second shift gear shaft 929 which is fixedly secured to a second dry disc 930. The second shift gear 928 is fixedly secured to the other end of the second shift gear shaft 929.

A third planetary gear set has a third inner gear member 945, which may generally be designated as a third ring gear 945, which circumscribes a third outer gear member 933, generally designated as a third sun gear 933. A plurality of third planet gear members 934 are rotatably mounted on a third carrier 935 such that each third planet gear 934 meshingly engages both the third ring gear 945 and the third sun gear 933.

A fourth planetary gear set has a fourth inner gear member 947, which may generally be designated as a fourth ring gear 947, which circumscribes a fourth outer gear member 938, generally designated as a fourth sun gear 938. A plurality of fourth planet gear members 946 are rotatably mounted on a fourth carrier 939 such that each fourth planet gear 946 meshingly engages both the fourth ring gear 947 and the fourth sun gear 938. The fourth carrier 939 is fixedly secured to a fourth dry disc 940. The fourth ring gear 947 has both the internal and external teeth. There are two symmetrically arranged a third shift gear systems. The third shift gear system comprises a third shift gear 948 which meshingly engages the external gear teeth of the fourth ring gear 947 and a third shift gear shaft 949 which is fixedly secured to a third dry disc 950. The third shift gear 948 is fixedly secured to the other end of the third shift gear shaft 949.

The first carrier 917 is fixed connected to the second ring gear 932 through the second connecting gear 927. The second carrier 926 is successively connected to the third sun gear 933 and the fourth sun gear 938. The third carrier 935 is fixedly connected to a driving gear 936. The third ring gear 945 is fixedly connected to the fourth carrier 939. The driving gear 936 meshingly engages a driven gear 937. The driven gear 937 is fixed for rotation with the differential carrier of a differential assembly 952. The differential assembly 952 distributes output torque from the electric motor to left and right wheels of an electric vehicle by a left shaft 953 and a right shaft 954.

A first electric caliper brake system 922 is floating caliper architecture, comprises a shifting motor 922a, a shifting reducer 922b, a casing 922d, a shifting driving gear 922c, a shifting driven gear 922k, a left nut 922m, a left screw 922l, a right nut 922h, a right screw 922j, a left pad plate 922e, a right pad plate 922g, a speed sensor 922f for watching state of the first dry disc 921 as well as a floating caliper 922n. The first electric caliper brake system 922, the left pad plate 922e and the right pad plate 922g are pressed against the first dry disc 921 by the right pair of screw-nut and the left pair of screw-nut inside the floating caliper 922n, respectively, driven by the shifting driven gear 922k power from the shifting driving gear 922c by using the shifting motor 922a. The first electric caliper brake system 922 and the first dry disc 921 are mounted on outside of the transaxle housing. A plurality of speed teeth are uniformly processed on the circumferential surface of the first dry disc 921. There is a clearance about 2 mm between the speed sensor 922f and the circumferential surface of the first dry disc 921. There is a clearance about 0.2 mm between the left and right pad plates 922e, 922g and the first dry disc 921. The shifting motor 922a and the shifting reducer 922b are fixedly secured to outside surface of the casing 922d. The casing 922d is fixedly secured to outside surface the transaxle housing by two guide bolts. The floating caliper 922n mounted on the casing 922d can move along the two guide bolts. The ends of the left screw 922l and the right screw 922j are fixed in an inner hole of the shifting driven gear 922k. The end of the left nut 922m is contacted with an inner wall of the floating caliper 922n. The end of the right nut 922h is contacted with the wall of the left pad plate 922e. The wall of the right pad plate 922g is contacted with the other inner wall of the floating caliper 922n. The speed sensor 922f is mounted on the top of the floating caliper 922n.

A second electric caliper brake system 931 is floating caliper architecture, comprises a shifting motor 931a, a shifting reducer 931b, a casing 931d, a shifting driving gear 931c, a shifting driven gear 931k, a left nut 931m, a left screw 931l, a right nut 931h, a right screw 931j, a left pad plate 931e, a right pad plate 931g, a speed sensor 931f for watching state of the second dry disc 930 as well as a floating caliper 931n. The second electric caliper brake system 931, the left pad plate 931e and the right pad plate 931g are pressed against the second dry disc 930 by the right pair of screw-nut and the left pair of screw-nut inside the floating caliper 931n, respectively, driven by the shifting driven gear 931k power from the shifting driving gear 931c by using the shifting motor 931a. The second electric caliper brake system 931 and the second dry disc 930 are mounted on outside of the transaxle housing. A plurality of speed teeth are uniformly processed on the circumferential surface of the second dry disc 930. There is a clearance about 2 mm between the speed sensor 931f and the circumferential surface of the second dry disc 930. There is a clearance about 0.2 mm between the left and right pad plates 931e, 931g and the second dry disc 930. The shifting motor 931a and the shifting reducer 931b are fixedly secured to outside surface of the casing 931d. The casing 931d is fixedly secured to outside surface the transaxle housing by two guide bolts. The floating caliper 931n mounted on the casing 931d can move along the two guide bolts. The ends of the left screw 931l and the right screw 931j are fixed in an inner hole of the shifting driven gear 931k. The end of the left nut 931m is contacted with an inner wall of the floating caliper 931n. The end of the right nut 931h is contacted with the wall of the left pad plate 931e. The wall of the right pad plate 931g is contacted with the other inner wall of the floating caliper 931n. The speed sensor 931f is mounted on the top of the floating caliper 931n.

A third electric caliper brake system 944 is floating caliper architecture, comprises a shifting motor 944a, a shifting reducer 944b, a casing 944d, a shifting driving gear 944c, a shifting driven gear 944k, a left nut 944m, a left screw 944l, a right nut 944h, a right screw 944j, a left pad plate 944e, a right pad plate 944g, a speed sensor 944f for watching state of the third dry disc 943 as well as a floating caliper 944n. The third electric caliper brake system 944, the left pad plate 944e and the right pad plate 944g are pressed against the third dry disc 943 by the right pair of screw-nut and the left pair of screw-nut inside the floating caliper 944n, respectively, driven by the shifting driven gear 944k power from the shifting driving gear 944c by using the shifting motor 944a. The third electric caliper brake system 944 and the third dry disc 943 are mounted on outside of the transaxle housing. A plurality of speed teeth are uniformly processed on the circumferential surface of the third dry disc 943. There is a clearance about 2 mm between the speed sensor 944f and the circumferential surface of the third dry disc 943. There is a clearance about 0.2 mm between the left and right pad plates 944e, 944g and the third dry disc 943. The shifting motor 944a and the shifting reducer 944b are fixedly secured to outside surface of the casing 944d. The casing 944d is fixedly secured to outside surface the transaxle housing by two guide bolts. The floating caliper 944n mounted on the casing 944d can move along the two guide bolts. The ends of the left screw 944l and the right screw 944j are fixed in an inner hole of the shifting driven gear 944k. The end of the left nut 944m is contacted with an inner wall of the floating caliper 944n. The end of the right nut 944h is contacted with the wall of the left pad plate 944e. The wall of the right pad plate 944g is contacted with the other inner wall of the floating caliper 944n. The speed sensor 944f is mounted on the top of the floating caliper 944n.

A fourth electric caliper brake system 951 is floating caliper architecture, comprises a shifting motor 951a, a shifting reducer 951b, a casing 951d, a shifting driving gear 951c, a shifting driven gear 951k, a left nut 951m, a left screw 951l, a right nut 951h, a right screw 951j, a left pad plate 951e, a right pad plate 951g, a speed sensor 951f for watching state of the fourth dry disc 950 as well as a floating caliper 951n. The fourth electric caliper brake system 951, the left pad plate 951e and the right pad plate 951g are pressed against the fourth dry disc 950 by the right pair of screw-nut and the left pair of screw-nut inside the floating caliper 951n, respectively, driven by the shifting driven gear 951k power from the shifting driving gear 951c by using the shifting motor 951a. The fourth electric caliper brake system 951 and the fourth dry disc 950 are mounted on outside of the transaxle housing. A plurality of speed teeth are uniformly processed on the circumferential surface of the fourth dry disc 950. There is a clearance about 2 mm between the speed sensor 951f and the circumferential surface of the fourth dry disc 950. There is a clearance about 0.2 mm between the left and right pad plates 951e, 951g and the fourth dry disc 950. The shifting motor 951a and the shifting reducer 951b are fixedly secured to outside surface of the casing 951d. The casing 951d is fixedly secured to outside surface the transaxle housing by two guide bolts. The floating caliper 951n mounted on the casing 951d can move along the two guide bolts. The ends of the left screw 951l and the right screw 951j are fixed in an inner hole of the shifting driven gear 951k. The end of the left nut 951m is contacted with an inner wall of the floating caliper 951n. The end of the right nut 951h is contacted with the wall of the left pad plate 951e. The wall of the right pad plate 951g is contacted with the other inner wall of the floating caliper 951n. The speed sensor 951f is mounted on the top of the floating caliper 951n.

In response to an operator's action, the control device (not shown) determines what is required and then manipulates the selectively operated components of the four-speed transaxle 910 appropriately to respond to the operator demand. Four speed ratios are provided by changing the states of four electric caliper brake systems. The power supplied by the four-speed transaxle 910 is predicated solely by the power delivered to the four-speed transaxle 910 from the electric motor. To produce the four fixed speed ratios, there are four delivery paths obtained by selecting the first, second, third and fourth electric caliper brake systems to disengage and engage.

First speed ratio results when the first electric caliper brake system 922 and the fourth electric brake system 951 are disengaged and the second electric caliper brake system 931 and the third electric caliper brake system 944 are engaged. And then, the second ring gear 932 and the third ring gear 945 are locked.

Second speed ratio results when the first electric caliper brake system 922 and the third electric caliper brake system 944 are disengaged and the second electric caliper brake system 931 and the fourth electric brake system 951 are engaged. And then, the second ring gear 932 and the fourth ring gear 947 are locked.

Third speed ratio results when the second electric caliper brake system 931 and the fourth electric brake system 951 are disengaged and the first electric caliper brake system 922 and the third electric caliper brake system 944 are engaged. And then, the first sun gear 915 and the third ring gear 945 are locked.

Fourth speed ratio results when the second electric caliper brake system 931 and the third electric caliper brake system 944 are disengaged and the first electric caliper brake system 922 and the fourth electric brake system 951 are engaged. And then, the first sun gear 915 and the fourth ring gear 947 are locked.

Description of a Eleventh Alternative Embodiment

Figure 11:
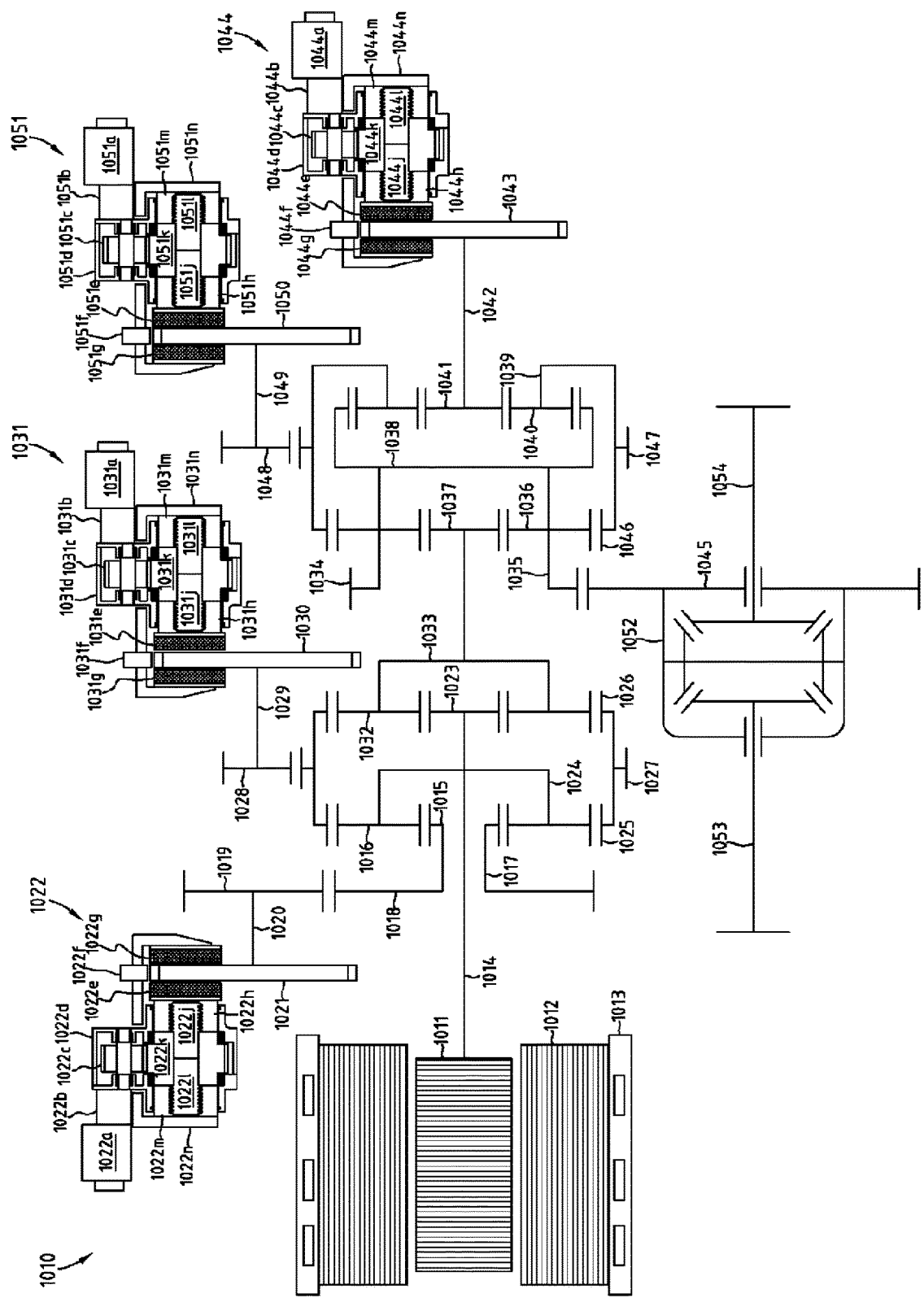
FIG. 11 is a schematic representation of the four-speed transaxle according to an eleventh embodiment.

A eleventh alternative and also a highly preferred form of a four-speed transaxle embodying the concepts of the present invention, is designated generally by the numeral 1010 on the FIG. 11. It is observed that the four-speed transaxle 1010 utilizes four planetary gear sets. The electric motor is coaxially aligned with the four planetary gear sets. The four-speed transaxle 1010 has an input member 1014 that may be in the nature of shaft which may be directly driven by an electric motor rotor 1011. The input shaft 1014 is successively connected to a first carrier 1024 in a first planetary gear set and a second sun gear 1023 in a second planetary gear set in the four-speed transaxle 1010.

The first planetary gear set has a first inner gear member 1025 which may generally be designated as a first ring gear 1025, which circumscribes a first outer gear member 1015, generally designated as a first sun gear 1015. A plurality of first planet gear members 1016 are rotatably mounted on a first carrier 1024 such that each first planet gear 1016 meshingly engages both the first ring gear 1025 and the first sun gear 1015. A first connecting gear 1018 has an external tooth structure, which is mounted on the outer circumference of the whole ring formed by the first sun gear 1015. There are two symmetrically arranged a first shift gear systems. The first shift gear system comprises a first shift gear 1019 which meshingly engages the first connecting gear 1018 and a first shift gear shaft 1020 which is fixedly secured to a first dry disc 1021. The first shift gear 1019 is fixedly secured to the other end of the first shift gear shaft 1020.

The second planetary gear set has a second inner gear member 1026, which may generally be designated as a second ring gear 1026, which circumscribes a second outer gear member 1023, generally designated as the second sun gear 1023. A plurality of second planet gear members 1032 are rotatably mounted on the second carrier 1033 such that each second planet gear 1032 meshingly engages both the second ring gear 1026 and the second sun gear 1023. A second connecting gear 1027 has an external tooth structure, which is mounted on the external circumference of the whole ring formed by the first ring gear 1025 and the second ring gear 1026. There are two symmetrically arranged a second shift gear systems. The second shift gear system comprises a second shift gear 1028 which meshingly engages the second connecting gear 1027 and a second shift gear shaft 1029 which is fixedly secured to a second dry disc 1030. The second shift gear 1028 is fixedly secured to the other end of the second shift gear shaft 1029.

A third planetary gear set has a third inner gear member 1046, which may generally be designated as a third ring gear 1046, which circumscribes a third external gear member 1037, generally designated as a third sun gear 1037. A plurality of third planet gear members 1036 are rotatably mounted on a third carrier 1035 such that each third planet gear 1036 meshingly engages both the third ring gear 1046 and the third sun gear 1037.

A fourth planetary gear set has a fourth inner gear member 1038, which may generally be designated as a fourth ring gear 1038, which circumscribes a fourth outer gear member 1041, generally designated as a fourth sun gear 1041. A plurality of fourth planet gear members 1040 are rotatably mounted on the fourth carrier 1039 such that each fourth planet gear 1040 meshingly engages both the fourth ring gear 1038 and the fourth sun gear 1041. The fourth sun gear 1041 is fixedly secured to a third dry disc 1043 through a shaft 1042. A third connecting gear 1047 has an external tooth structure, which is mounted on the external circumference of the whole ring formed by the third ring gear 1046 and the fourth carrier 1039. There are two symmetrically arranged a fourth shift gear systems. The fourth shift gear system comprises a fourth shift gear 1048 which meshingly engages the third connecting gear 1047 and a fourth shift gear shaft 1049 which is fixedly secured to a fourth dry disc 1050. The fourth shift gear 1048 is fixedly secured to the other end of the fourth shift gear shaft 1049.

The second carrier 1033 is fixedly connected to the third sun gear 1037. The third carrier 935 is fixedly connected to a driving gear 1034 and the fourth ring gear 1038. The third ring gear 1046 is fixedly connected to the fourth carrier 1039. The driving gear 1034 meshingly engages a driven gear 1045. The driven gear 1045 is fixed for rotation with the differential carrier of the differential assembly 1052. The differential assembly 1052 distributes output torque from the electric motor to left and right wheels of an electric vehicle by the left shaft 1053 and the right shaft 1054.

A first electric caliper brake system 1022 is floating caliper architecture, comprises a shifting motor 1022*a*, a shifting reducer 1022*b*, a casing 1022*d*, a shifting driving gear 1022*c*, a shifting driven gear 1022*k*, a left nut 1022*m*, a left screw 1022*l*, a right nut 1022*h*, a right screw 1022*j*, a left pad plate 1022*e*, a right pad plate 1022*g*, a speed sensor 1022*f* for watching state of the first dry disc 1021 as well as a floating caliper 1022*n*. The first electric caliper brake system 1022, the left pad plate 1022*e* and the right pad plate 1022*g* are pressed against the first dry disc 1021 by the right pair of screw-nut and the left pair of screw-nut inside the floating caliper 1022*n*, respectively, driven by the shifting driven gear 1022*k* power from the shifting driving gear 1022*c* by using the shifting motor 1022*a*. The first electric caliper brake system 1022 and the first dry disc 1021 are mounted on outside of the transaxle housing. A plurality of speed teeth are uniformly processed on the circumferential surface of the first dry disc 1021. There is a clearance about 2 mm between the speed sensor 1022*f* and the circumferential surface of the first dry disc 1021. There is a clearance about 0.2 mm between the left and right pad plates 1022*e*, 1022*g* and the first dry disc 1021. The shifting motor 1022*a* and the shifting reducer 1022*b* are fixedly secured to outside surface of the casing 1022*d*. The casing 1022*d* is fixedly secured to outside surface the transaxle housing by two guide bolts. The floating caliper 1022*n* mounted on the casing 1022*d* can move along the two guide bolts. The ends of the left screw 1022*l* and the right screw 1022*j* are fixed in the inner hole of the shifting driven gear 1022*k*. The end of the left nut 1022*m* is contacted with an inner wall of the floating caliper 1022*n*. The end of the right nut 1022*h* is contacted with the wall of the left pad plate 1022*e*. The wall of the right pad plate 1022*g* is contacted with the other inner wall of the floating caliper 1022*n*. The speed sensor 1022*f* is mounted on the top of the floating caliper 1022*n*.

A second electric caliper brake system 1031 is floating caliper architecture, comprises a shifting motor 1031*a*, a shifting reducer 1031*b*, a casing 1031*d*, a shifting driving gear 1031*c*, shifting driven gear 1031*k*, a left nut 1031*m*, a left screw 10311, a right nut 1031*h*, a right screw 1031*j*, a left pad plate 1031*e*, a right pad plate 1031*g*, a speed sensor 1031*f* for watching state of the second dry disc 1030 as well as the floating caliper 1031*n*. The second electric caliper brake system 1031, the left pad plate 1031*e* and the right pad plate 1031*g* are pressed against the second dry disc 1030 by the right pair of screw-nut and the left pair of screw-nut inside the floating caliper 1031*n*, respectively, driven by the shifting driven gear 1031*k* power from the shifting driving gear 1031*c* by using the shifting motor 1031*a*. The second electric caliper brake system 1031 and the second dry disc 1030 are mounted on outside of the transaxle housing. A plurality of speed teeth are uniformly processed on the circumferential surface of the second dry disc 1030. There is a clearance about 2 mm between the speed sensor 1031*f* and the circumferential surface of the second dry disc 1030. There is a clearance about 0.2 mm between the left and right pad plates 1031*e*, 1031*g* and the second dry disc 1030. The shifting motor 1031*a* and the shifting reducer 1031*b* are fixedly secured to outside surface of the casing 1031*d*. The casing 1031*d* is fixedly secured to outside surface the transaxle housing by two guide bolts. The floating caliper 1031*n* mounted on the casing 1031*d* can move along the two guide bolts. The ends of the left screw 10311 and the right screw 1031*j* are fixed in an inner hole of the shifting driven gear 1031*k*. The end of the left nut 1031*m* is contacted with an inner wall of the floating caliper 1031*n*. The end of the right nut 1031*h* is contacted with the wall of the left pad plate 1031*e*. The wall of the right pad plate 1031*g* is contacted with the other inner wall of the floating caliper 1031*n*. The speed sensor 1031*f* is mounted on the top of the floating caliper 1031*n*.

A third electric caliper brake system 1044 is floating caliper architecture, comprises a shifting motor 1044*a*, a shifting reducer 1044*b*, a casing 1044*d*, a shifting driving gear 1044*c*, shifting driven gear 1044*k*, a left nut 1044*m*, a left screw 1044*l*, a right nut 1044*h*, a right screw 1044*j*, a left pad plate 1044*e*, a right pad plate 1044*g*, a speed sensor 1044*f* for watching state of the third dry disc 1043 as well as a floating caliper 1044*n*. The third electric caliper brake system 1044, the left pad plate 1044*e* and the right pad plate 1044*g* are pressed against the third dry disc 1043 by the right pair of screw-nut and the left pair of screw-nut inside the floating caliper 1044*n*, respectively, driven by the shifting driven gear 1044*k* power from the shifting driving gear 1044*c* by using the shifting motor 1044*a*. The third electric caliper brake system 1044 and the third dry disc 1043 are mounted on outside of the transaxle housing. A plurality of speed teeth are uniformly processed on the circumferential surface of the third dry disc 1043. There is a clearance about 2 mm between the speed sensor 1044*f* and the circumferential surface of the third dry disc 1043. There is a clearance about 0.2 mm between the left and right pad plates 1044*e*, 1044*g* and the third dry disc 1043. The shifting motor 1044*a* and the shifting reducer 1044*b* are fixedly secured to outside surface of the casing 1044*d*. The casing 1044*d* is fixedly secured to outside surface the transaxle housing by two guide bolts. The floating caliper 1044*n* mounted on the casing 1044*d* can move along the two guide bolts. The ends of the left screw 1044*l* and the right screw 1044*j* are fixed in an inner hole of the shifting driven gear 1044*k*. The end of the left nut 1044*m* is contacted with an inner wall of the floating caliper 1044*n*. The end of the right nut 1044*h* is contacted with the wall of the left pad plate 1044*e*. The wall of the right pad plate 1044*g* is contacted with the other inner wall of the floating caliper 1044*n*. The speed sensor 1044*f* is mounted on the top of the floating caliper 1044*n*.

A fourth electric caliper brake system 1051 is floating caliper architecture, comprises a shifting motor 1051*a*, s shifting reducer 1051*b*, a casing 1051*d*, a shifting driving gear 1051*c*, a shifting driven gear 1051*k*, a left nut 1051*m*, a left screw 1051*l*, a right nut 1051*h*, a right screw 1051*j*, a left pad plate 1051*e*, a right pad plate 1051*g*, a speed sensor 1051*f* for watching state of the fourth dry disc 1050 as well as a floating caliper 1051*n*. The fourth electric caliper brake system 1051, the left pad plate 1051*e* and the right pad plate 1051*g* are pressed against the fourth dry disc 1050 by the right pair of screw-nut and the left pair of screw-nut inside the floating caliper 1051*n*, respectively, driven by the shifting driven gear 1051*k* power from the shifting driving gear 1051*c* by using the shifting motor 1051*a*. The fourth electric caliper brake system 1051 and the fourth dry disc 1050 are mounted on outside of the transaxle housing. A plurality of speed teeth are uniformly processed on the circumferential surface of the fourth dry disc 1050. There is a clearance about 2 mm between the speed sensor 1051*f* and the circumferential surface of the fourth dry disc 1050. There is a clearance about 0.2 mm between the left and right pad plates 1051*e*, 1051*g* and the fourth dry disc 1050. The shifting motor 1051*a* and the shifting reducer 1051*b* are fixedly secured to outside surface of the casing 1051*d*. The casing 1051*d* is fixedly secured to outside surface the transaxle housing by two guide bolts. The floating caliper 1051*n* mounted on the casing 1051*d* can move along the two guide bolts. The ends of the left screw 1051*l* and the right screw 1051*j* are fixed in an inner hole of the shifting driven gear 1051*k*. The end of the left nut 1051*m* is contacted with an inner wall of the floating caliper 1051*n*. The end of the right nut 1051*h* is contacted with the wall of the left pad plate 1051*e*. The wall of the right pad plate 1051*g* is contacted with the other inner wall of the floating caliper 1051*n*. The speed sensor 1051*f* is mounted on the top of the floating caliper 1051*n*.

In response to an operator's action, the control device (not shown) determines what is required and then manipulates the selectively operated components of the four-speed transaxle 1010 appropriately to respond to the operator demand. Four speed ratios are provided by changing the states of four electric caliper brake systems. The power supplied by the four-speed transaxle 1010 is predicated solely by the power delivered to the four-speed transaxle 1010 from the electric motor. To produce the four fixed speed ratios, there are four delivery paths obtained by selecting the first, second, third and fourth electric caliper brake systems to disengage and engage.

First speed ratio results when the first electric caliper brake system 1022 and the third electric caliper brake system 1044 are disengaged and the second electric caliper brake system 1031 and the fourth electric brake system 1051 are engaged. And then, the second ring gear 1026 and the third ring gear 1046 are locked.

Second speed ratio results when the first electric caliper brake system 1022 and the fourth electric brake system 1051 are disengaged and the second electric caliper brake system 1031 and the third electric caliper brake system 1044 are engaged. And then, the second ring gear 1026 and the fourth sun gear 1041 are locked.

Third speed ratio results when the second electric caliper brake system 1031 and the third electric caliper brake system 1044 are disengaged and the first electric caliper brake system 1022 and the fourth electric brake system 1051 are engaged. And then, the first sun gear 1015 and the third ring gear 1046 are locked.

Fourth speed ratio results when the second electric caliper brake system 1031 and the fourth electric brake system 1051 are disengaged and the first electric caliper brake system 1022 and the third electric caliper brake system 1044 are engaged. And then, the first sun gear 1015 and the fourth sun gear 1041 are locked.

Description of a Twelfth Alternative Embodiment

Figure 12:
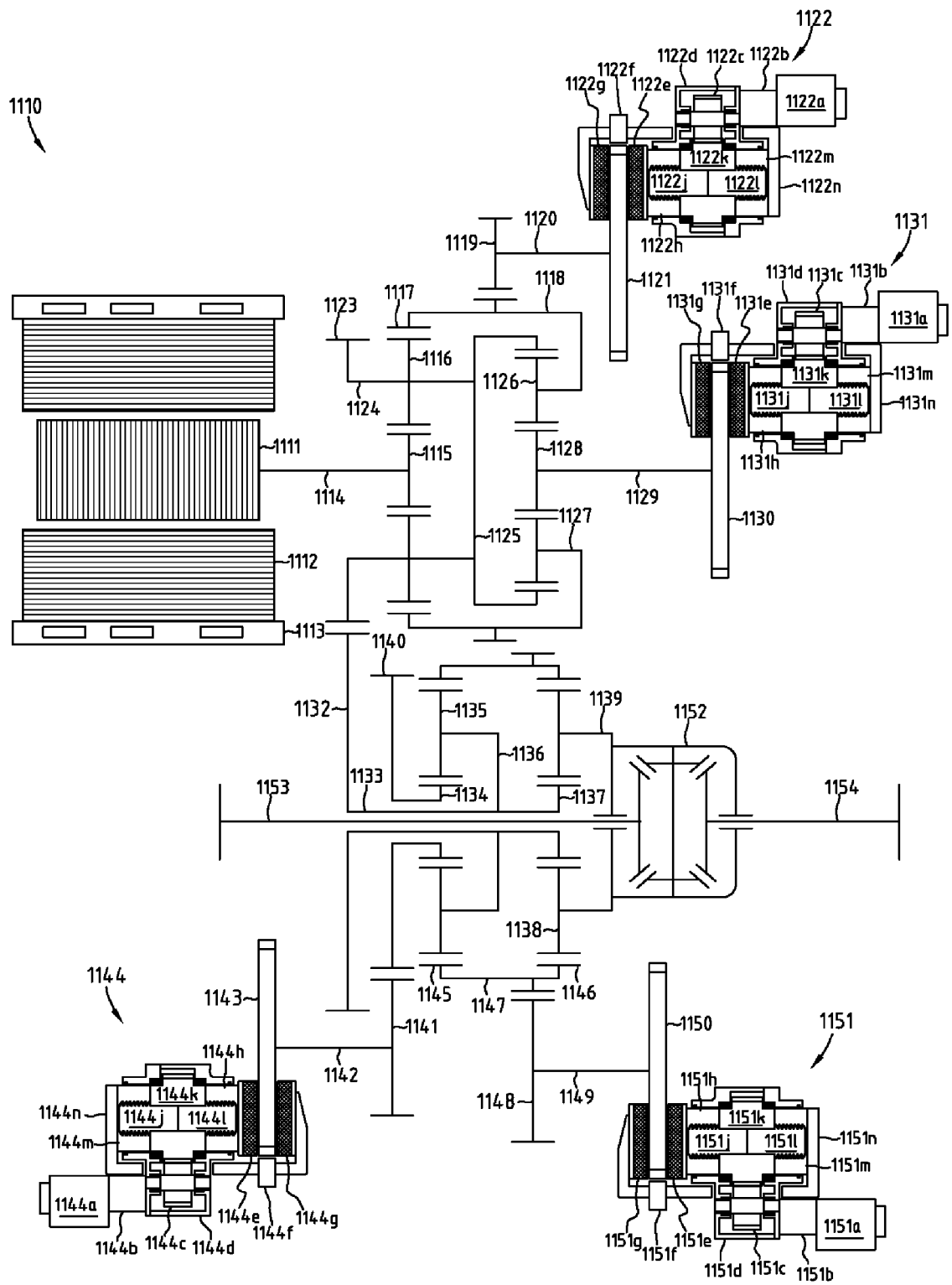
FIG. 12 is a schematic representation of the four-speed transaxle according to a twelfth embodiment.

A twelfth alternative and also a highly preferred form of a four-speed transaxle embodying the concepts of the present invention, is designated generally by the numeral 1110 on the FIG. 12. It is observed that the four-speed transaxle 1110 utilizes four planetary gear sets. The electric motor is coaxially aligned with the first and second planetary gear sets. The differential assembly 1152 is coaxially aligned with the third and fourth planetary gear sets. The four-speed transaxle 1110 has an input member 1114 that may be in the nature of shaft which may be directly driven by an electric motor rotor 1111. The input shaft 1114 is connected to a first sun gear 1115 in a first planetary gear set in the four-speed transaxle 1110.

The first planetary gear set has a first inner gear member 1117 which may generally be designated as a first ring gear 1117, which circumscribes a first outer gear member 1115, generally designated as the first sun gear 1115. A plurality of first planet gear members 1116 are rotatably mounted on a first carrier 1124 such that each first planet gear 1116 meshingly engages both the first ring gear 1117 and the first sun gear 1115. A first connecting gear 1118 has an external tooth structure, which is mounted on the external circumference of the whole ring formed by the first ring gear 1117 and a second carrier 1127. There are two symmetrically arranged a first shift gear systems. The first shift gear system comprises a first shift gear 1119 which meshingly engages the first connecting gear 1118 and a first shift gear shaft 1120 which is fixedly secured to a first dry disc 1121. The first shift gear 1119 is fixedly secured to the other end of the first shift gear shaft 1120.

The second planetary gear set has a second inner gear member 1125, which may generally be designated as a second ring gear 1125, which circumscribes a second outer gear member 1128, generally designated as the second sun gear 1128. A plurality of second planet gear members 1126 are rotatably mounted on the second carrier 1127 such that each second planet gear 1126 meshingly engages both the second ring gear 1125 and the second sun gear 1128. The second sun gear 1128 is fixedly secured to a second dry disc 1130 through a shaft 1129.

The third planetary gear set has a third inner gear member 1145, which may generally be designated as a third ring gear 1145, which circumscribes a third external gear member 1134, generally designated as a third sun gear 1134. A plurality of third planet gear members 1135 are rotatably mounted on a third carrier 1136 such that each third planet gear 1135 meshingly engages both the third ring gear 1145 and the third sun gear 1134. A second connecting gear 1140 has an external tooth structure, which is mounted on the external circumference of the whole ring formed by the third sun gear 1134. There are two symmetrically arranged a third shift gear systems. The third shift gear system comprises a third shift gear 1141 which meshingly engages the second connecting gear 1140 and a third shift gear shaft 1142 which is fixedly secured to a third dry disc 1143. The third shift gear 1141 is fixedly secured to the other end of the third shift gear shaft 1142.

The fourth planetary gear set has a fourth inner gear member 1146, which may generally be designated as a fourth ring gear 1146, which circumscribes a fourth outer gear member 1137, generally designated as a fourth sun gear 1137. A plurality of fourth planet gear members 1138 are rotatably mounted on a fourth carrier 1139 such that each fourth planet gear 1138 meshingly engages both the fourth ring gear 1146 and the fourth sun gear 1137. A third connecting gear 1147 has an external tooth structure, which is mounted on the external circumference of the whole ring formed by the third ring gear 1145 and the fourth ring gear 1146. There are two symmetrically arranged a fourth shift gear systems. The fourth shift gear system comprises a fourth shift gear 1148 which meshingly engages the third connecting gear 1147 and a fourth shift gear shaft 1149 which is fixedly secured to a fourth dry disc 1150. The fourth shift gear 1148 is fixedly secured to the other end of the fourth shift gear shaft 1149.

The first carrier 1124 is fixedly connected to the second ring gear 1125. The second carrier 1127 is fixedly connected to the first ring gear 1117. The first carrier 1124 is fixedly connected to a driving gear 1123. The third ring gear 1145 is fixedly connected to the fourth ring gear 1146. The driving gear 1123 meshingly engages a driven gear 1132. The driven gear 1132 is successively connected to the third carrier 1136 and the fourth sun gear 1137 through a shaft 1133. The fourth carrier 1139 is fixed for rotation with the differential carrier of the differential assembly 1152. The third carrier 1136, the shaft 1133 and the fourth sun gear 1137 are hollow allowing the left shaft 1153 to pass through them center from the differential assembly 1152 to the left wheel of the electric vehicle. The third sun gear 1134 is hollow allowing the shaft 1133 to pass through it center to connect the third shift gear 1140. The differential assembly 1152 distributes output torque from the electric motor to left and right wheels of an electric vehicle by the left shaft 1153 and the right shaft 1154.

A first electric caliper brake system 1122 is floating caliper architecture, comprises a shifting motor 1122a, a shifting reducer 1122b, a casing 1122d, a shifting driving gear 1122c, shifting driven gear 1122k, a left nut 1122m, a left screw 1122l, a right nut 1122h, a right screw 1122j, a left pad plate 1122e, a right pad plate 1122g, a speed sensor 1122f for watching state of the first dry disc 1121 as well as a floating caliper 1122n. The first electric caliper brake system 1122, the left pad plate 1122e and the right pad plate 1122g are pressed against the first dry disc 1121 by the right pair of screw-nut and the left pair of screw-nut inside the floating caliper 1122n, respectively, driven by the shifting driven gear 1122k power from the shifting driving gear 1122c by using the shifting motor 1122a. The first electric caliper brake system 1122 and the first dry disc 1121 are mounted on outside of the transaxle housing. A plurality of speed teeth are uniformly processed on the circumferential surface of the first dry disc 1121. There is a clearance about 2 mm between the speed sensor 1122f and the circumferential surface of the first dry disc 1121. There is a clearance about 0.2 mm between the left and right pad plates 1122e, 1122g and the first dry disc 1121. The shifting motor 1122a and the shifting reducer 1122b are fixedly secured to outside surface of the casing 1122d. The casing 1122d is fixedly secured to outside surface the transaxle housing by two guide bolts. The floating caliper 1122n mounted on the casing 1122d can move along the two guide bolts. The ends of the left screw 1122l and the right screw 1122j are fixed in an inner hole of the shifting driven gear 1122k. The end of the left nut 1122m is contacted with an inner wall of the floating caliper 1122n. The end of the right nut 1122h is contacted with the wall of the left pad plate 1122e. The wall of the right pad plate 1122g is contacted with the other inner wall of the floating caliper 1122n. The speed sensor 1122f is mounted on the top of the floating caliper 1122n.

A second electric caliper brake system 1131 is floating caliper architecture, comprises a shifting motor 1131a, a shifting reducer 1131b, a casing 1131d, a shifting driving gear 1131c, a shifting driven gear 1131k, a left nut 1131m, a left screw 1131l, a right nut 1131h, a right screw 1131j, a left pad plate 1131e, a right pad plate 1131g, a speed sensor 1131f for watching state of the second dry disc 1130 as well as a floating caliper 1131n. The second electric caliper brake system 1131, the left pad plate 1131e and the right pad plate 1131g are pressed against the second dry disc 1130 by the right pair of screw-nut and the left pair of screw-nut inside the floating caliper 1131n, respectively, driven by the shifting driven gear 1131k power from the shifting driving gear 1131c by using the shifting motor 1131a. The second electric caliper brake system 1131 and the second dry disc 1130 are mounted on outside of the transaxle housing. A plurality of speed teeth are uniformly processed on the circumferential surface of the second dry disc 1130. There is a clearance about 2 mm between the speed sensor 1131f and the circumferential surface of the second dry disc 1130. There is a clearance about 0.2 mm between the left and right pad plates 1131e, 1131g and the second dry disc 1130. The shifting motor 1131a and the shifting reducer 1131b are fixedly secured to outside surface of the casing 1131d. The casing 1131d is fixedly secured to outside surface the transaxle housing by two guide bolts. The floating caliper 1131n mounted on the casing 1131d can move along the two guide bolts. The ends of the left screw 1131l and the right screw 1131j are fixed in an inner hole of the shifting driven gear 1131k. The end of the left nut 1131m is contacted with an inner wall of the floating caliper 1131n. The end of the right nut 1131h is contacted with the wall of the left pad plate 1131e. The wall of the right pad plate 1131g is contacted with the other inner wall of the floating caliper 1131n. The speed sensor 1131f is mounted on the top of the floating caliper 1131n.

A third electric caliper brake system 1144 is floating caliper architecture, comprises a shifting motor 1144a, a shifting reducer 1144b, a casing 1144d, a shifting driving gear 1144c, shifting driven gear 1144k, a left nut 1144m, a left screw 1144l, a right nut 1144h, a right screw 1144j, a left pad plate 1144e, a right pad plate 1144g, a speed sensor 1144f for watching state of the third dry disc 1143 as well as a floating caliper 1144n. The third electric caliper brake system 1144, the left pad plate 1144e and the right pad plate 1144g are pressed against the third dry disc 1143 by the right pair of screw-nut and the left pair of screw-nut inside the floating caliper 1144n, respectively, driven by the shifting driven gear 1144k power from the shifting driving gear 1144c by using the shifting motor 1144a. The third electric caliper brake system 1144 and the third dry disc 1143 are mounted on outside of the transaxle housing. A plurality of speed teeth are uniformly processed on the circumferential surface of the third dry disc 1143. There is a clearance about 2 mm between the speed sensor 1144f and the circumferential surface of the third dry disc 1143. There is a clearance about 0.2 mm between the left and right pad plates 1144e, 1144g and the third dry disc 1143. The shifting motor 1144a and the shifting reducer 1144b are fixedly secured to outside surface of the casing 1144d. The casing 1144d is fixedly secured to outside surface the transaxle housing by two guide bolts. The floating caliper 1144n mounted on the casing 1144d can move along the two guide bolts. The ends of the left screw 1144l and the right screw 1144j are fixed in an inner hole of the shifting driven gear 1144k. The end of the left nut 1144m is contacted with an inner wall of the floating caliper 1144n. The end of the right nut 1144h is contacted with the wall of the left pad plate 1144e. The wall of the right pad plate 1144g is contacted with the other inner wall of the floating caliper 1144n. The speed sensor 1144f is mounted on the top of the floating caliper 1144n.

A fourth electric caliper brake system 1151 is floating caliper architecture, comprises a shifting motor 1151a, a shifting reducer 1151b, a casing 1151d, a shifting driving gear 1151c, shifting driven gear 1151k, a left nut 1151m, a left screw 1151l, a right nut 1151h, a right screw 1151j, a left pad plate 1151*e*, a right pad plate 1151*g*, a speed sensor 1151*f* for watching state of the fourth dry disc 1150 as well as a floating caliper 1151*n*. The fourth electric caliper brake system 1151, the left pad plate 1151*e* and the right pad plate 1151*g* are pressed against the fourth dry disc 1150 by the right pair of screw-nut and the left pair of screw-nut inside the floating caliper 1151*n*, respectively, driven by the shifting driven gear 1151*k* power from the shifting driving gear 1151*c* by using the shifting motor 1151*a*. The fourth electric caliper brake system 1151 and the fourth dry disc 1150 are mounted on outside of the transaxle housing. A plurality of speed teeth are uniformly processed on the circumferential surface of the fourth dry disc 1150. There is a clearance about 2 mm between the speed sensor 1151*f* and the circumferential surface of the fourth dry disc 1150. There is a clearance about 0.2 mm between the left and right pad plates 1151*e*, 1151*g* and the fourth dry disc 1150. The shifting motor 1151*a* and the shifting reducer 1151*b* are fixedly secured to outside surface of the casing 1151*d*. The casing 1151*d* is fixedly secured to outside surface the transaxle housing by two guide bolts. The floating caliper 1151*n* mounted on the casing 1151*d* can move along the two guide bolts. The ends of the left screw 1151*l* and the right screw 1151*j* are fixed in an inner hole of the shifting driven gear 1151*k*. The end of the left nut 1151*m* is contacted with an inner wall of the floating caliper 1151*n*. The end of the right nut 1151*h* is contacted with the wall of the left pad plate 1151*e*. The wall of the right pad plate 1151*g* is contacted with the other inner wall of the floating caliper 1151*n*. The speed sensor 1151*f* is mounted on the top of the floating caliper 1151*n*.

In response to an operator's action, the control device (not shown) determines what is required and then manipulates the selectively operated components of the four-speed transaxle 1110 appropriately to respond to the operator demand. Four speed ratios are provided by changing the states of four electric caliper brake systems. The power supplied by the four-speed transaxle 1110 is predicated solely by the power delivered to the four-speed transaxle 1110 from the electric motor. To produce the four fixed speed ratios, there are four delivery paths obtained by selecting the first, second, third and fourth electric caliper brake systems to disengage and engage.

First speed ratio results when the second electric caliper brake system 1131 and the third electric caliper brake system 1144 are disengaged and the first electric caliper brake system 1122 and the fourth electric brake system 1151 are engaged. And then, the first ring gear 1117 and the fourth ring gear 1146 are locked.

Second speed ratio results when the first electric caliper brake system 1122 and the third electric caliper brake system 1144 are disengaged and the second electric caliper brake system 1131 and the fourth electric brake system 1151 are engaged. And then, the second sun gear 1128 and fourth ring gear 1146 are locked.

Third speed ratio results when the second electric caliper brake system 1131 and the fourth electric brake system 1151 are disengaged and the first electric caliper brake system 1122 and the third electric caliper brake system 1144 are engaged. And then, the first ring gear 1117 and the third sun gear 1134 are locked.

Fourth speed ratio results when the first electric caliper brake system 1122 and the fourth electric brake system 1151 are disengaged and the second electric caliper brake system 1131 and the third electric caliper brake system 1144 are engaged. And then, the second sun gear 1128 and the third sun gear 1134 are locked.

The embodiments are highly preferred, of the present invention are disclosed, and it is to be clearly understood that the aforesaid embodiments are susceptible to numerous additional changes apparent to one skilled in the art. Therefore, the scope of the present invention is not to be limited to the details shown and described but is intended to include all changes and modifications which come within the scope of the appended claims.

As should now be apparent, the present invention teaches that a four-speed transaxle embodying the concepts of the present invention is capable of accomplishing the objects thereof.

What is claimed is:

1. A four-speed transaxle for electric vehicle, comprising:
an electric motor;
an input member for receiving power from the electric motor;
an output member;
the electric motor comprising a stator and a rotor fixedly secured to the input member;
a first planetary gear set;
a second planetary gear set operably connected to the first planetary gear set;
a third planetary gear set;
a fourth planetary gear set operably connected to the third planetary gear set;
each planetary gear set utilizing a sun gear, a ring gear, a carrier and a plurality of planet gears;
the plurality of planet gears being rotatably mounted on the carrier;
the sun gear and the ring gear in each planetary gear set meshingly engaging the plurality of planet gears;
one stage gears comprising a driving gear and a driven gear;
a differential assembly comprising a differential carrier, which is rotatingly drivable around an axis thereof, as well as a left shaft and a right shaft;
the differential carrier as the output member for delivering power from the transaxle;
the electric motor being coaxially aligned with the first and second planetary gear sets;
the differential assembly being coaxially aligned with the third and fourth planetary gear sets;
the input member successively connected to a first sun gear in the first planetary gear set and a second sun gear in the second planetary gear set for delivering power from the electric motor;
the output member rotatably connected to a fourth carrier in the fourth planetary gear set for delivering power from the transaxle;
the driving gear fixed for rotation with a second carrier in the second planetary gear set providing power from the first and second planetary gear sets;
the driven gear successively fixed for rotation with a third carrier in the third planetary gear set and a fourth sun gear in the fourth planetary gear set provided power to the third and fourth planetary gear sets;
the driving gear meshingly engaging the driven gear;
a third sun gear in the third planetary gear set and the fourth sun gear in the fourth planetary gear set being hollow allowing the right shaft to pass through centers of the third sun gear and the fourth sun gear from the differential assembly to a right wheel of an electric vehicle;
four shift gear systems used to the first, second, third and fourth planetary gear sets respectively;

each shift gear system comprising a shift gear and a shift gear shaft;

the shift gear secured to the shift gear shaft and a dry disc secured to the shift gear shaft;

four electric caliper brake systems systems used to the first, second, third and fourth planetary gear sets respectively;

each electric caliper brake system and dry disc being mounted on an outside of a housing of the transaxle;

each electric caliper brake system being a floating caliper architecture;

each electric caliper brake system comprising a shifting motor, a shifting reducer, a casing, a shifting driving gear, a shifting driven gear, a left nut, a left screw, a right nut, a right screw, a left pad plate, a right pad plate, a dry disc, a speed sensor for watching state of the dry disc as well as a floating caliper;

the left pad plate and the right pad plate in the electric caliper brake system being pressed against the dry disc by a right pair of screw-nut and a left pair of screw-nut inside the floating caliper, respectively, driven by the shifting driven gear power from the shifting driving gear by using the shifting motor;

a plurality of speed teeth being uniformly processed on a circumferential surface of the dry disc;

there is being clearance about 2 mm between the speed sensor and the circumferential surface of the dry disc;

there being a clearance about 0.2 mm between the left and right pad plates and the dry disc;

the shifting motor and the shifting reducer being fixedly secured to outside surface of the casing; the casing is fixedly secured to an outside surface of the housing of the transaxle by two guide bolts;

the floating caliper mounted on the casing can move along the two guide bolts;

ends of the left screw and the right screw being fixed in an inner hole of the shifting driven gear;

the end of the left nut being contacted with an inner wall of the floating caliper;

the end of the right nut being contacted with a wall of the left pad plate;

the wall of the right pad plate being contacted with the other inner wall of the floating caliper;

the speed sensor being mounted on the top of the floating caliper;

a first ring gear in the first planetary gear set having both internal and external teeth;

there being two symmetrically arranged a-first shift gear systems;

a first shift gear in the first shift gear system meshingly engaging the external teeth of the first ring gear;

the first shift gear fixedly secured to a first dry disc through a first shift gear shaft;

a first carrier in the planetary gear set fixedly connected to a second ring gear in the second planetary gear set;

the second ring gear in the second planetary gear set having both internal and external teeth;

there being two symmetrically arranged second shift gear systems;

a second shift gear in the second shift gear system meshingly engaging the external teeth of the second ring gear;

the second shift gear fixedly secured to a second dry disc through a second shift gear shaft;

the third sun gear in the third planetary gear set connected with a first connecting gear by a shaft;

there being two symmetrically arranged third shift gear systems;

a third shift gear in the third shift gear system meshingly engaging the first connecting gear;

the third shift gear fixedly secured to a third dry disc through a third shift gear shaft;

a second connecting gear having an external tooth structure, which is mounted on an outer circumference of the whole ring formed by a third ring gear in the third planetary gear set and a fourth ring gear in the fourth planetary gear set;

there being two symmetrically arranged fourth shift gear systems;

a fourth shift gear in the fourth shift system meshingly engaging the second connecting gear;

the fourth shift gear fixedly secured to a fourth dry disc through a fourth shift gear shaft.

2. The four-speed transaxle for electric vehicle according to claim 1, wherein:

the four electric caliper brake systems comprise a first electric caliper brake system, a second electric caliper system, a third electric caliper system and a fourth electric caliper brake system;

the first electric caliper brake system is used to control the first ring gear in the first planetary gear set locked and released;

the second electric caliper brake system is used to control the second ring gear in the second planetary gear set locked and released;

the third electric caliper brake system is used to control the third sun gear in the third planetary gear set locked and released;

the fourth electric caliper brake system is used to control the fourth ring gear in the fourth planetary gear set locked and released;

a first speed ratio is achieved by the second ring gear and the fourth ring gear locked, the first ring gear and the third sun gear released;

a second speed ratio is achieved by the first ring gear and the fourth ring gear locked, said the second ring gear and the third sun gear released;

a third speed ratio is achieved by the second ring gear and the third sun gear locked, said the first ring gear and the fourth ring gear released;

a fourth speed ratio is achieved by the first ring gear and the third sun gear locked, the second ring gear and the fourth ring gear released.

* * * * *

UNITED STATES PATENT AND TRADEMARK OFFICE
CERTIFICATE OF CORRECTION

PATENT NO. : 10,851,881 B2  
APPLICATION NO. : 16/033222  
DATED : December 1, 2020  
INVENTOR(S) : Fuhai Duan et al.

Page 1 of 1

It is certified that error appears in the above-identified patent and that said Letters Patent is hereby corrected as shown below:

On the Title Page

Item (30), the following Foreign Application Priority Data was omitted:  
February 11, 2018 (CN)........... 201810140978.6

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*